US012743795B2

(12) United States Patent
Boardman et al.

(10) Patent No.: US 12,743,795 B2
(45) Date of Patent: Sep. 22, 2026

(54) DETERMINING OBJECT STRUCTURE USING CAMERA DEVICES WITH VIEWS OF MOVING OBJECTS

(71) Applicant: EveryPoint, Inc., Redmond, WA (US)

(72) Inventors: David B. Boardman, Johns Island, SC (US); Jared S. Heinly, Durham, NC (US); Srinivas Kapaganty, Suwanee, GA (US); Brooke N. Steele, Ferguson, NC (US)

(73) Assignee: EveryPoint, Inc., Redmond, WA (US)

( * ) Notice: Subject to any disclaimer, the term of this patent is extended or adjusted under 35 U.S.C. 154(b) by 165 days.

(21) Appl. No.: 18/661,612

(22) Filed: May 11, 2024

(65) Prior Publication Data

US 2024/0303833 A1 Sep. 12, 2024

Related U.S. Application Data

(63) Continuation-in-part of application No. 17/591,515, filed on Feb. 2, 2022, now Pat. No. 11,989,899, which (Continued)

(51) Int. Cl.

*G06T 7/246* (2017.01)
*G06T 7/33* (2017.01)

(Continued)

(52) U.S. Cl.

CPC .............. *G06T 7/251* (2017.01); *G06T 7/344* (2017.01); *G06T 7/579* (2017.01); *G06T 7/62* (2017.01);

(Continued)

(58) Field of Classification Search

CPC ......... G06T 7/251; G06T 7/344; G06T 7/579; G06T 7/62; G06T 7/75; G06T 17/00;

(Continued)

(56) References Cited

U.S. PATENT DOCUMENTS 5,831,621 A 11/1998 Pito
6,137,577 A * 10/2000 Woodworth ........... G01B 11/00 356/628

(Continued)

FOREIGN PATENT DOCUMENTS

WO 2012/061945 A1 5/2012

OTHER PUBLICATIONS

WrÃ³Å¼yÅski et al—Ground volume assessment using âStructure from Motionâ photogrammetry with a smartphone and a compact camera—Feb. 20, 2017—De Gruyter Open (Year: 2017).*

(Continued)

*Primary Examiner* — YuJang Tswei

(74) *Attorney, Agent, or Firm* — VLP Law Group LLP; James A. D. White

(57) ABSTRACT

Techniques are described for automated analysis and use of data acquired about a moving object of interest, such as from one or more physically mounted cameras that have at least partial coverage of the object exterior, to automatically generate a computer model of the object from visual data in images and to use the computer model to automatically estimate values for one or more object attributes. For example, the described techniques may include, for a pile of material being moved past one or more stationary cameras by one or more transporting vehicles, using acquired images that provide visual coverage of only a subset of the pile's exterior to measure the volume of the pile. The images from such devices may be acquired at various times (e.g., when triggered by object movement), and may be used to monitor movement trajectories and other attributes of one or more such objects.

21 Claims, 35 Drawing Sheets

Related U.S. Application Data is a continuation-in-part of application No. 17/171,808, filed on Feb. 9, 2021, now Pat. No. 11,282,291.

(51) Int. Cl.

| | |
|---|---|
| ***G06T 7/579*** | (2017.01) |
| ***G06T 7/62*** | (2017.01) |
| ***G06T 7/73*** | (2017.01) |
| ***G06T 17/00*** | (2006.01) |
| ***G06V 10/764*** | (2022.01) |
| ***G06V 20/50*** | (2022.01) |
| ***H04N 7/18*** | (2006.01) |

(52) U.S. Cl.

CPC ................ *G06T 7/75* (2017.01); *G06T 17/00* (2013.01); *G06T 2207/10016* (2013.01); *G06T 2207/20081* (2013.01); *G06T 2207/20212* (2013.01); *G06T 2207/30241* (2013.01); *G06T 2207/30244* (2013.01); *G06V 10/764* (2022.01); *G06V 20/50* (2022.01); *H04N 7/183* (2013.01)

(58) Field of Classification Search

CPC . G06T 2207/10016; G06T 2207/20081; G06T 2207/20212; G06T 2207/30241; G06T 2207/30244; G06T 2207/10028; G06T 2207/30184; G06T 7/55; G06V 10/764; G06V 20/50; H04N 7/183

See application file for complete search history.

(56) References Cited

U.S. PATENT DOCUMENTS

| | | | | |
|---|---|---|---|---|
| 7,944,547 | B2 | 5/2011 | Wang | |
| 8,384,714 | B2 | 2/2013 | De Aguiar et al. | |
| 8,594,375 | B1 | 11/2013 | Padwick | |
| 9,196,084 | B2 | 11/2015 | Boardman et al. | |
| 9,495,764 | B1 | 11/2016 | Boardman et al. | |
| 9,648,297 | B1 * | 5/2017 | Ettinger | H04N 13/106 |
| 9,996,981 | B1 | 6/2018 | Tran et al. | |
| 10,186,049 | B1 | 1/2019 | Boardman et al. | |
| 10,282,914 | B1 | 5/2019 | Tran et al. | |
| 10,403,037 | B1 * | 9/2019 | Boardman | G06V 10/17 |
| 11,043,026 | B1 * | 6/2021 | Fathi | G06F 30/10 |
| 2002/0145607 | A1 | 10/2002 | Dimsdale | |
| 2002/0180865 | A1 | 12/2002 | Lee et al. | |
| 2002/0190982 | A1 | 12/2002 | Kotcheff et al. | |
| 2003/0218607 | A1 | 11/2003 | Baumberg | |
| 2007/0132874 | A1 | 6/2007 | Forman et al. | |
| 2007/0171220 | A1 | 7/2007 | Kriveshko | |
| 2007/0263907 | A1 | 11/2007 | McMakin et al. | |
| 2008/0031512 | A1 | 2/2008 | Mundermann et al. | |
| 2008/0100622 | A1 | 5/2008 | Gordon | |
| 2008/0180448 | A1 | 7/2008 | Anguelov et al. | |
| 2010/0074483 | A1 | 3/2010 | Janes | |
| 2011/0221936 | A1 | 9/2011 | Steinberg et al. | |
| 2012/0044247 | A1 | 2/2012 | Naimark | |
| 2012/0133665 | A1 | 5/2012 | Wexler et al. | |
| 2012/0321171 | A1 | 12/2012 | Ito et al. | |
| 2013/0002832 | A1 | 1/2013 | Lasenby et al. | |
| 2013/0027516 | A1 | 1/2013 | Hart et al. | |
| 2013/0048722 | A1 | 2/2013 | Davis et al. | |
| 2013/0060540 | A1 | 3/2013 | Frahm et al. | |
| 2013/0294667 | A1 | 11/2013 | Zheng et al. | |
| 2014/0028673 | A1 | 1/2014 | Gregson et al. | |
| 2014/0049535 | A1 | 2/2014 | Wang et al. | |
| 2015/0022640 | A1 * | 1/2015 | Metzler | H04N 13/221 348/46 |
| 2015/0262359 | A1 | 9/2015 | Fujiwara et al. | |
| 2018/0365888 | A1 | 12/2018 | Satzoda et al. | |
| 2020/0364928 | A1 * | 11/2020 | Yu | G06T 7/70 |
| 2021/0125405 | A1 | 4/2021 | Tran | |

OTHER PUBLICATIONS

Reinhard Koch, et al., "Realistic Surface Reconstruction of 3D Scenes from Uncalibrated Image Sequences," 2000, The Journal of Visualization and Computer Animation, 13 pages.

Lynx A Camera by Lynx Laboratories—Kickstarter, retrieved on Mar. 13, 2013, from http://www.kickstarter.com/projects/915328713/lynx-a-camera, 16 pages.

Lynx Laboratories, retrieved on Mar. 13, 2013, from http://lynxlaboratories.com/object.php, 4 pages.

Lynx Laboratories, retrieved on Mar. 13, 2013, from http://lynxlaboratories.com/aboutLynxA.php, 2 pages.

Wolfgang Niem, et al., "Automatic Reconstruction of 3D Objects Using a Mobile Monoscopic Camera," 1997, IEEE, 8 pages.

Stockpile Reports, "Stockpile Reports for Logistics Generates Inventory Levels From Low-Cost Fixed Cameras", Feb. 19, 2019, 3 pages.

Stockpile Reports, "Instant Measurements: Unlock Incredible Value for Your Business With This Industry-First Tech", Aug. 6, 2020, 4 pages.

Stockpile Reports, "Stockpile Reports Announces Instant Stockpile Measurements for iPhone", May 26, 2020, 4 pages.

Stockpile Reports, "The Future of Inventory is Instant and Autonomous", Apr. 23, 2020, 6 pages.

* cited by examiner

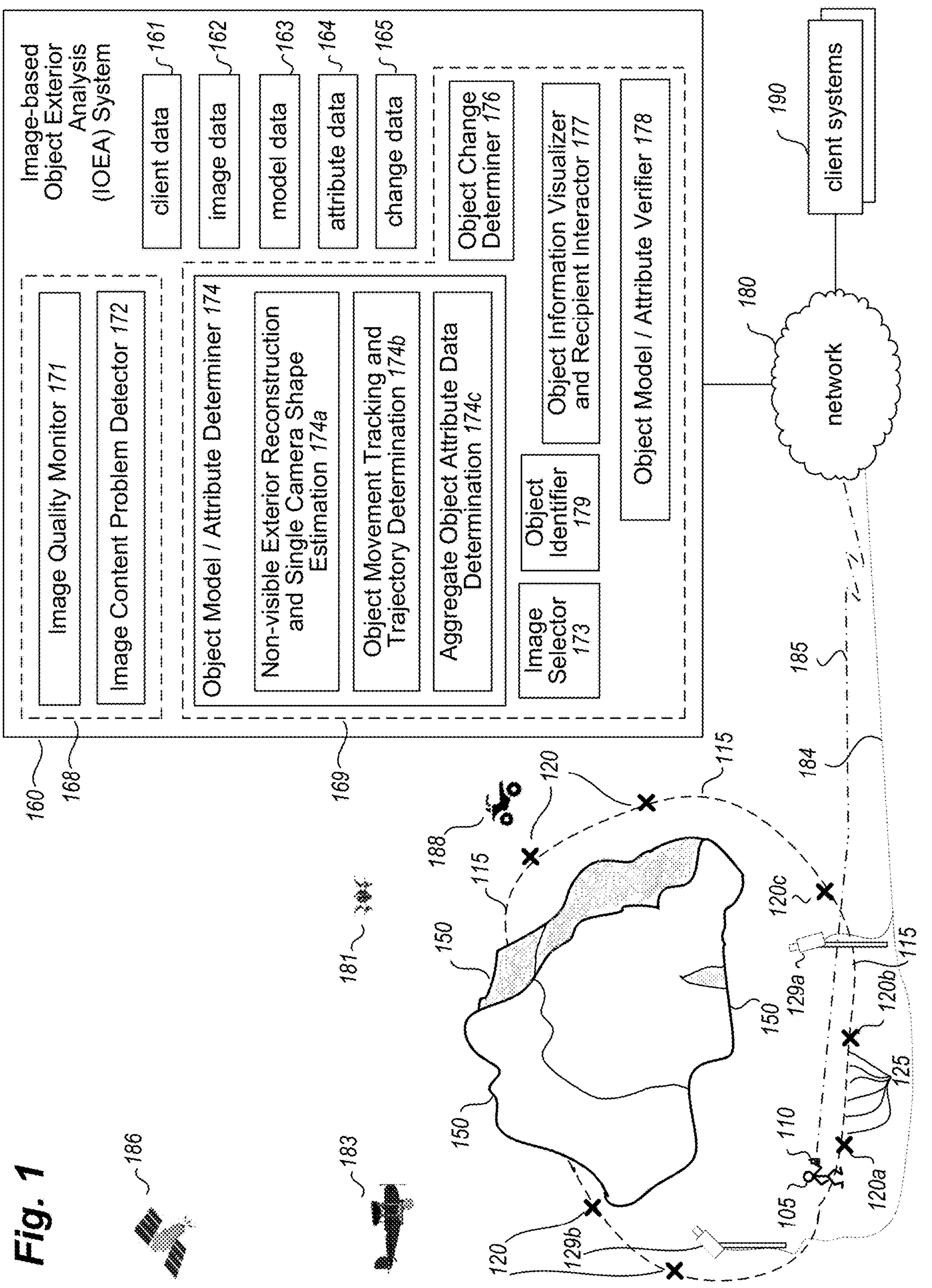

Fig. 1
Image-based Object Exterior Analysis (IOEA) System
Image Quality Monitor 171
Image Content Problem Detector 172
client data 161
image data 162
model data 163
attribute data 164
change data 165
Object Model / Attribute Determiner 174
Non-visible Exterior Reconstruction and Single Camera Shape Estimation 174a
Object Movement Tracking and Trajectory Determination 174b
Aggregate Object Attribute Data Determination 174c
Object Change Determiner 176
Image Selector 173
Object Identifier 179
Object Information Visualizer and Recipient Interactor 177
Object Model / Attribute Verifier 178
160
168
169
network
180
client systems
190
184
185
186
183
181
188
150
115
120
129b
105
110
129a
120c
120a
125
120b

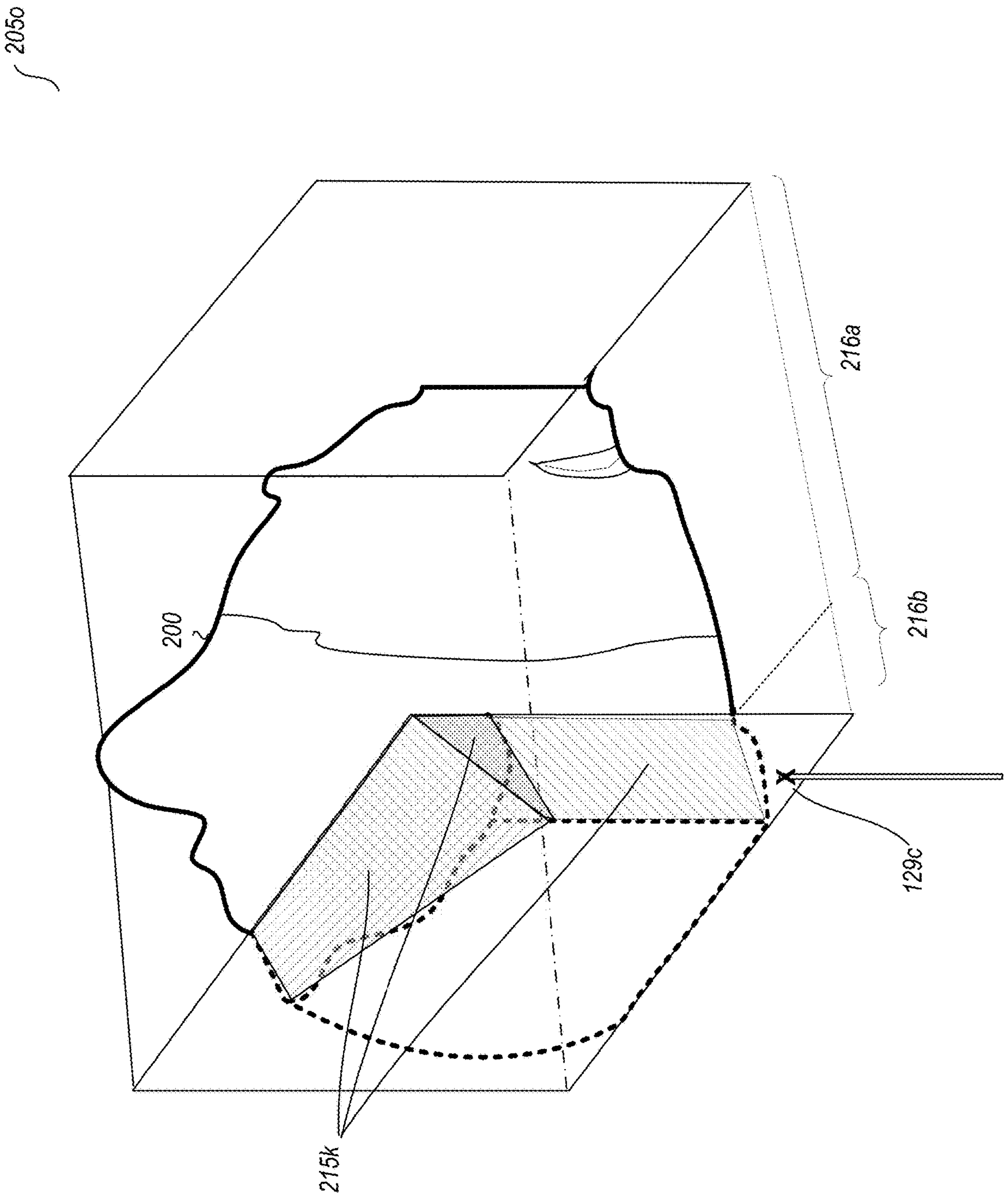
Fig. 2-O

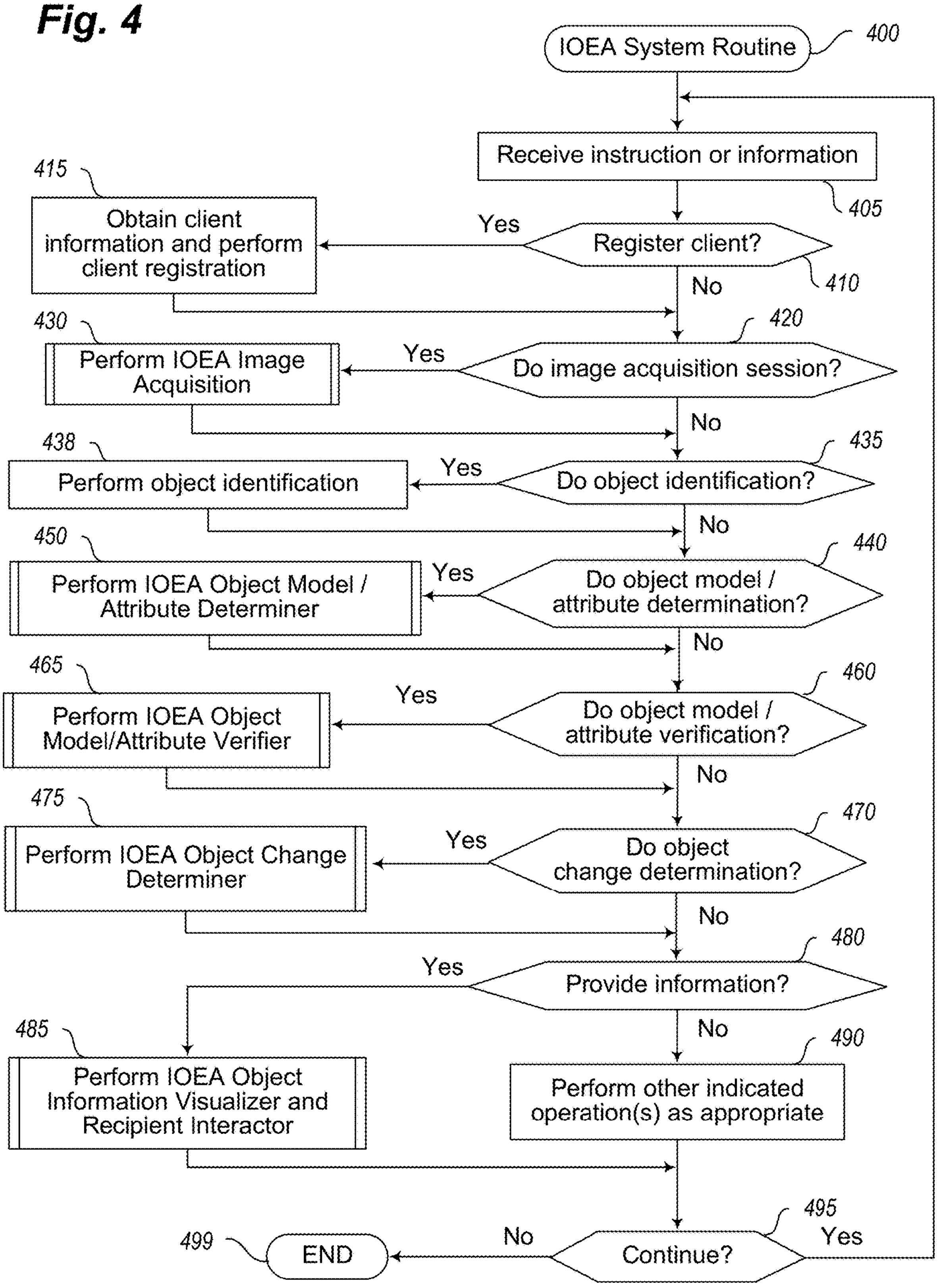

Fig. 4
IOEA System Routine
400
Receive instruction or information
405
Register client?
410
Yes
No
Obtain client information and perform client registration
415
Do image acquisition session?
420
Perform IOEA Image Acquisition
430
Do object identification?
435
Perform object identification
438
Do object model / attribute determination?
440
Perform IOEA Object Model / Attribute Determiner
450
Do object model / attribute verification?
460
Perform IOEA Object Model/Attribute Verifier
465
Do object change determination?
470
Perform IOEA Object Change Determiner
475
Provide information?
480
Perform IOEA Object Information Visualizer and Recipient Interactor
485
Perform other indicated operation(s) as appropriate
490
Continue?
495
END
499

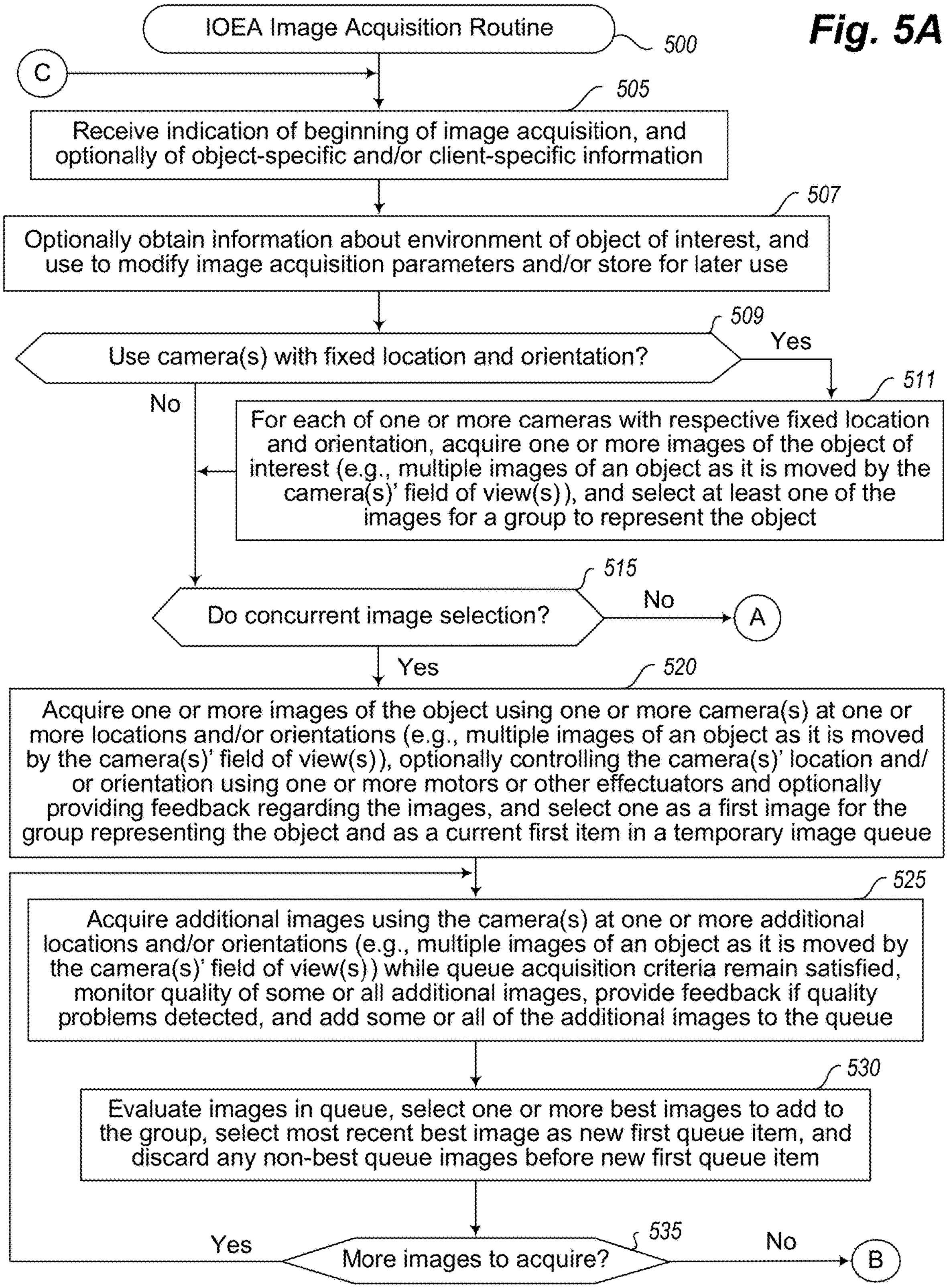

Fig. 5A
IOEA Image Acquisition Routine
500
C
505
Receive indication of beginning of image acquisition, and optionally of object-specific and/or client-specific information
507
Optionally obtain information about environment of object of interest, and use to modify image acquisition parameters and/or store for later use
509
Use camera(s) with fixed location and orientation?
Yes
No
511
For each of one or more cameras with respective fixed location and orientation, acquire one or more images of the object of interest (e.g., multiple images of an object as it is moved by the camera(s)' field of view(s)), and select at least one of the images for a group to represent the object
515
Do concurrent image selection?
No
A
Yes
520
Acquire one or more images of the object using one or more camera(s) at one or more locations and/or orientations (e.g., multiple images of an object as it is moved by the camera(s)' field of view(s)), optionally controlling the camera(s)' location and/or orientation using one or more motors or other effectuators and optionally providing feedback regarding the images, and select one as a first image for the group representing the object and as a current first item in a temporary image queue 525
Acquire additional images using the camera(s) at one or more additional locations and/or orientations (e.g., multiple images of an object as it is moved by the camera(s)' field of view(s)) while queue acquisition criteria remain satisfied, monitor quality of some or all additional images, provide feedback if quality problems detected, and add some or all of the additional images to the queue
530
Evaluate images in queue, select one or more best images to add to the group, select most recent best image as new first queue item, and discard any non-best queue images before new first queue item
535
More images to acquire?
Yes
No
B

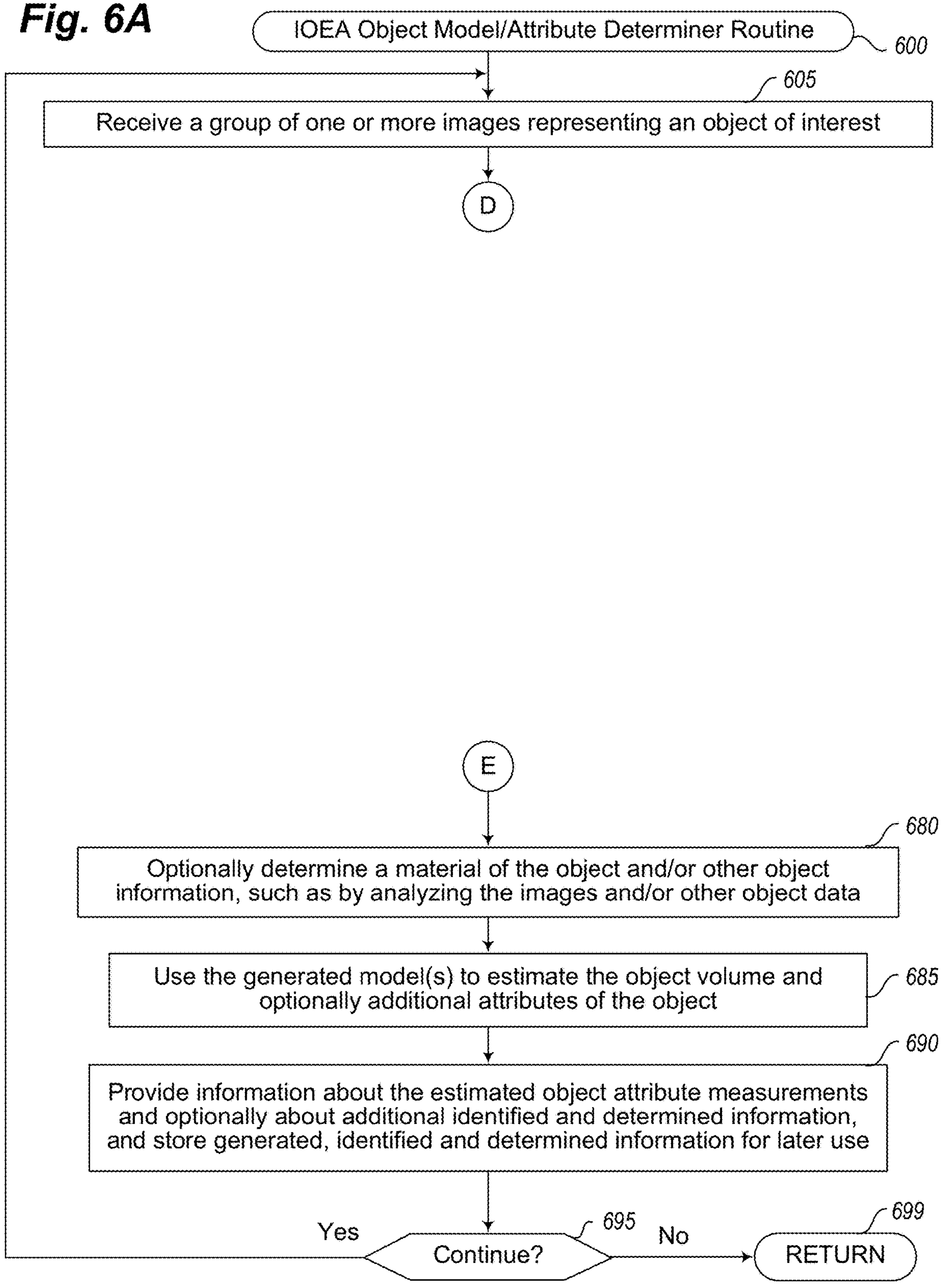

Fig. 6A
IOEA Object Model/Attribute Determiner Routine
600
605
Receive a group of one or more images representing an object of interest
D
E
680
Optionally determine a material of the object and/or other object information, such as by analyzing the images and/or other object data
685
Use the generated model(s) to estimate the object volume and optionally additional attributes of the object
690
Provide information about the estimated object attribute measurements and optionally about additional identified and determined information, and store generated, identified and determined information for later use
695
Continue?
Yes
No
699
RETURN

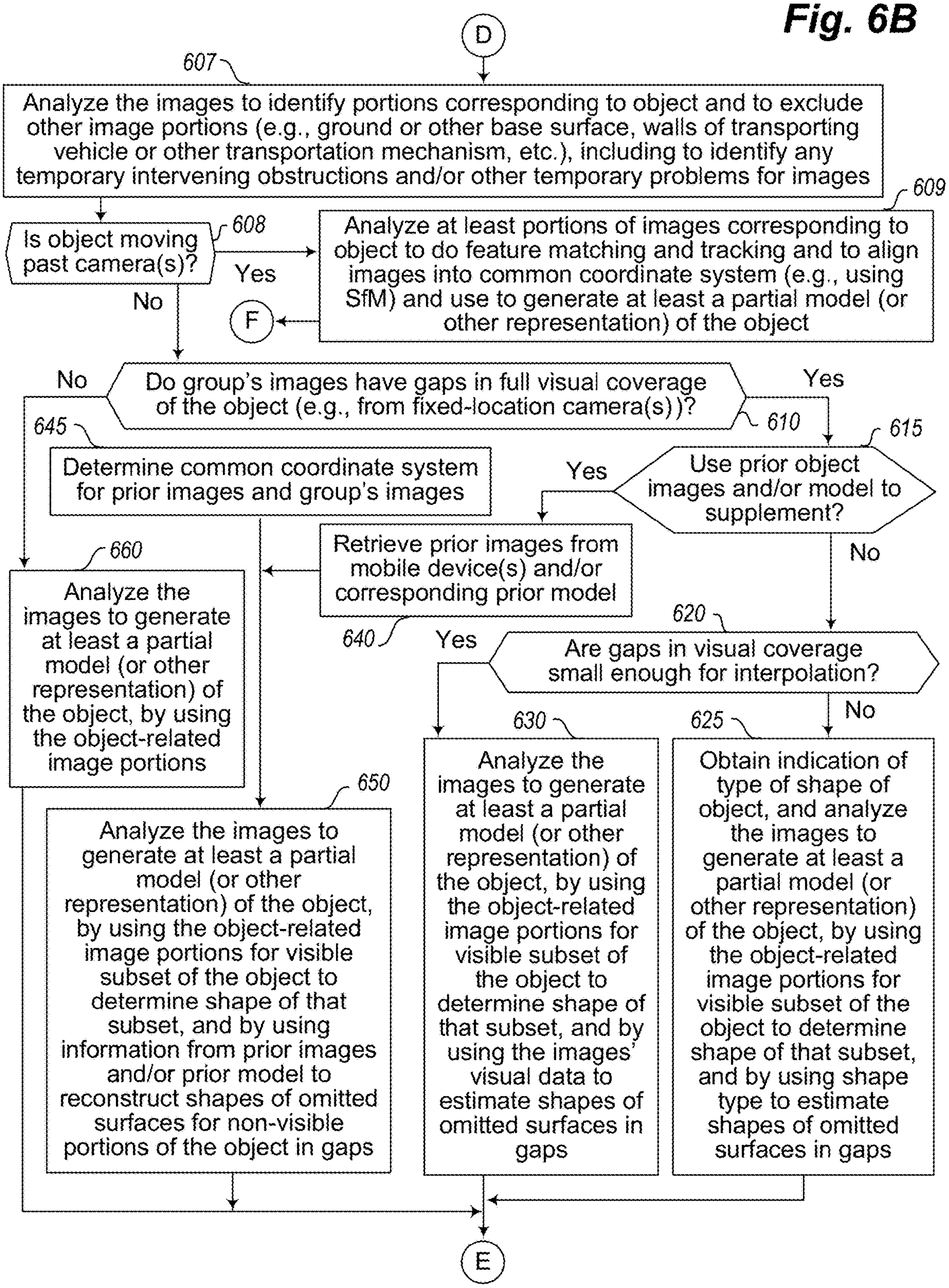

Fig. 6B
D
607
Analyze the images to identify portions corresponding to object and to exclude other image portions (e.g., ground or other base surface, walls of transporting vehicle or other transportation mechanism, etc.), including to identify any temporary intervening obstructions and/or other temporary problems for images
608
Is object moving past camera(s)?
Yes
No
609
Analyze at least portions of images corresponding to object to do feature matching and tracking and to align images into common coordinate system (e.g., using SfM) and use to generate at least a partial model (or other representation) of the object
F
No
Do group's images have gaps in full visual coverage of the object (e.g., from fixed-location camera(s))?
Yes
610
645
Determine common coordinate system for prior images and group's images
615
Yes
Use prior object images and/or model to supplement?
No
660
Analyze the images to generate at least a partial model (or other representation) of the object, by using the object-related image portions
Retrieve prior images from mobile device(s) and/or corresponding prior model
640
620
Yes
Are gaps in visual coverage small enough for interpolation?
No
650
Analyze the images to generate at least a partial model (or other representation) of the object, by using the object-related image portions for visible subset of the object to determine shape of that subset, and by using information from prior images and/or prior model to reconstruct shapes of omitted surfaces for non-visible portions of the object in gaps
630
Analyze the images to generate at least a partial model (or other representation) of the object, by using the object-related image portions for visible subset of the object to determine shape of that subset, and by using the images' visual data to estimate shapes of omitted surfaces in gaps
625
Obtain indication of type of shape of object, and analyze the images to generate at least a partial model (or other representation) of the object, by using the object-related image portions for visible subset of the object to determine shape of that subset, and by using shape type to estimate shapes of omitted surfaces in gaps
E

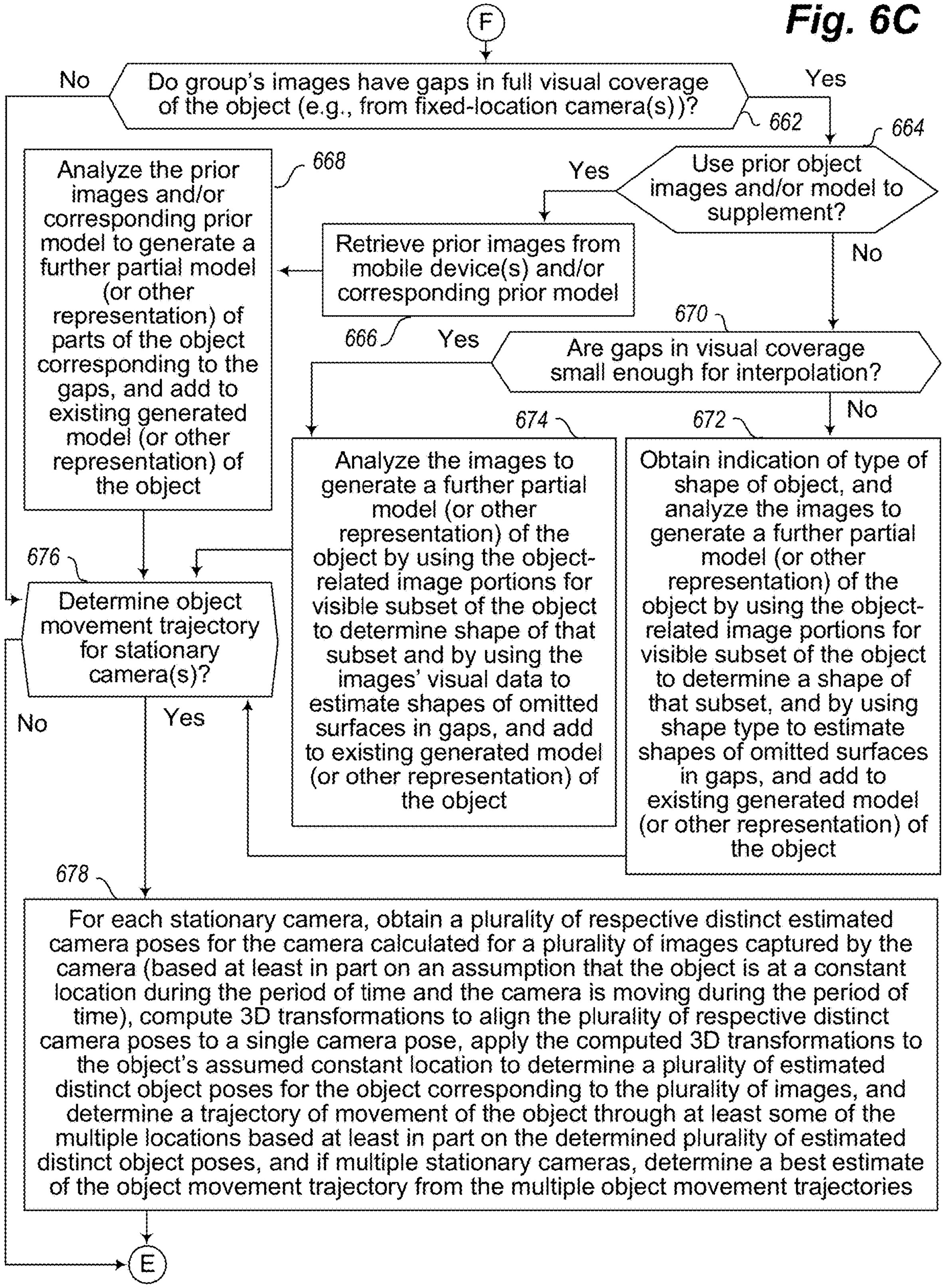

Fig. 6C
F
Do group's images have gaps in full visual coverage of the object (e.g., from fixed-location camera(s))?
No
Yes
662
664
Use prior object images and/or model to supplement?
Yes
No
668
Analyze the prior images and/or corresponding prior model to generate a further partial model (or other representation) of parts of the object corresponding to the gaps, and add to existing generated model (or other representation) of the object
Retrieve prior images from mobile device(s) and/or corresponding prior model
666
670
Are gaps in visual coverage small enough for interpolation?
Yes
No
674
672
Analyze the images to generate a further partial model (or other representation) of the object by using the object-related image portions for visible subset of the object to determine shape of that subset and by using the images' visual data to estimate shapes of omitted surfaces in gaps, and add to existing generated model (or other representation) of the object
Obtain indication of type of shape of object, and analyze the images to generate a further partial model (or other representation) of the object by using the object-related image portions for visible subset of the object to determine a shape of that subset, and by using shape type to estimate shapes of omitted surfaces in gaps, and add to existing generated model (or other representation) of the object
676
Determine object movement trajectory for stationary camera(s)?
No
Yes
678
For each stationary camera, obtain a plurality of respective distinct estimated camera poses for the camera calculated for a plurality of images captured by the camera (based at least in part on an assumption that the object is at a constant location during the period of time and the camera is moving during the period of time), compute 3D transformations to align the plurality of respective distinct camera poses to a single camera pose, apply the computed 3D transformations to the object's assumed constant location to determine a plurality of estimated distinct object poses for the object corresponding to the plurality of images, and determine a trajectory of movement of the object through at least some of the multiple locations based at least in part on the determined plurality of estimated distinct object poses, and if multiple stationary cameras, determine a best estimate of the object movement trajectory from the multiple object movement trajectories
E

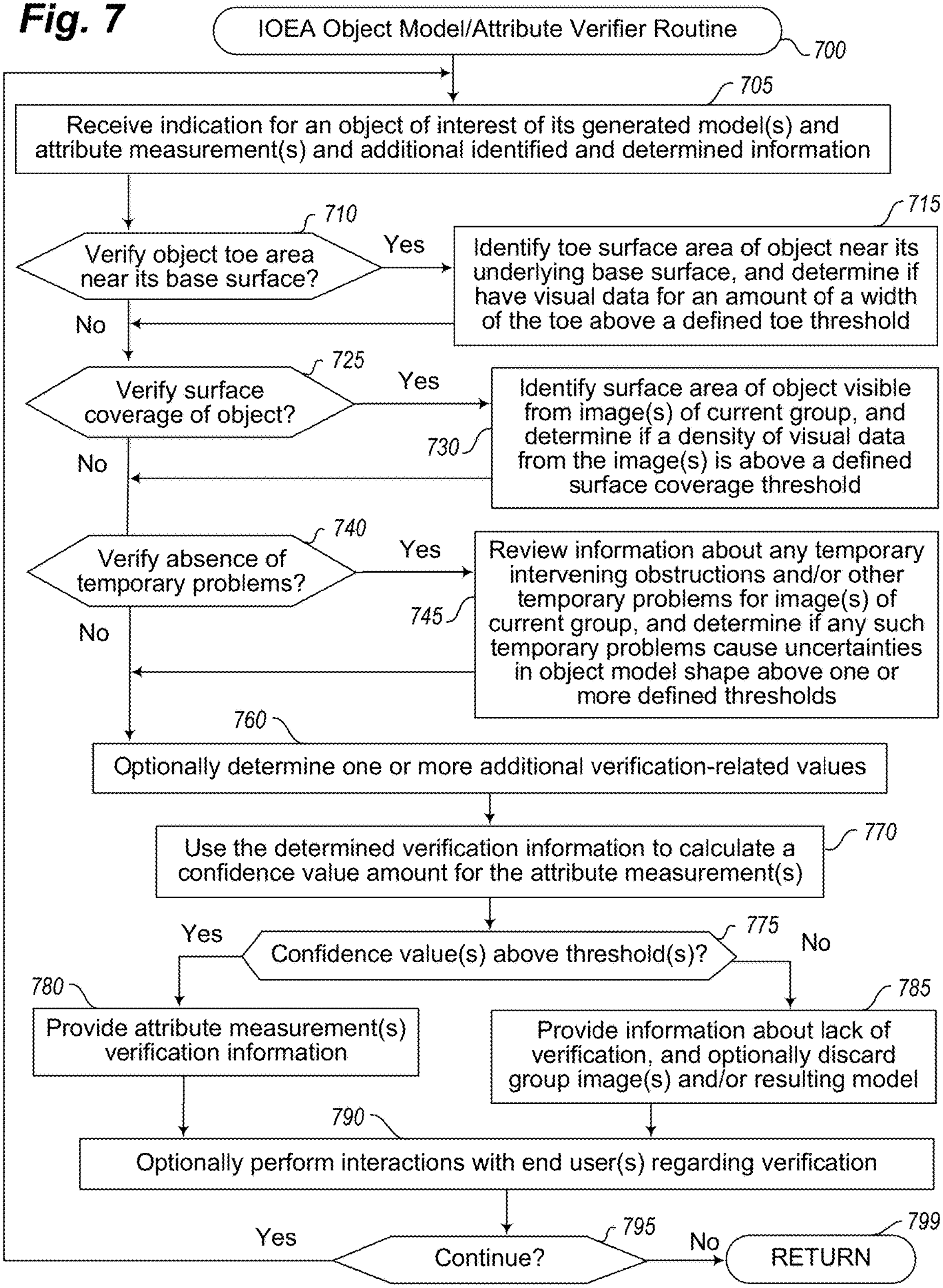

Fig. 7

IOEA Object Model/Attribute Verifier Routine 700

705 Receive indication for an object of interest of its generated model(s) and attribute measurement(s) and additional identified and determined information 710 Verify object toe area near its base surface?

Yes

715 Identify toe surface area of object near its underlying base surface, and determine if have visual data for an amount of a width of the toe above a defined toe threshold No 725 Verify surface coverage of object?

Yes

730 Identify surface area of object visible from image(s) of current group, and determine if a density of visual data from the image(s) is above a defined surface coverage threshold No 740 Verify absence of temporary problems?

Yes

745 Review information about any temporary intervening obstructions and/or other temporary problems for image(s) of current group, and determine if any such temporary problems cause uncertainties in object model shape above one or more defined thresholds No 760 Optionally determine one or more additional verification-related values 770 Use the determined verification information to calculate a confidence value amount for the attribute measurement(s)

775 Confidence value(s) above threshold(s)?

Yes

780 Provide attribute measurement(s) verification information

No

785 Provide information about lack of verification, and optionally discard group image(s) and/or resulting model 790 Optionally perform interactions with end user(s) regarding verification 795 Continue?

Yes

No

799 RETURN

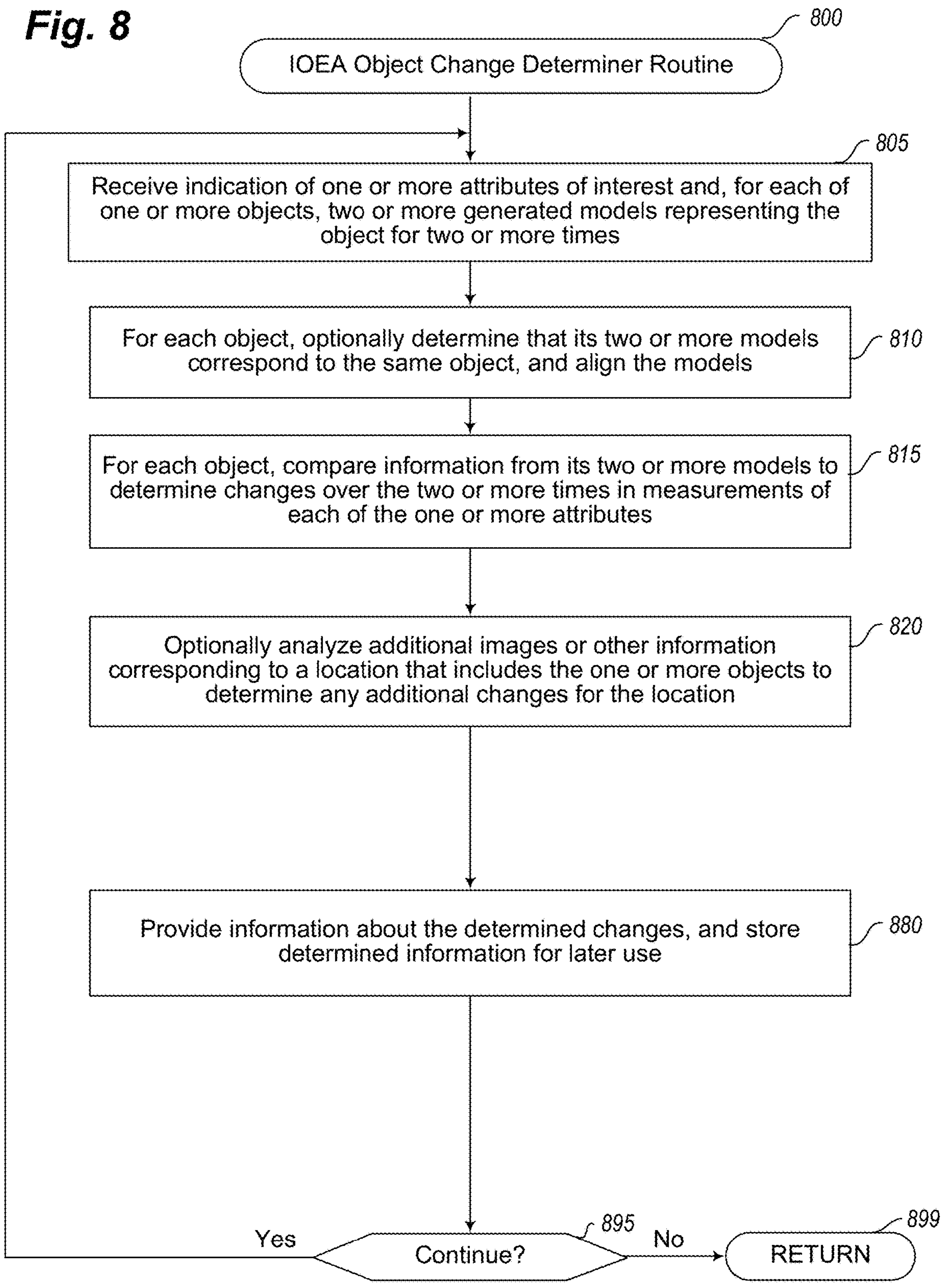

Fig. 8
800
IOEA Object Change Determiner Routine
805
Receive indication of one or more attributes of interest and, for each of one or more objects, two or more generated models representing the object for two or more times
810
For each object, optionally determine that its two or more models correspond to the same object, and align the models
815
For each object, compare information from its two or more models to determine changes over the two or more times in measurements of each of the one or more attributes
820
Optionally analyze additional images or other information corresponding to a location that includes the one or more objects to determine any additional changes for the location
880
Provide information about the determined changes, and store determined information for later use
895
Yes
Continue?
No
899
RETURN 1000-26

1100-37

*Fig. 10C*
STOCKPILE REPORTS
Reports
Dashboard
Account
Upload Imagery
Request Aerial
Dashboard
Map
Interactive 3d
Volume Fluctuation
Site Statistics
71
29
Notifications
Notification Type
Action

1100-40

1100-43

DETERMINING OBJECT STRUCTURE USING CAMERA DEVICES WITH VIEWS OF MOVING OBJECTS

CROSS-REFERENCE TO RELATED APPLICATIONS

This application is a continuation-in-part of and claims the priority benefit of co-pending U.S. patent application Ser. No. 17/591,515, filed Feb. 2, 2022 and entitled "Determining Object Structure Using Physically Mounted Devices With Only Partial View Of Object", and U.S. patent application Ser. No. 17/591,515 is a continuation-in-part of and claims the priority benefit of U.S. patent application Ser. No. 17/171,808, filed Feb. 9, 2021 and entitled "Determining Object Structure Using Fixed-Location Cameras With Only Partial View Of Object," now U.S. Pat. No. 11,282,291, all of which are hereby incorporated by reference in its entirety.

TECHNICAL FIELD

The following disclosure relates generally to techniques for analyzing and using data acquired from one or more camera devices and optionally other data-capturing devices of an exterior of an object that moves through a field of view of the device(s), such as using visual data in captured images as part of generating a computer representation of the exterior of the object (e.g., a computer model of a stockpile of material) that is only partially visible in the images, and by assessing and further using volume or other attributes of the stockpile from the model.

BACKGROUND

A variety of techniques exist to identify and measure attributes of physical objects from locations apart from them, including for man-made and naturally occurring objects in outdoors environments. Such identification and measurement techniques may, for example, use various types of specialized measurement equipment (e.g., rangefinders, radar, lidar, sonar, 3D scanners, theodolites, etc.). However, such techniques have various problems, including that the specialized measurement equipment may be expensive and/or difficult to use, and that some types of object attributes are difficult to measure. In addition, while commercially available camera devices are becoming increasingly inexpensive, such devices do not typically include specialized or dedicated measurement equipment to identify and measure various attributes of physical objects.

BRIEF DESCRIPTION OF THE DRAWINGS

FIG. 1 is a network diagram illustrating an example embodiment of using described techniques to acquire images of a stockpile object via one or more cameras and to analyze the acquired images to assess volume and other attributes of the object.

FIG. 4 is an example flow diagram of an illustrated embodiment of an Image-based Object Exterior Analysis (IOEA) System routine.

FIGS. 5A-5B are an example flow diagram of an illustrated embodiment of an IOEA Image Acquisition routine.

FIGS. 6A-6C are an example flow diagram of an illustrated embodiment of an IOEA Object Model/Attribute Determination routine.

FIG. 7 is an example flow diagram of an illustrated embodiment of an IOEA Object Model/Attribute Verification routine.

FIG. 8 is an example flow diagram of an illustrated embodiment of an IOEA Object Change Determination routine.

DETAILED DESCRIPTION

Figure 2A:
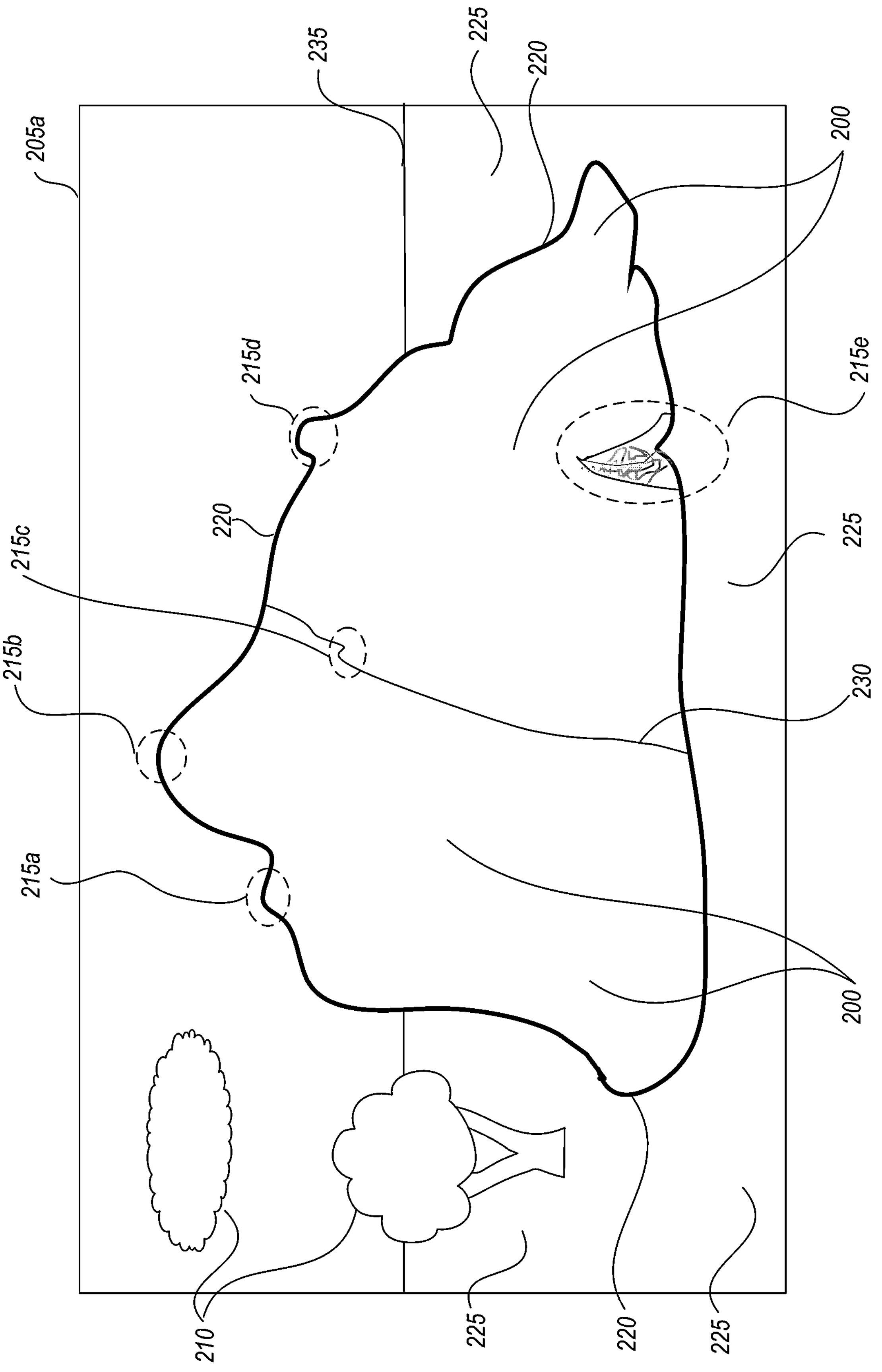
FIGS. 2A-2T illustrate examples of acquiring images of an object via one or more cameras, selecting acquired images to further use, and analyzing the acquired images to assess measurements of volume and/or other attributes of the object and to perform further automated verification activities.

Techniques are described for automated analysis and use of images of objects, such as for human-constructed objects at locations in outdoor environments and having sizes at large scales (e.g., significantly larger than humans), and including to automatically generate computer models of one or more such objects from visual data included in the images and to use the computer models to automatically determine measurements for one or more attributes of the object(s)—in addition, in at least some embodiments, some or all of the camera devices used to acquire the images of an object are one or more cameras that are each installed or otherwise physically mounted in at least one specific location (e.g., a stationary security camera affixed at a fixed location and fixed orientation to a wall or a pole or other structure, a camera mounted to a structure that is attached to a cable and is moveable among multiple contiguous locations along the cable, etc.) near the object and together provide visual coverage of only a subset of the object's exterior. As one non-exclusive example, the described techniques may in some embodiments be used to measure the volume of an outdoors pile of material (e.g., a stockpile of construction aggregate, such as sand, gravel, crushed stone, etc.) on the ground (or other underlying surface), based on images acquired by one or more stationary fixed-location cameras each having a fixed orientation and optionally physical zoom capabilities with a partial field-of-view including one or more sides of the pile and that provide visual coverage of only a subset of the pile exterior, although other embodiments may be performed for other types of objects, and/or for other types of attributes, and/or other types of physically mounted cameras (e.g., one or more fixed-location cameras with variable orientations each having one or more associated motors used to adjust the orientation of that camera, also referred to at times herein as a "pan/tilt camera", and optionally also having physical zoom capabilities, also referred to at times herein as a "pan/tilt/zoom camera"; one or more cameras each mounted to a structure that is attached to at least one cable and is moveable among multiple contiguous locations along the cable(s) by one or more associated motors, also referred to at times herein as a "cable-mounted camera", and optionally also having physical zoom capabilities and/or variable orientation that is controllable by one or more additional cameras; etc.). In some such embodiments, additional images may be acquired once or occasionally via one or more additional mobile camera devices that are moved around some or all of the pile or other object (e.g., carried by a human user as he or she passes around some or all of the pile or other object) and analyzed in similar manners, such as in combination with other images acquired from one or more physically mounted cameras at other times, although other embodiments may instead use only one or more physically mounted cameras and/or other types of devices to capture images, as discussed further below. The determination of object volume and/or other object attribute values may be performed in various manners in various embodiments, including to generate a 3D (three-dimensional) computer model of the object (e.g., of a shape of the surface of the object) from visual data of the acquired images, and perform various types of manipulations and/or analyses of the generated computer model. Additional details related to acquiring and analyzing such images and generating and using resulting computer models are described below, and some or all of the described techniques are performed in at least some embodiments by automated operations of an Image-based Object Exterior Analysis ("IOEA") system.

As noted above, in at least some embodiments, after a group of one or more images to represent an object at a given time has been acquired from one or more fixed-location or otherwise physically mounted cameras, automated operations are performed without human intervention by one or more modules of the IOEA system (e.g., one or more IOEA system object model/attribute determination and verification modules that execute as part of a software application on one or more server computing systems) to analyze those images in the group and to generate a 3D computer model of the object at that given time based on the visual data of those images and to optionally verify the generated 3D computer model (e.g., to verify the validity of the 3D computer model, such as based at least in part on verifying its underlying source data), as well as to use the 3D computer model to estimate a volume of the object at that given time and/or to determine one or more other attributes of the object at that given time, and to report or otherwise provide information about the verified 3D computer model (e.g., about estimated volume and/or other determined attributes). As part of those automated model generation and verification and usage operations, various automated activities may be performed without human intervention in at least some such embodiments to assist in the process, such as to automatically generate a 3D computer model from the visual data of one or more images and/or to automatically verify the generated 3D computer model-such automated activities may include, for example, one or more of the following activities: to automatically verify the sufficiency of the visual data that is acquired in one or more images at a given time about the object's exterior surface; to automatically verify that temporary problems do not exist with one or more images acquired at a given time about the object's exterior surface that introduce excessive uncertainty in the shape of the object's exterior, such as based on one or more of image quality problems and/or intervening objects and/or camera orientation problems; to automatically predict or otherwise estimate shapes of subsets of the object's exterior surface at that given time that are not visible in the one or more acquired images (referred to at times herein as "omitted surfaces" of the object's exterior), including for subsets of the object's exterior surface that are not accessible to the camera(a) and/or that are temporarily blocked by one or more intervening people or vehicles or structures or other objects; to automatically verify that an orientation of a camera is correct, such as by the determined orientation differing from a predefined target orientation by at most a defined orientation deviation threshold, and with the camera orientation being determined based on at least one of analysis of data from one or more accelerometers on or near a camera, analysis of visual data from one or more images to identify a location of a known control point on or near a pile of interest, analysis of visual data from multiple images to identify whether a location of a selected feature on or near a pile has changed, analysis of multiple images by a trained machine learning module, etc.; to automatically use additional sensor data in combination with visual data of captured images, such as depth data acquired by one or more depth-sensing devices with corresponding sensors; to automatically verify a newly generated 3D computer model of a pile relative to one or more previously generated 3D computer models of that pile, such as to validate that changes in pixel values of one or more images of a pile used for a newly generated 3D computer model relative to pixel values of one or more prior images of the pile do not exceed one or more defined pixel change thresholds; to automatically verify a newly generated 3D computer model of a pile relative to one or more previously generated 3D computer models of that pile, such as to validate that changes from a prior 3D computer model do not exceed one or more defined pile exterior change thresholds based on analysis of the multiple 3D computer models by a trained machine learning module; to automatically determine one or more attributes (e.g., volume) of a modeled pile of material via analysis of a corresponding generated 3D computer model; to automatically provide information about a generated 3D computer model and/or its corresponding determined attributes, etc., as discussed in greater detail below. The generated computer model may, for example, be one or more of the following: a 3D point cloud model with numerous individual 3D data points; a polygon mesh model or other object surface models (e.g., based on piecewise planar functions, collections of triangles, meshes, non-uniform rational B-splines (NURBS), T-Splines, or other curved representations of surface topology) or other solid models; a 2.5D representation; optionally a bare earth model; etc. In addition, the object attributes may include one or more of the following: volume, surface area, height (e.g., maximum height, an average height, etc.), length (e.g., maximum length along a longest identified radial axis, average length in one or more directions, etc.), width (e.g., maximum width along a radial axis perpendicular to the longest identified radial axis in the x-y plane, average width in one or more directions, etc.), weight (e.g., based on volume and a unit weight for a specified amount of a determined material for the object), density, radioactivity (e.g., based on volume and a unit radioactivity for a specified amount of a determined material for the object), temperature, water content or other moisture content, monetary value or cost (e.g., based on volume and a unit value/cost for a specified amount of a determined material for the object), etc., and the determination of object attributes may further include, for example, one or more of the following: determining contour lines for the object surface and otherwise identify surface attributes; determining a type and/or class of material of the object; determining color information and/or other surface feature information (and to optionally modify one or more generated models to include and display such information); etc. Additional details are included below related to automated operations of the IOEA system for generating computer models of objects and using the models to determine object attributes.

In addition, the automated operations of the IOEA system to acquire such images of an object and/or to analyze those images to model the object and its attributes may be initiated in various manners at various times. For example, in at least some embodiments, one or more triggering conditions may be defined and, when corresponding triggering events occur, used to automatically and without human intervention initiate the acquisition of images of an object from one or more fixed-location or otherwise physically mounted cameras and/or to initiate an object model generation and verification and usage process using images from such camera(s) (e.g., using concurrently acquired images and/or a most recent set of previously acquired images), such as one or more of the following non-exclusive list: a change in an environment around the object of a defined type, such as a detection of movement at or near the object (e.g., to potentially reflect changes to the surface of the object, such as material being added, removed or otherwise moved), a defined type of change in the amount of lighting (e.g., to reach a minimum amount of lighting needed for acquisition of desired visual data for the images, such as based on ISO exposure values or other lighting amount measures), etc.; an expiration of a timer since a prior image acquisition, or otherwise reaching a scheduled acquisition time; etc. In addition, in at least some embodiments, the performance of image acquisition and/or a model generation and verification and usage process may be performed dynamically in response to a request received from an end-user and/or another software system, such as to acquire images and generate a corresponding object model and determine one or more object attributes from the model to use in providing response information to the request, such as in a real-time or near-real-time manner (e.g., within seconds or minutes of the request) to enable monitoring of current status of the object. Additional details are included below related to automated operations of the IOEA system for initiating the acquisition of images of an object and/or an object model generation and usage process.

As noted above, automated activities of the IOEA system may be performed in at least some embodiments to verify the sufficiency of the visual data that is acquired in one or more images at a given time about an object's exterior surface from one or more fixed-location or otherwise physically mounted cameras, such as to provide a level or degree of confidence in a resulting generated computer model and/or in attributes of the object determined from such a computer model, or in some cases to determine to not use such images and/or a resulting computer model if the sufficiency is not verified (e.g., if the level or degree of confidence is below one or more threshold amounts). As one non-exclusive example, a degree of confidence in the completeness and accuracy of an object's computer model that is generated using one or more images acquired at a given time may be automatically determined in some embodiments by assessing a density of data points (e.g., 3D data points, such as in a 3D point cloud) representing at least some of the object's surface area that are available from the visual data of the one or more images of the object acquired at the given time (rather than, for example, from interpolation or other prediction or estimation), and determining if the assessed density amount(s) satisfy one or more first defined model surface coverage thresholds—the assessed density may, for example, be an average density for some or all of the subset of the object's exterior that is visible from one or more fixed-location or otherwise physically mounted cameras. As another non-exclusive example, a degree of confidence in the boundary between the object and its underlying surface and in the accuracy and completeness of a corresponding computer model that is generated using one or more images acquired at a given time may be automatically determined in some embodiments by identifying a portion of the object's surface that is at or near the 'toe' of the object just above the ground or other underlying surface on which the object sits (e.g., identifying a horizontal strip of the object's surface that is proximate to the underlying surface, such as within a defined distance above the underlying surface) and that stretches across the width of the subset of the object's exterior visible from one or more fixed-location or otherwise physically mounted cameras, and determining if data points available from the visual data of the one or more images cover a horizontal amount of the strip that satisfies one or more second defined model toe thresholds.

In addition, automated verification activities by the IOEA system may in at least some embodiments include verifying, for one or more images acquired from one or more fixed-location or otherwise physically mounted cameras at a given time about an object's exterior surface, and by applying one or more defined verification tests, that temporary problems do not exist in the visual contents of the images that cause excessive uncertainty in the shape of the object's exterior, such as by identifying and in some situations ameliorating any such temporary problems, or in some cases to determine to not use such images and/or a resulting computer model if the temporary problems exist and are not ameliorated (e.g., if a level or degree of uncertainty in the resulting computer model is above one or more shape uncertainty threshold amounts). As one non-exclusive example, a type of verification test that may be performed in some embodiments includes automatically analyzing acquired images of an object to determine if one or more obstructions are temporarily present between the fixed-location or otherwise physically mounted camera(s) and the object, such as by identifying intervening elements such as vehicles or other equipment, structures (whether temporary or permanent), people, animals, dust, fog, vegetation or other extraneous materials on the object surface, water or other materials (e.g., snow, ice, leaves, vegetation, etc.) at the boundary of the object toe and underlying surface, parts of one or more other objects, etc., and if so whether an amount (e.g., a percentage) of the subset of the object exterior that would otherwise be visible from the camera(s) and is blocked by the obstruction(s) exceeds one or more defined obstruction thresholds-if so, the automated operations may include determining to not use such images and/or a resulting computer model, or to instead replacing some or all of the blocked parts of the object surface area with other estimated shape data (e.g., to exclude the shape and/or volume of an intervening object from the 3D computer model of the pile, and to predict the shape of the omitted surfaces of the pile that are obscured by the intervening object), as discussed in greater detail below. As another non-exclusive example, a type of verification test that may be performed in some embodiments includes automatically analyzing acquired images of an object to determine if the visual contents have quality problems, such as blurring, warping, skew, wobble, spatial aliasing, excessive or insufficient contrast, an excessive or insufficient amount of lighting (e.g., as measured by one or more ISO exposure values), and/or other distortions or deformations, such as from one or more of rolling shutter problems, camera vibration (e.g., from wind, earth movement, etc.), lighting or other environmental conditions, etc.—if so, the automated operations may include assessing an amount of the quality problems and whether that amount exceeds one or more defined content quality thresholds, and determining to not use such images and/or a resulting computer model if the threshold(s) are exceeded, as discussed in greater detail below. As yet another non-exclusive example, a type of verification test that may be performed in some embodiments includes automatically verifying that an orientation of a camera is correct, such as by the determined orientation differing from a predefined target orientation by at most a defined orientation deviation threshold, and if so, the automated operations may include automatically correcting the orientation of such a camera (e.g., via corresponding control instructions sent to one or more associated motors) before capturing images and/or determining to not use images from such a camera and/or a resulting computer model if the threshold(s) are exceeded, as discussed in greater detail below—in such embodiments, the camera orientation may be automatically determined based on at least one of the following: analysis of data from one or more accelerometers on or near a camera, such as to determine the direction of gravity; analysis of visual data from one or more images to identify a location of a known control point on or near a pile of interest, such as whether it has changed from a defined location (e.g., a location in a prior image with a known correct orientation); analysis of visual data from multiple images to identify whether a location of a selected feature on or near a pile has changed, such as by using a prior image with a known correct orientation; analysis of multiple images by a trained machine learning module, such as to determine whether a current image sufficiently matches a prior image with a known correct orientation; etc. As another non-exclusive example, a type of verification test that may be performed in some embodiments includes automatically verifying a first generated 3D computer model of a pile relative to one or more other second generated 3D computer models of that pile, such as whether differences between the first and second computer model exceed one or more defined pile exterior change thresholds and/or defined pixel change thresholds, and in some cases based at least in part on analysis of images used for the generation of those computer models, and with the automated operations optionally including determining to not use such images and/or resulting computer model(s) if the threshold(s) are exceeded, as discussed in greater detail below—in such embodiments, the difference determinations may be automatically determined based on at least one of the following: differences in pixel values of one or more images of a pile used for a first generated 3D computer model relative to pixel values of one or more other images of the pile for one or more other second generated 3D computer models do not exceed one or more defined pixel change thresholds; differences in surfaces and/or shapes between a first generated 3D computer model of a pile relative to one or more other second generated 3D computer models of the pile based on an analysis by a trained machine learning module; etc. Various thresholds for such applied verification tests may further be used in embodiments and situations, such as based on a pile, a site with one or more piles, a camera in use, environmental conditions, a user or client, etc.

Such various automated verification techniques may be used together in any combination or alone, and in some embodiments may be performed before completing an automated determination of volume and/or other attributes from the computer model (e.g., as part of attempting to determine attributes that satisfy one or more specified verification criteria). Additional details are included below related to automated operations of the IOEA system for verifying the sufficiency of the data that is acquired in one or more images at a given time about an object's exterior surface and for verifying that temporary problems do not exist in the contents of one or more acquired images at a given time about an object's exterior surface that cause excessive uncertainty in the shape of the object's exterior.

As noted above, automated activities of the IOEA system may be performed in at least some embodiments to, as part of analyzing one or more images of an object at a given time from one or more fixed-location or otherwise physically mounted cameras and generating a 3D computer model of the object at that given time based on the visual data of those images, further predict or otherwise estimate shapes of omitted surface subsets of the object's exterior surface at that given time that are not visible in the one or more images. As one non-exclusive example, if visual data is available in the acquired image(s) at a given time for some or all of an area around an omitted surface (e.g., for an omitted surface caused by a temporary obstruction, for an omitted surface caused by a bunker or other wall that is part of an enclosure on one or more sides of the object, etc., and for at least a percentage or other determined amount of the surrounding area with visual data that satisfies one or more shape estimation thresholds), a shape of the omitted surface may be extrapolated and/or interpolated from the available visual data, such as by fitting a flat surface or regular curved surface to the omitted surface. As another non-exclusive example, if the visual data of image(s) acquired at a given time from one or more fixed-location or otherwise physically mounted cameras on one side of an object creates an omitted surface corresponding to some or all of a backside or adjacent sides of the object relative to the position(s) of the camera(s), a shape of the backside and/or adjacent sides may be predicted by one or more of the following: estimating a slope of the backside and/or adjacent sides from a ridgeline or other top of the object that is shown in the visual data and generating the estimated shape using the estimated slope; using a predicted or provided type of object shape (e.g., conical, rectangular, etc.) and fitting the shape type to the visual data; using a shape of one or more walls or other things that constrict the backside and/or adjacent sides of the object to estimate the shape of one or more corresponding omitted surfaces in contact with those walls or other things; using a prior computer model and/or corresponding prior images from an earlier time before the given time that have visual data for an omitted surface (e.g., from one or more mobile camera devices that moved to locations with visual coverage of some or all of the backside and/or adjacent sides relative to the fixed-location or otherwise physically mounted camera positions) to estimate a current shape of the omitted surface, such as by fitting the prior shape data to current available object shape information; etc. Additional details are included below related to automated operations of the IOEA system for predicting or otherwise estimating shapes of omitted surface subsets of the object's exterior surface at a given time that are not visible in the image(s) acquired at that given time.

In addition, automated activities by the IOEA system to use multiple images together to model an object for a given time may in at least some embodiments include performing automated operations to align the visual data of the multiple images, such as to automatically determine a common coordinate system in which to position the visual data of the multiple images—the multiple images may, for example, be one or more of the following: multiple images acquired at the given time from multiple fixed-location or otherwise physically mounted cameras; one or more images acquired at the given time from one or more fixed-location or otherwise physically mounted cameras and one or more additional images acquired at the given time from one or more mobile cameras at one or more locations; one or more images acquired at the given time from one or more fixed-location or otherwise physically mounted cameras and one or more further images acquired at an earlier time from one or more mobile cameras at one or more locations; etc. As part of the automated operations to align the visual data of the multiple images, a camera 'pose' (or location in 3D space, and orientation in three dimensions at that 3D location) may be determined for each of the fixed-location or otherwise physically mounted cameras and/or mobile cameras that provide at least one of the images, and used in the determination of the common coordinate system for the images from those multiple cameras. Such alignment operations may be performed in various manners in various embodiments, including using one or more of the following non-exclusive list: doing 2D feature matching between the visual contents of two images, and doing feature tracking that includes identifying relative locations and orientations of features that are visible in both images to determine an aggregate location and orientation translation between the visual contents of the two images; doing whole-image alignment between two images, to identify an overall location and orientation translation between the visual contents of the two images; doing matching of one or more known control points in the 3D environment that are visible in two images (e.g., signs; structural features, such as tops or ends or corners of one or more walls; etc.), and identifying relative locations and orientations of such control points that are visible in both images to determine an aggregate location and orientation translation between the visual contents of the two images; etc. In addition, automated activities by the IOEA system to model an object for a given time may further include one or more additional types of sensor data in combination with visual data from one or more images, such as depth data acquired by one or more depth-sensing devices with corresponding sensors-if so, analogous automated activities may be used to align such additional types of sensor data with visual data in a common coordinate system, and to use such additional types of sensor data in generating a corresponding 3D computer model of the object. Additional details are included below related to automated operations of the IOEA system for performing automated operations to align the visual data of multiple images acquired from multiple cameras, including to determine a camera pose for each of the multiple cameras.

The IOEA system may perform further automated operations in at least some embodiments to assist in the analysis of images at a given time of an object to generate a 3D computer model of the object. As one non-exclusive example, the acquisition of images at a given time of an object by a fixed-location or otherwise physically mounted camera may include capturing multiple images or other separate sets of visual data simultaneously or in rapid succession, such as multiple images using different exposures and/or other imaging settings, one or more HDR (high dynamic range) images that provide visual data over an extended luminosity range, etc.—if so, information from the multiple images or other visual data sets may be used to improve the visual data in the images of a group that are used for the analysis activities, such as to select one or more 'best' images or visual data sets to use in the group (e.g., that satisfy one or more specified criteria), to blend or otherwise combine visual data from multiple images or visual data sets to use in the group, etc. As another non-exclusive example in which one or more images of an object are acquired at given times from one or more fixed-location or otherwise physically mounted cameras and used to generate computer models of the object for each of those given times, optionally after a prior initial set of additional images are captured at an earlier time before the given times using one or more mobile cameras (e.g., to capture a 'backside' of the object relative to the positions of the fixed-location or otherwise physically mounted camera(s), or to otherwise capture portions of the object's surface that are not visible from the fixed-location or otherwise physically mounted camera(s)), the automated operations of the IOEA system may further include capturing additional images of the object at one or more later times after the given times (e.g., once, periodically, occasionally, upon request, etc.) and using visual data from the additional images to assist in subsequent modeling of the object at the later time(s) together with images acquired from the fixed-location or otherwise physically mounted camera(s), such as to combine visual data in the additional images of portions of the object's surface that are not visible from the fixed-location or otherwise physically mounted camera(s) together with other visual data in images from the fixed-location or otherwise physically mounted camera(s) acquired at the later time(s). Additional details are included below related to IOEA system automated operations for performing further automated operations of these and other types.

The IOEA system may perform further automated operations in at least some embodiments to assist in the analysis of images of an object to generate a 3D computer model of the object in which the object is moving through or past or by one or more locations of one or more camera devices (e.g., are within a field of view of at least one camera device), such as if the object is being moved by one or more transporting vehicles or other transport mechanism(s), or is otherwise moving of its own volition (e.g., if the object is a powered vehicle or otherwise has wheels, is falling or sliding or floating on a current, etc.). Non-exclusive examples of such transporting vehicles and other transport mechanisms include the following: a train car, such as a hopper car or gondola car or coil car or other car with one or more sides but no top around an area in which one or more objects are placed, or a flatcar without any sides or a top around an area in which one or more objects are placed; a boat, such as a barge or a cargo ship without sides or a top around an area in which one or more objects are placed, or a cargo ship with an open hold that does have with one or more sides but no top around an area in which one or more objects are placed; a truck (optionally with one or more trailers), such as a dump truck or box truck or open-top trailer or other truck or trailer with one or more sides but no top around an area in which one or more objects are placed, or a flatbed trailer or truck without any sides or a top around an area in which one or more objects are placed; a vehicle and/or mechanism that lifts and/or carries one or more objects, such as a forklift or a crane or a dolly or a trolly or wagon or a conveyor belt; etc. Non-exclusive examples of such objects include one or more material piles, one or more boxes, one or more bags, one or more pallets loaded with one or more other objects, one or more storage containers or other containers (optionally loaded with one or more other objects), one or more vehicles (optionally loaded with one or more other objects), etc., with one or more such objects being enclosed in some embodiments and situations (e.g., carried within a net, included within a storage container, etc.) while being moved, and in some situations including wheels and optionally motors (e.g., a wheeled pallet). In such embodiments in which one or more objects to be tracked are moving, the one or more cameras may be stationary cameras with fixed locations and fixed orientations, and/or other physically mounted cameras that have fixed locations but variable orientations or that have a limited range of multiple locations (e.g., cable-mounted cameras) and optionally variable orientations, and/or other mobile cameras. In such embodiments, a computer model of a moving object may be generated in an analogous manner to that discussed for fixed-location objects, as discussed further below, and additional types of functionality of one or more types may be provided by the IOEA system in at least some embodiments, with non-exclusive examples of such additional functionality types including the following: determining and providing the trajectory of movement of an object over a period of time, such as some or all of the time during which the object is moving within the field-of-view of one or more cameras; determining aggregate information for multiple objects that move past one or more cameras during one or more periods of time, such as a cumulative or total quantity of all objects and/or of each of one or more identified types of objects, a cumulative and/or average amount of one or more attribute values for the multiple objects (e.g., volume) of all objects and/or of each of one or more identified types of objects, an identification of particular object instances (e.g., based on bar codes or serial numbers or registration numbers or license plates or other visible unique identifiers), etc. Additional details are included below regarding IOEA system operations for providing functionality associated with one or more moving objects.

The described techniques provide various benefits in various embodiments, including to allow moving objects and/or objects whose shape changes over time to be automatically monitored using fixed-location or otherwise physically mounted cameras whose visual coverage includes a subset of the objects' exteriors, such as to automatically trigger new image acquisition upon detection of a moving object and/or changes in an environment of the object and/or upon a received request, and to automatically generate and verify a corresponding computer model of the object that is used to provide current attribute information about the object (e.g., in a real-time or near-real-time manner with respect to the triggering and/or request), and to automatically perform reporting or other providing of information (e.g., via one or more electronic transmissions or other electronic communications to one or more client devices) about the computer model and/or corresponding attribute information. The use of such fixed-location or otherwise physically mounted cameras may enable more ubiquitous placement of cameras to observe such objects whose shape changes over time and/or that move through or past the field-of-view of the camera(s), and more frequent acquisition of images of the objects as well as more accurate computer models in at least some embodiments and situations, so as to provide more accurate and timely information about the status of such objects, as well as to determine and provide aggregate information about multiple objects that move through a defined area during one or more defined periods to time, and to track and provide information about determined trajectories of the objects (e.g., which of multiple alternative paths are taken by the object, such as at split or diversion points in transportation mechanisms and/or in the routes or paths along which transporting vehicles travel). Such described techniques further provide benefits in allowing improved automated navigation of an environment having one or more such objects by mobile devices (e.g., semi-autonomous or fully-autonomous vehicles), based at least in part on the computer model generation and object attribute determination using acquired images, including to significantly reduce computing power and time used to attempt to otherwise learn a layout of the environment. The described techniques may be used in some embodiments to provide an improved graphical user interface ("GUI") in which a user more accurately and quickly obtains information about object(s) and/or an environment in which they are located (e.g., for use in navigating that environment and/or tracking changes to the objects), including in response to requests. Various other benefits are also provided by the described techniques, some of which are further described elsewhere herein.

For illustrative purposes, some embodiments are described below in which specific types of images are acquired for specific types of objects in specific manners (e.g., for outdoors piles of materials using fixed-location or otherwise physically mounted cameras whose visual coverage is for only a subset of the exterior of the piles, to generate and verify 3D computer models of the piles and determine their volumes and surface area and other attributes), and in which specific types of object attributes are estimated in particular manners-however, it will be understood that such described techniques may be used with other types of objects and images and for other types of object attributes in other manners in other embodiments, and that the invention is thus not limited to the exemplary details provided. As one non-exclusive example, while generated computer models for objects and/or resulting determined object attributes may be used for display to assist viewers in monitoring changes to the objects and/or their environment, generated and determined information of these types may be used in other manners in other embodiments. The term "acquire" or "capture" as used herein with reference to an object and/or its environment may refer to (unless context clearly indicates otherwise) any recording, storage, or logging of media, sensor data, and/or other information related to spatial and/or visual characteristics and/or otherwise perceivable characteristics of the objects or subsets thereof, such as by a recording device or by another device that receives information from the recording device. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts.

As noted above, in addition to generating 3D computer models of objects by analyzing visual data in acquired images and determining resulting object attributes, the IOEA system may perform further automated operations in at least some embodiments. For example, such further automated operations may include determining changes over time in one or more objects and their attribute values in various manners and may be performed by one or more object model generation, attribute determination and verification modules of the IOEA system (e.g., an IOEA system Object Change Determination module, as discussed in greater detail below with respect to FIGS. 1 and 8 and elsewhere), such as based on comparing and otherwise analyzing multiple computer models generated to represent an object at different times and/or other visual data obtained from images acquired at the different times. For example, one or more computer model(s) may be generated to represent one or more objects at each of multiple times (e.g., based on different image acquisition sessions that take place at each of those times), and differences between those computer models may be determined and used to identify changes in the one or more objects over time, such as with respect to one or more object attribute values of interest (e.g., volume, surface area, material type, etc.). Additional details are included below regarding such automated operations to determine changes over time in one or more objects and their attribute values, including with respect to FIG. 8 and FIGS. 10A-10D.

In addition, information may be presented or otherwise provided to users regarding various types of determined information, including information about generated computer models and resulting determined attribute values for one or more times. For example, one or more object model generation, attribute determination and verification modules of the IOEA system (e.g., an IOEA system Object Information Visualization and Recipient Interaction module, as discussed in greater detail below with respect to FIGS. 1 and 9 and elsewhere) may generate and provide information for display in a GUI that provides user-selectable controls and other options to allow a user to interactively request or specify types of information to display and to visually review information about one or more objects, such as determined object attribute values at one or more times, and/or information about changes in such object attribute values and the underlying objects. Such information may in some embodiments and situations be presented along with one or more acquired images of the one or more objects at one or more times and/or visual representations of the one or more objects rendered from created computer models, such as to overlay information on the image(s) or other visual representations to highlight one or more types of determined information that is being presented. The user-selectable controls or other information may further allow the user to control what information is presented and/or how it is presented in various manners in various embodiments. In addition, when the analysis of an object is performed by the IOEA system on behalf of a client of the IOEA system, the IOEA system may generate one or more reports for the client or otherwise provide corresponding information to the client in manners other than via a GUI-such reports or other information may, for example, be provided in a manner specified by a client, and may be automatically delivered to the client in various manners (e.g., sent to a client computing device of an authorized user representative of the client from one or more server computing systems of the IOEA system; printed or otherwise distributed in non-electronic manners; etc.), including in response to the generation and/or verification of a corresponding computer model. Additional details are included below regarding such automated operations to present or otherwise provide information via a GUI or in other manners, and to allow the user(s) to modify or otherwise control the information presentation, including with respect to FIGS. 9 and 10A-10D.

The automated operations described herein may in at least some embodiments include various additional interactions with one or more end users (e.g., clients of the IOEA system or their representatives), such as end users who have or will receive information about the attribute values. Such interactions may include, for example, receiving additional input from the end user to supplement information used to generate the computer model(s), such as one or more of the following: information about portions of the object, such as based on specialized knowledge of the end user about portions of the object that are not visible or otherwise not covered in the acquired images (e.g., a shape of a top of an object that is higher than a level of the camera during image acquisition and not covered in the acquired images, a shape of a back and/or side of an object that is not visible from one or more fixed-location or otherwise physically mounted cameras and not covered in the acquired images, valleys or other lower areas of the object's surface that are blocked by higher closer portions of the object or other intervening objects (e.g., a wall surrounding at least some of the object), interior holes or other external objects that are within the object being modeled but not visible from the images being acquired, etc.), based on information that the end user may be adept at identifying in images (e.g., by providing user input on a touch-sensitive screen or using other input techniques for one or more displayed images of an object to specify particular types of information of interest, such as a boundary of the object, areas of vegetation or other extraneous materials on the surface of the pile, areas of other objects or materials between the camera and the object that are blocking portions of the object, areas of water or other extraneous materials on the surface adjacent to or near the object, areas of adjacent or overlapping other objects that may obscure portions of the object being modeled, etc.), etc.; information about portions of the underlying surface on which the object being modeled is situated that are not visible under the object (e.g., holes or other depressions in the surface, hills or bulges or other protrusions in the surface, etc.); etc. Such information from the end user may then be used to modify the generated computer model (e.g., to supplement and/or override image-acquired data) and/or to assess the accuracy of corresponding portions of the computer model. Such end user interactions may further include, for example, receiving instructions from the end user to override an automated volume value and/or other attribute measurements and/or to override an automated verification (or lack thereof) of such a measurement or to otherwise specify such a verification or lack thereof, such as based on specialized knowledge of the end user-such receiving of end user input may include, for example, receiving and accepting one or more alternative user-specified attribute value(s) to use instead of or in addition to automatically determined attribute value(s), accepting a verification or lack of verification by the end user of the attribute value(s), receiving a determination by the end user of a verification or lack of verification of the attribute value(s) to use (e.g., instead of an automated determination from the verification activities), etc. In addition, to assist the user in providing such input, various types of computer-generated information may be displayed or otherwise provided to the user, such as a 3D rendering of an object showing one or more of the following: contour lines; a determined object boundary, and optionally areas of adjacent object toe with a slope that is too high or too low; an object surface, and optionally corresponding image-acquired data, as well as areas in which there is not sufficient data coverage for volume and/or surface area values; etc. Additional details are included herein related to techniques for interacting with an end user, including adjusting automated determination activities by the IOEA system and/or automatically determined information from the IOEA system based on corresponding input from the end user.

In addition, the information that is determined for one or more objects may in some embodiments and situations be used in manners other than to provide corresponding information to a client of the IOEA system, such as to provide information about particular objects and/or aggregated information about multiple objects (e.g., objects together at a single site controlled by a particular operator who creates or manages the objects, objects in a geographic area, objects of a particular type, etc.) to one or more external entities that do not own the objects being modeled or initiate the modeling of the objects. Additional details are included below related to techniques for generating and providing information about objects of interest to clients and/or other entities.

While some of the example embodiments discussed herein include a stockpile or other pile of material, other types of objects may be assessed in a similar manner in at least some embodiments, including holes or pits or other cavities in the ground (e.g., material extraction from strip mining) or other negative spaces, moveable cargo objects of various types, vehicles, etc. Furthermore, an object of interest being assessed may be of various types of materials, such as for a stockpile or other pile to include materials of various types and sizes (e.g., construction aggregates, grain or other product, sawdust, logs, tires, trash, recyclable materials, etc.). In addition, images that are acquired may be of various types and resolutions, including still images and/or video image frames, and may capture various types of light or other energy (e.g., visible light, infrared, ultraviolet, radioactivity, etc.). Similarly, images may be acquired using image acquisition capabilities of various types of devices in various embodiments, including one or more of the following: a mobile device that is carried by a human user as he or she passes around some or all of an object (e.g., a digital camera that takes individual digital photo images and/or digital video consisting of successive frames of digital images, including a camera that is carried by a human user or a body-mounted camera; a device with computing capabilities and image acquisition capabilities, such as a smart phone, a tablet computer, a pad computer, a slate computer, etc.); a vehicle-mounted camera, such as on a ground or aerial drone that is partially or wholly autonomous, or on a ground or aerial vehicle driven or piloted or guided by a human (e.g., an airplane, a truck, an ATV, etc.); a satellite; one or more fixed-location or otherwise physically mounted camera devices (whether with or without their own computing capabilities), etc. Furthermore, while images of an exterior surface of an above-ground object are acquired in some embodiments from beside (e.g., ground-level) or above the object, in other embodiments the images may be acquired in other manners, including acquiring an interior surface of an object from within the object (e.g., from within a hole or pit or other cavity; etc.) or above the object (e.g., ground level outside a hole or pit or other cavity, etc.), and including from a device that moves along an exterior or interior surface of an object (e.g., a ground-based drone that drives on top of a pile or within a hole).

Furthermore, while some of the example embodiments discussed herein include analyzing a single object at a single time, the described techniques may be used in other manners in some embodiments. For example, a single object may be analyzed at different times, such as to further enable relative information for the object to be determined over time (e.g., to determine how a stockpile object grows and/or shrinks over time with respect to volume or one or more other attributes), with corresponding information made available to a client and/or used for further automated determination of related information. In addition, in at least some embodiments, multiple objects (e.g., nearby, on top of each other in whole or in part, behind or in front of each other in whole or in part, etc.) may be analyzed together in one or more images that are acquired simultaneously or at different times, including for multiple objects that sequentially pass through or by the field-of-view of one or more stationary cameras and/or other cameras. Additional details are included below regarding determining changes in one or more objects and their attribute values over time, such as by using images acquired at different times, as well as presenting corresponding information.

FIG. 1 is a diagram illustrating an example embodiment of an IOEA ("Image-based Object Exterior Analysis") System 160 that may be used to provide automated functionality related to the analysis of images acquired at least in part from one or more fixed-location devices, such as to calculate volume or otherwise measure attributes of interest of one or more objects included in the acquired images, as well as to perform automated operations to verify attribute values, and to optionally perform further automated operations (e.g., to determine changes over time in one or more objects, such as with respect to one or more attributes of the one or more objects). The IOEA system 160 may be provided via one or more network-accessible configured devices, whether via one or more configured server computing systems (not shown) or other configured computing devices (not shown) that are remote from a user representative 105 of a client, and/or based on configured use of one or more mobile devices 110 used by the user representative 105. A server computing system in such an example may include any computing device or system that may receive data and/or requests, and take corresponding actions (e.g., store the data, respond to the request, etc.) to perform the described automated operations, as discussed in greater detail elsewhere herein.

In particular, in this example, one or more fixed-location camera devices 129 (including a first fixed-location camera device 129*a* that is physically mounted on a first pole, and a second fixed-location camera device 129*b* that is physically mounted on a second pole) provide a partial view of a subset of a stockpile 150 of material that in this example is taller than the 3D location of the fixed-location camera devices atop their respective poles, and may capture images continuously or at specific times of the pile 150 and some of its surrounding environment, with those images not including visual coverage of one or more omitted surfaces of the object's exterior. Those acquired images are then optionally transmitted (e.g., via wire or cable 184; via wireless transmission, not shown; etc.) to one or more other computing devices for use by an embodiment of the IOEA system (e.g., copy 160 of the IOEA system), such as to one or more local computing systems (not shown) and/or one or more remote server computing systems via one or more networks 180 for storage in image data 162 and subsequent analysis, although in other embodiments the fixed-location camera devices may include on-device computing capabilities that are used to locally execute a copy of the IOEA system (not shown), whether in addition to or instead of any other separate computing devices.

In addition, in some embodiments, additional images may be acquired at times by one or more other camera devices (e.g., mobile camera devices), such as for use in supplementing the images acquired from the fixed-location camera devices (e.g., to estimate shapes for omitted surfaces of the object that are not visible from the fixed-location camera devices). For example, in some such embodiments, a user representative 105 may carry a mobile device 110 that includes image acquisition capabilities (e.g., one or more cameras) and includes communication capabilities to enable a transmission 185 of information from the mobile device 110 to other systems (e.g., other remote server computing systems providing at least some of the IOEA system 160), such as via a cellular telephone network or other transmission method. In other embodiments, the image data that is captured by such a mobile device 110 may be provided to other systems in other manners, such as via a physical cable or dock or other physical connection (e.g., after the image acquisition for an object in an environment is completed). In addition, in some embodiments, some or all of the image data captured by a mobile device 110 may be first transmitted to another nearby computing device, such as another nearby computing device carried by the operator or located in a nearby location (e.g., a nearby vehicle or building), and then transmitted from the nearby computing device to one or more remote server computing systems or other remote systems-such a transmission from the mobile device to the nearby computing device may occur, for example, via a physical connection (e.g., a cable, wire or other connector), via a wireless transmission (e.g., Bluetooth, infrared, near field communications, a wireless transmission mechanism with a limited transmission range, etc.), etc. Furthermore, while the mobile device that acquires additional images is in this example carried by a human user, in other embodiments some or all of the additional images that are acquired by mobile devices may be acquired in other manners, whether in addition to or instead of such a human user, such as via one or more mobile devices that are carried by or otherwise part of one or more of image-capture vehicles, such as automated aerial drone(s) 181, and/or human-piloted aircraft(s) 183, and/or ground vehicle(s) 188 (whether automated drones or with human pilots), and/or satellite(s) 186, etc.

In this example, the stockpile object 150 (e.g., consisting of construction aggregate material) is shown in an outdoors environment, with two example fixed-location cameras 129 that provide visual coverage of only a subset of the object, and with the optional user representative 105 moving to encircle some or all of the exterior of the stockpile object 150 in order to obtain various images of the stockpile exterior (e.g., for areas of the object 150 that are not visually captured by the fixed-location cameras 129). For example, the user may travel a path 115 around the exterior of the object, whether based on a path selected wholly by the user or instead based at least in part on user feedback or instructions provided by the IOEA system 160 to the user. The user and/or the mobile device may further acquire a variety of images to encompass the exterior of the object during the traveling of the path. As one example, the user may occasionally manually activate the image acquisition capabilities of the mobile device 110, such as at a variety of locations 120 around the exterior along the traversal path 115. As another example, the user may travel the path 115 and the mobile device may automatically acquire such images at such locations, such as based on a period of time elapsing since the last image, a distance traveled by the user since the last image, or other information related to the images that have been previously captured. Alternatively, the mobile device may acquire image data in a continuous or substantially continuous manner, such as to shoot video that includes successive image frames in rapid succession (e.g., 60 frames a second, 30 frames a second, 1 frame a second, 1 frame every 5 seconds, 1000 frames a second, etc.). Thus, for example, various of the images acquired may instead occur at relatively close intervals, such as those illustrated with respect to locations 125 (while the locations 125 are not illustrated throughout the entire exterior of the object, it will be appreciated that such substantially continuous image acquisition may be performed at the same rate for some or all of the traversal of the object exterior). The mobile device 110 may further transmit some or all of the additional acquired images to the IOEA system 160, such as via transmission 185 over network(s) 180, including to be stored in image data 162.

After a group of one or more images (e.g., some or all images captured by one or both of the fixed-location camera devices 129 at a given time) have been selected to represent the stockpile object for that given time, the IOEA system 160 may further perform processing to generate one or more models or other representations to represent the object, such as a 3D point cloud model, a surface model, etc., and optionally may generate one or more additional models of at least some of a surrounding environment (e.g., a bare earth model of ground or other underlying surface on which the object sits; a model of one or more walls or other things enclosing at least some of the object, not shown in this example; etc.), and may store corresponding information in model data 163. After the one or more models have been generated, the IOEA system 160 may further estimate or otherwise measure one or more attribute values for the object 150, and store such information with attribute data 164, as well as optionally determine changes over time for one or more attributes and/or objects (e.g., with respect to a changing shape of the object 150 as material is added and/or removed) and store such information with change data 165. In addition, one or more clients of the IOEA system 160 may provide various client data 161 to the IOEA system 160, such as related to types of data of interest to be generated for the client. Such clients and their authorized representative users may, for example, use various client computing systems 190 to communicate with the IOEA system 160 over one or more networks 180, such as to perform registration activities and/or to obtain object attribute value determinations performed for the client. The data 161-165 may be stored in various manners, such as all or in part on one or more server computing systems remote from the mobile device 110, all or in part on one or more of the fixed-location camera devices 129, all or in part on the mobile device 110, on one or more storage systems (not shown) separate from the camera devices and computing devices, etc.

The IOEA system 160 in this example includes various modules 171-179, which may perform various automated operations of the IOEA system 160. In some embodiments, some or all of the modules 171-179 may execute on one or more server computing systems (or other computing systems) remote from the object 150, while in other embodiments one or more of the modules 171-179 may instead execute on one or more of the fixed-location camera devices 129 and/or one or more configured devices of the user representative 105 (e.g., the mobile device 110). For example, the Image Quality Monitor module 171 and Image Content Problem Detector module 172 may optionally be grouped as part of an image acquisition sub-system 168 of the system 160, with some or all of those image acquisition modules being executed on the fixed-location camera devices 129 and/or on the mobile device 110. In addition, the Object Model/Attribute Determiner module 174, Object Change Determiner module 176, Object Information Visualizer and Recipient Interactor module 177, Object Model/Attribute Verifier module 178 and Object Identifier module 179 may optionally be grouped as part of an object attribute value determination and verification sub-system 169 of the system 160, with some or all of those object modules 174-179 being executed on one or more server computing systems remote from the fixed-location camera device(s) and the mobile device. It will be appreciated that the functionality of the IOEA system 160 may be structured in other manners in other embodiments, including to have more or less modules and/or to have more or less functionality than is described in this example.

The Image Quality Monitor module 171 may be configured to perform automated operations for acquired images (e.g., images acquired from the fixed-location camera devices 129) in at least some embodiments, such as to monitor image quality with respect to one or more metrics of interest, and to take corresponding actions if sufficient quality is not sustained, including to verify that at least some types of temporary problems do not exist with one or more images acquired at a given time about the object's exterior surface that introduce excessive uncertainty in the shape of the object's exterior (e.g., temporary problems corresponding to blurring, warping, skew, wobble, spatial aliasing, excessive or insufficient contrast, and/or other distortions or deformations, such as from one or more of rolling shutter problems, camera vibration or other movement, lighting or other environmental conditions, etc.). In addition, the module 171 may, in some embodiments in which a user such as user 105 is participating in image acquisition, assist in providing feedback or other instructions to the user related to image quality problems that are detected if the module 171 executes concurrently with the image acquisition. For example, Operator Feedback Provider functionality may be configured to perform further automated operations that include providing user feedback in various manners while user 105 is travelling path 115, such as when image quality problems are detected or to provide other types of information.

The Image Content Problem Detector module 172 may be configured to perform further automated operations for acquired images (e.g., images acquired from the fixed-location camera devices 129) in at least some embodiments, such as to monitor visual contents of the images to verify that at least some additional types of temporary problems do not exist with one or more images acquired at a given time about the object's exterior surface that introduce excessive uncertainty in the shape of the object's exterior (e.g., temporary problems corresponding to obstructions being temporarily present between the fixed-location camera(s) and the object), and to take corresponding actions if such problems exist. In addition, the module 172 may, in some embodiments in which a user such as user 105 is participating in image acquisition, assist in providing feedback or other instructions to the user related to temporary problems that are detected if the module 172 executes concurrently with the image acquisition.

In at least some embodiments, an additional Image Selector module 173 may be provided and configured to perform automated operations to select, for use as a group of images to represent the object 150 at a given time, some or all images acquired from one or more camera devices for the given time (and optionally some previously acquired images if the images acquired at the given time have only a partial view of the object, such as if the images acquired at the given time are from one or more fixed-location cameras such as camera devices 129 in FIG. 1). The selection of the images may occur concurrently with the acquisition of images at the given time or after all of the images for the given time have been acquired—furthermore, if the Image Selector module executes on at least one of the one or more camera devices from which the images are acquired at the given time, and if image data for object 150 is to be transmitted over the network(s) 180 to one or more remote server computing systems, the amount of bandwidth used for the transmission may be reduced in such a situation, as only the images in the selected group (or information extracted from those images of the selected group and/or from other images, such as selected images that were previously acquired) may be transmitted. In other embodiments, all of the images acquired at the given time (or all that satisfy minimum quality standards) may instead be transmitted to one or more remote server computing systems for further analysis, including in embodiments in which the Image Selector module executes on those remote server computing systems and selects some or all of the acquired images after the item acquisition session has been completed.

The Object Identifier module 179 may be configured to perform further automated operations to, for a group of acquired images that represent one or more objects, identify those one or more objects, such as to match those one or more objects to one or more previously modeled objects, and/or to use one or more trained machine learning models to identify at least a type of the object and optionally a particular instance of that type. As discussed in greater detail elsewhere herein, previously identified objects may change over time with respect to one or more attributes (e.g., shape, size, composition of materials, moisture content, temperature, etc.), and various techniques may be used to determine if an object represented by a group of acquired images corresponds to a changed object that was previously modeled or is instead a new object (e.g., an object that is newly formed after a previous acquisition of images for the same site, an object that is not newly formed but was not previously captured in acquired images, a new object moving through an area that one or more cameras monitor or otherwise have visual coverage of, etc.)—as one example one or more locations may be tracked for each existing object (e.g., GPS coordinates for a boundary of the object and/or a center point or other location within the object's footprint) and used to determine that an object being modeled overlaps at least in part with the location information for a previously identified and tracked object. Such objects may further change in other manners at times, such to have an object that results from two or more other previous objects being combined, two or more objects that result from a previous object being split, a previous object that is removed or is otherwise no longer present, a new object that was not previously present, an object whose previous location has changed, etc. For objects that move (e.g., are carried by or otherwise transported by a transporting vehicle or other transportation mechanism, such as a conveyor belt or crane), the identification of objects moving past one or more cameras (e.g., through an area being monitored) may include identifying a portion of each image (e.g., a subset of the image pixels) that corresponds to the object, and one or more other portions (e.g., with other image pixel subsets) that correspond to at least a portion of a transporting vehicle or other transportation mechanism (and optionally to background information separate from the object and transporting vehicle or other transportation mechanism, such as other objects or other visual data in front of and/or behind and/or beside the object of interest)—such object identification may in at least some embodiments include using one or more machine learning models trained for such object identification tasks (e.g., each specific to one or more types of objects), and/or may include separately modeling a size and/or shape of the transporting vehicle or other transportation mechanism (e.g., when not loaded with any objects) and using the separate model(s) to subtract from a generated model of both an object of interest and the associated transporting vehicle or other transportation mechanism to result in a model of just the object of interest or to otherwise use the separate model(s) to identify the object. In addition, identification of objects moving past one or more cameras may be further used to determine and provide aggregate information about multiple such objects, such as a quantity of objects (e.g., a cumulative total; a rate or other quantity for one or more defined periods of time, such as one or more minutes and/or hours and/or days and/or weeks and/or months; etc.), cumulative and/or average volume and/or other determined object attribute (e.g., a rate or other quantity for one or more defined periods of time, such as one or more minutes and/or hours and/or days and/or weeks and/or months; etc.), etc.

The Object Model/Attribute Determiner module 174 may be configured to perform further automated operations to, after a group of images to represent the object 150 has been selected and are available in the image data 162, analyze the images of the selected group and generate one or more corresponding models or other representations, such as to generate a point cloud and/or a surface model for the object (e.g., to apply a surface model to a generated point cloud model), as well as to optionally provide one or more additional types of functionality such as object movement tracking and trajectory determination and/or aggregate object attribute data determination, such as via one or more sub-modules 174*a*, 174*b* and 174*c*. In some embodiments and situations, some or all of the generated models may be 3D models (e.g., for a point cloud model), while in other embodiments and situations, some or all of the generated models may have other forms (e.g., 2.5D representations)—use of the term "model" herein is intended to include any representation of data for an object that may be stored, unless otherwise indicated. The module 174 may further be configured to perform further automated operations to, after the one or more models are generated, use the generated model(s) to measure values for one or more attributes of interest of the object 150, such as a volume attribute or other related attributes.

The Object Change Determiner module 176 may be configured to perform automated operations to compare models of one or more objects generated at different times to determine changes in the object(s) over time (e.g., changes in one or more object attribute values), such as to identify differences in visual data from images acquired at the different times for the one or more objects that are used to generate the models. The Object Information Visualizer and Recipient Interactor module 177 may be further configured to perform automated operations to present or otherwise provide information to users in one or more GUIs regarding various types of determined information, including information about determined changes over time in one or more objects and their attribute values, as well as to control what information is presented and/or how it is presented in various manners. The module 177 may further be used to provide corresponding information to the client in manners other than via a GUI in some embodiments, such as by generating a report that includes results information and sending it to a client system 190 and/or the mobile device 110, or instead to provide such information in other manners (upon later request by the client, such as to enable the client to login to the IOEA system and to review results of previously analyzed objects). In addition, during or after the process of generating attribute information, determining change information and/or verifying attribute information, module 177 may in some embodiments perform various types of interactions with an end user, including to obtain various types of input from the end user that is subsequently used by the IOEA system 160 (e.g., by one or more determination and verification modules), as discussed in greater detail elsewhere herein.

The Object Model/Attribute Verifier module 178 may be configured to perform further automated operations to verify generated computer model(s) and/or object attribute values produced from such computer model(s), such as based at least in part on verifying visual data of acquired images used to generate the computer model(s). As discussed in greater detail elsewhere herein, such automated operations may include analyzing one or more types of information that reflect accuracy and/or completeness of the computer model(s) and their resulting object attribute values, such as to verify data coverage of a computer model of an object with respect to volume and/or surface area of the modeled object, and/or to verify boundary accuracy and completeness of a computer model of an object with respect to a toe proximate to an underlying surface on which the object is situated, and/or to verify sufficiency of data in acquired images used to generate the computer model(s), and/or to verify temporary problems in visual contents of such acquired images that inhibit generation of a corresponding computer model.

Figure 2B:
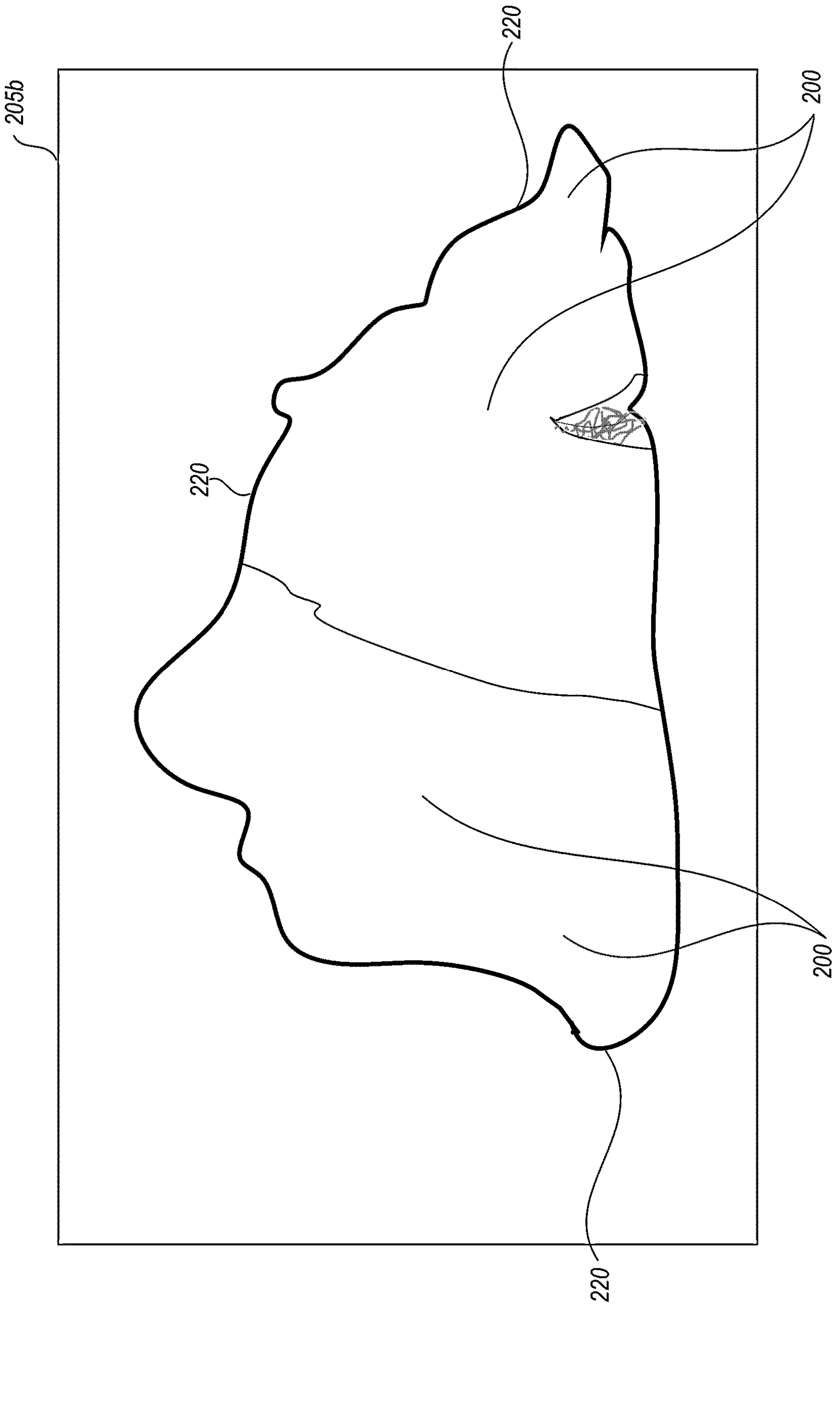
Figure 2C:
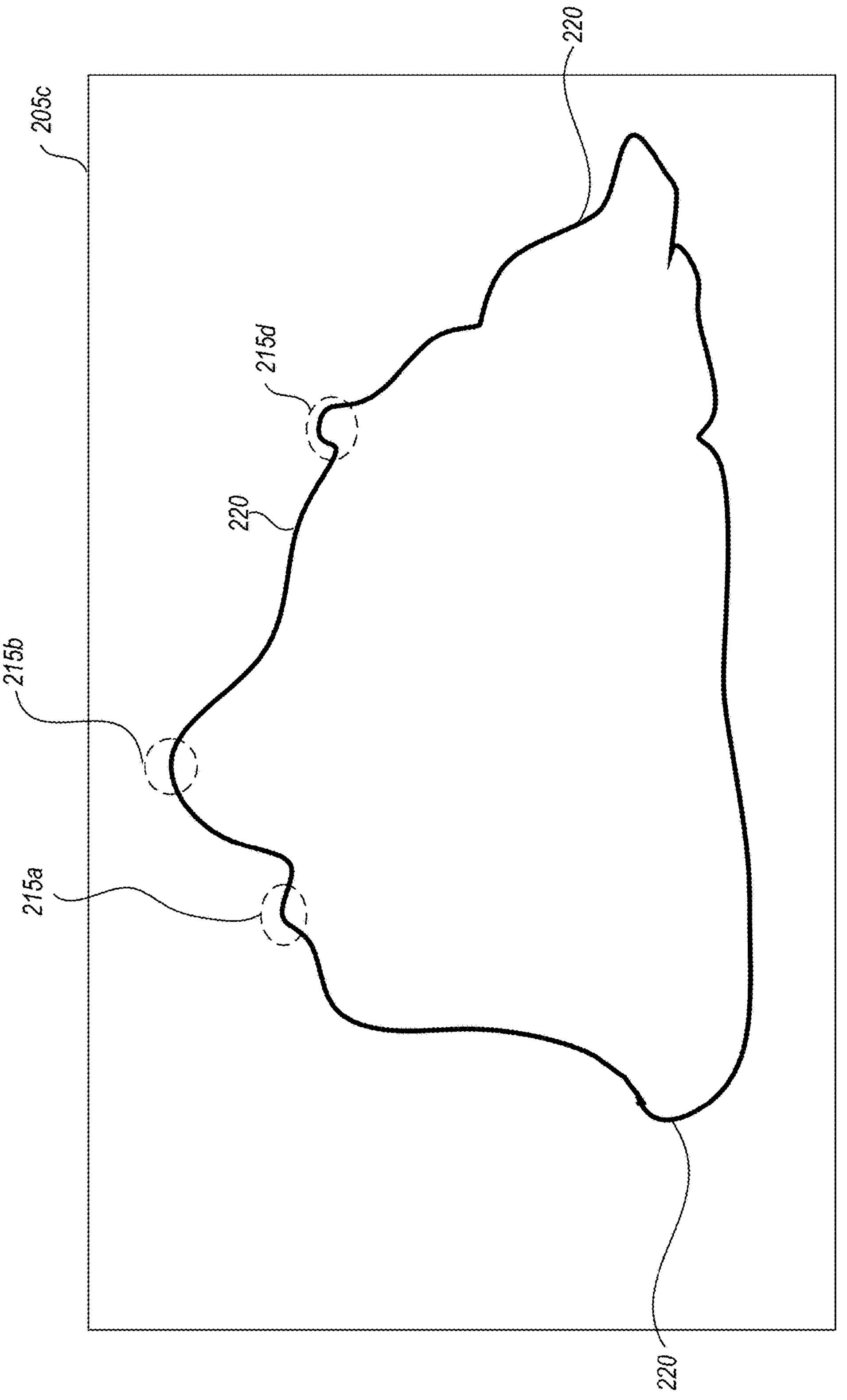
Figure 2D:
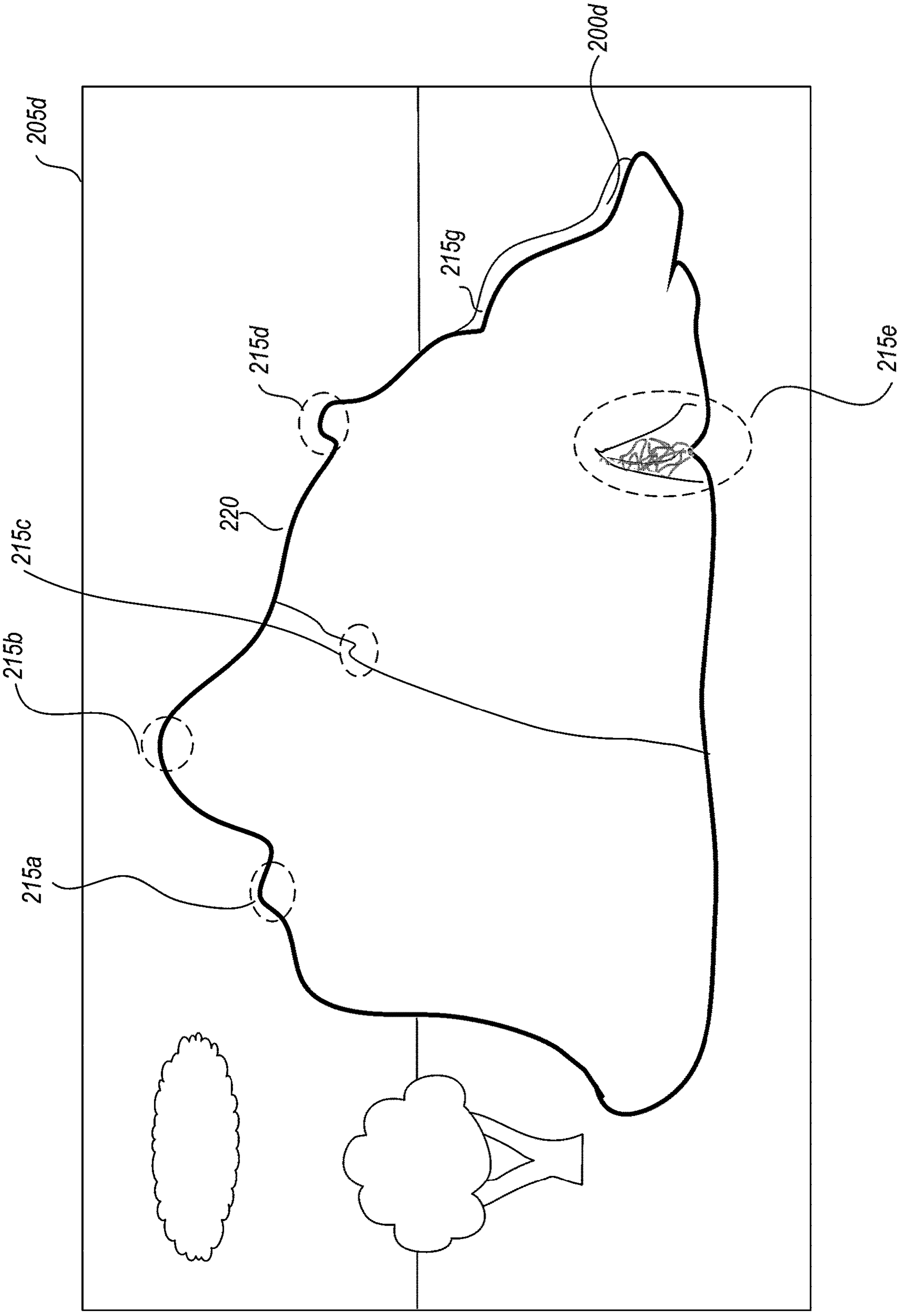
Figure 2E:
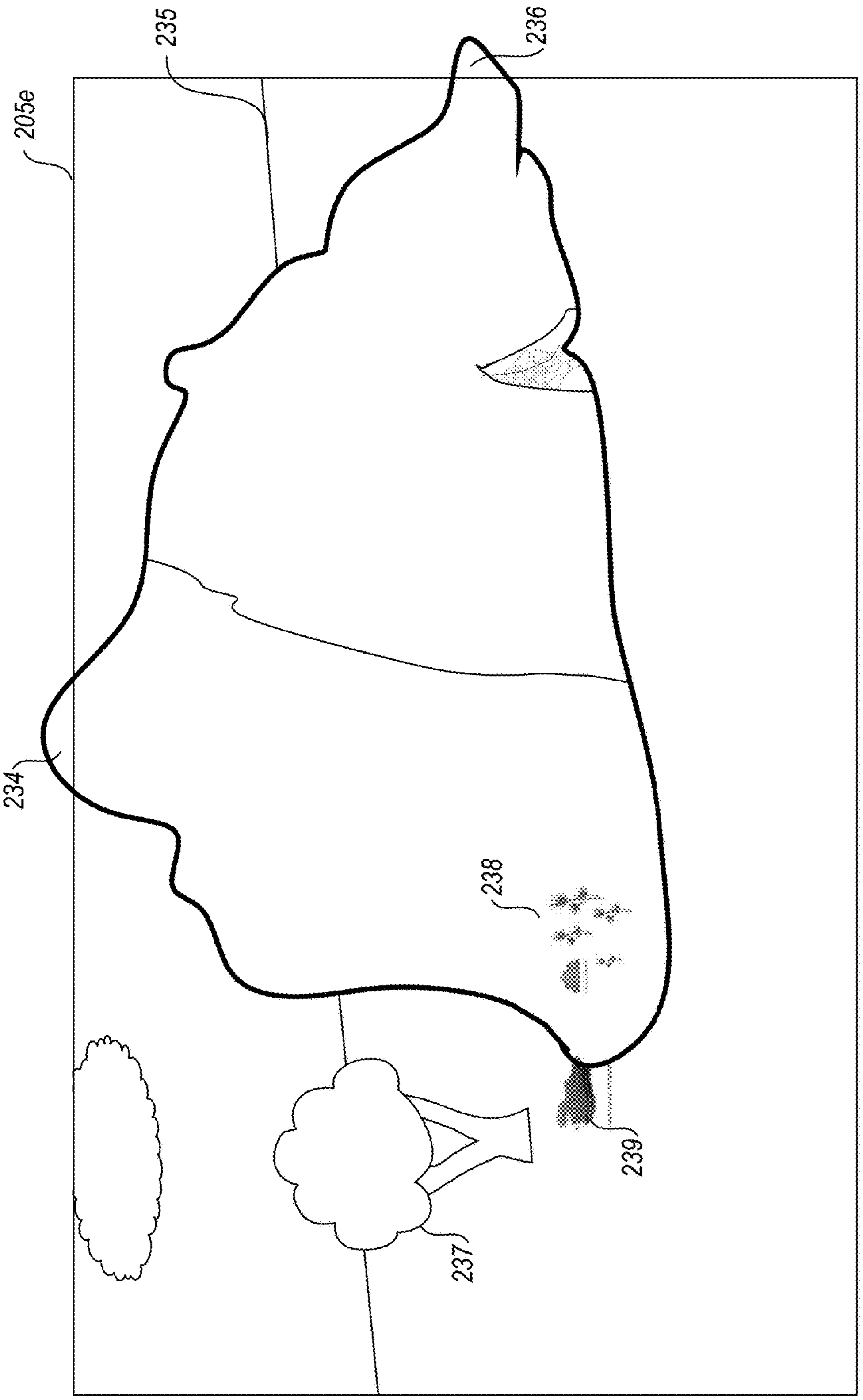
Figure 2F:
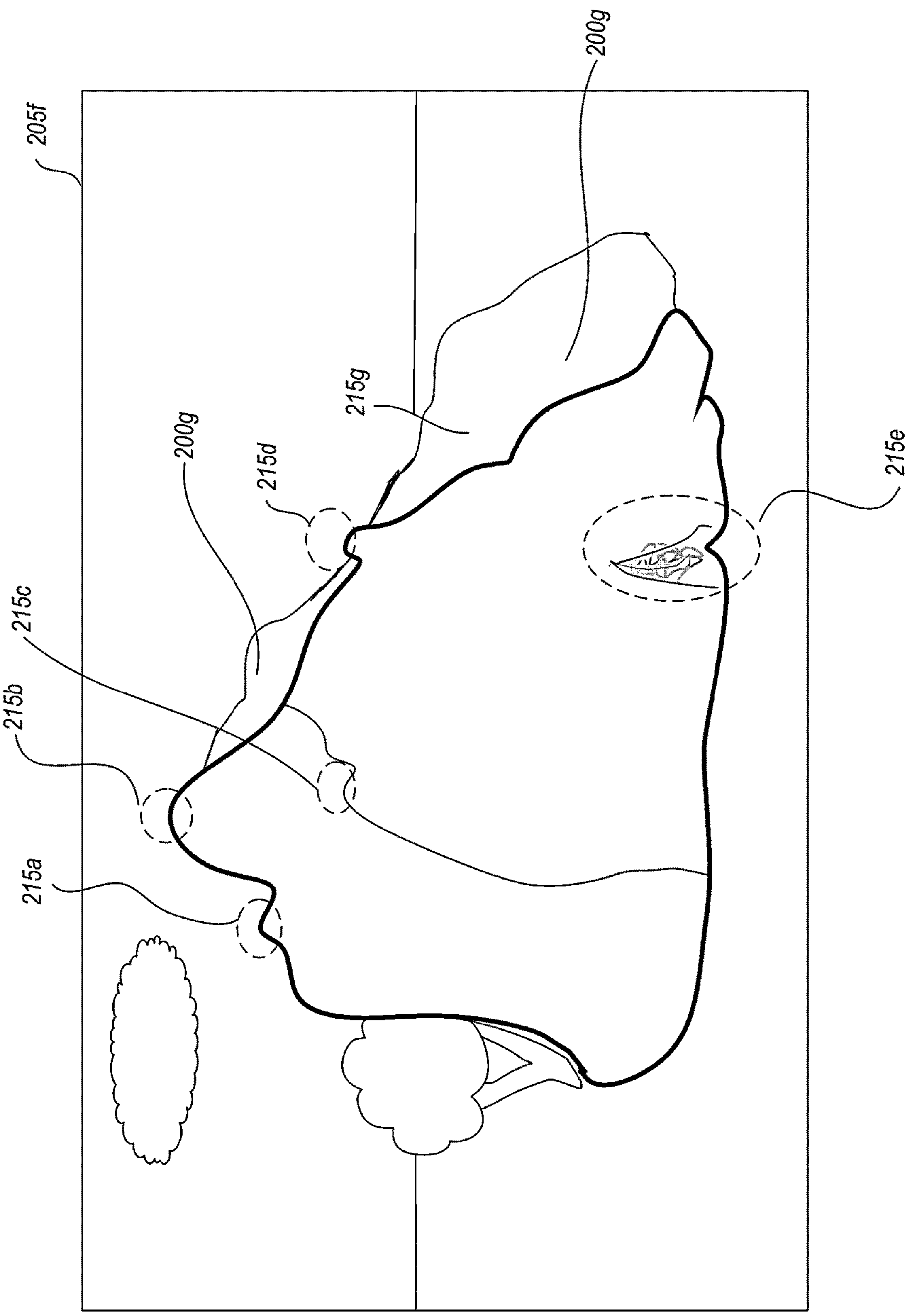
Figure 2G:
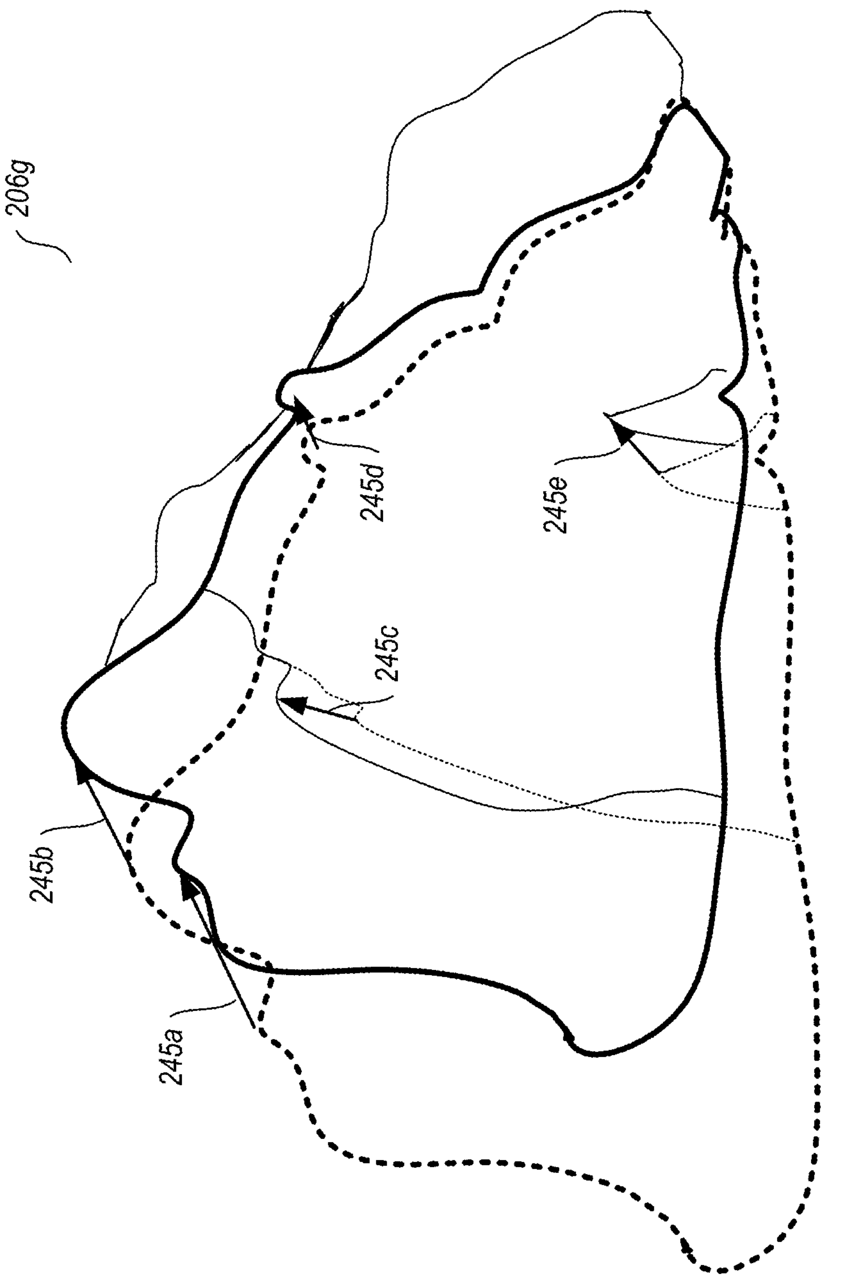
Figure 2H:
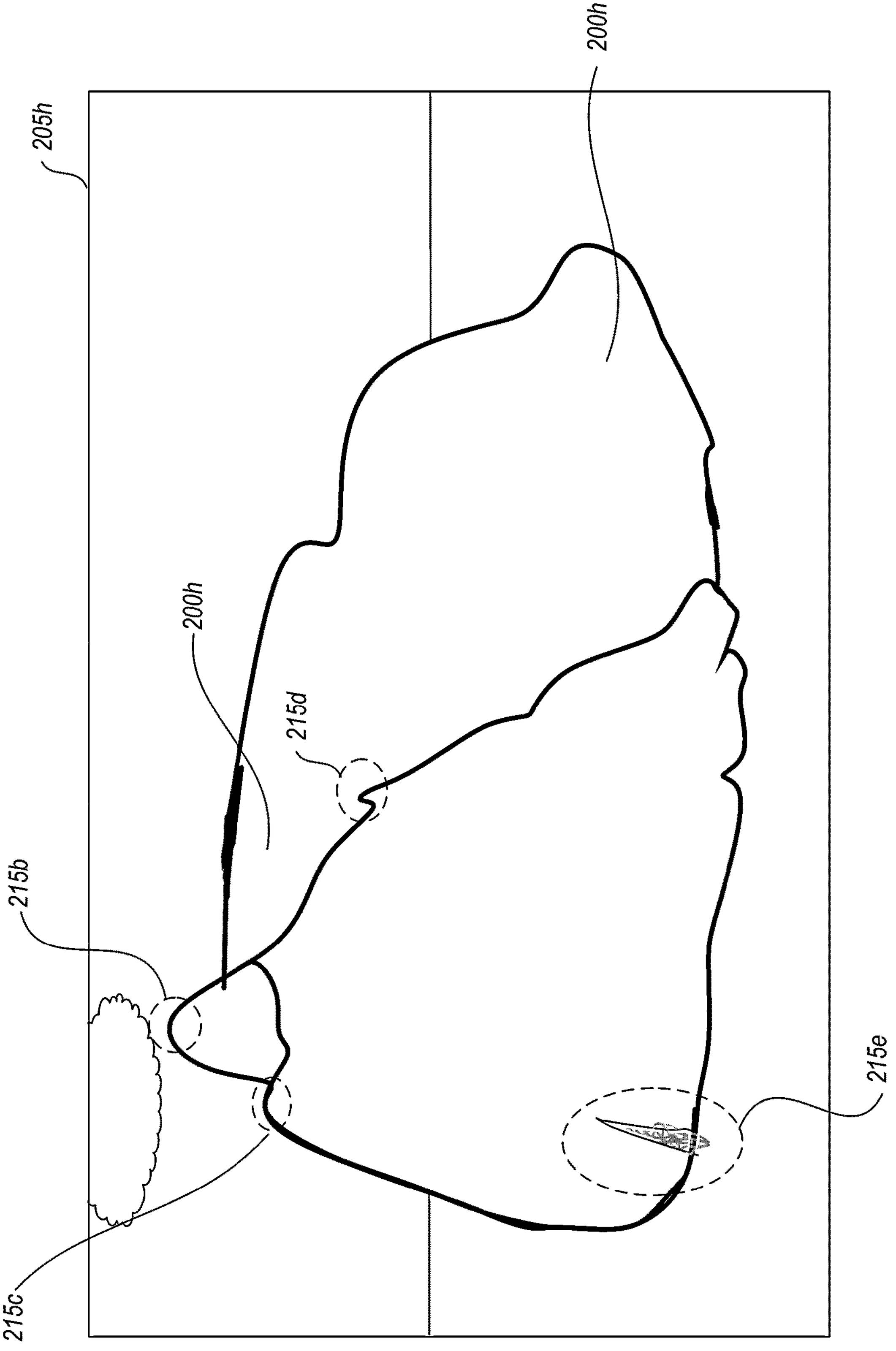
Figure 2I:
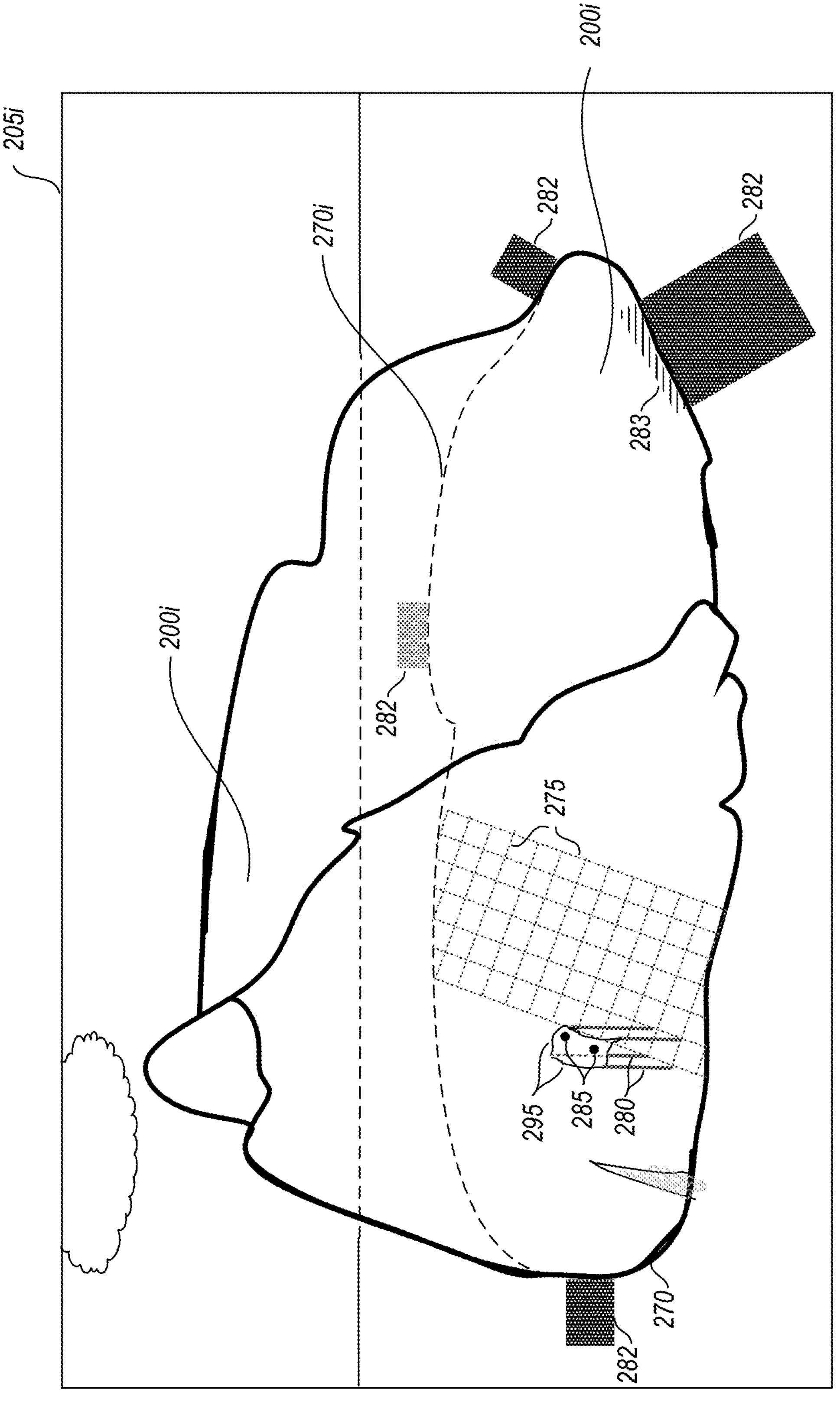
Figure 2J:
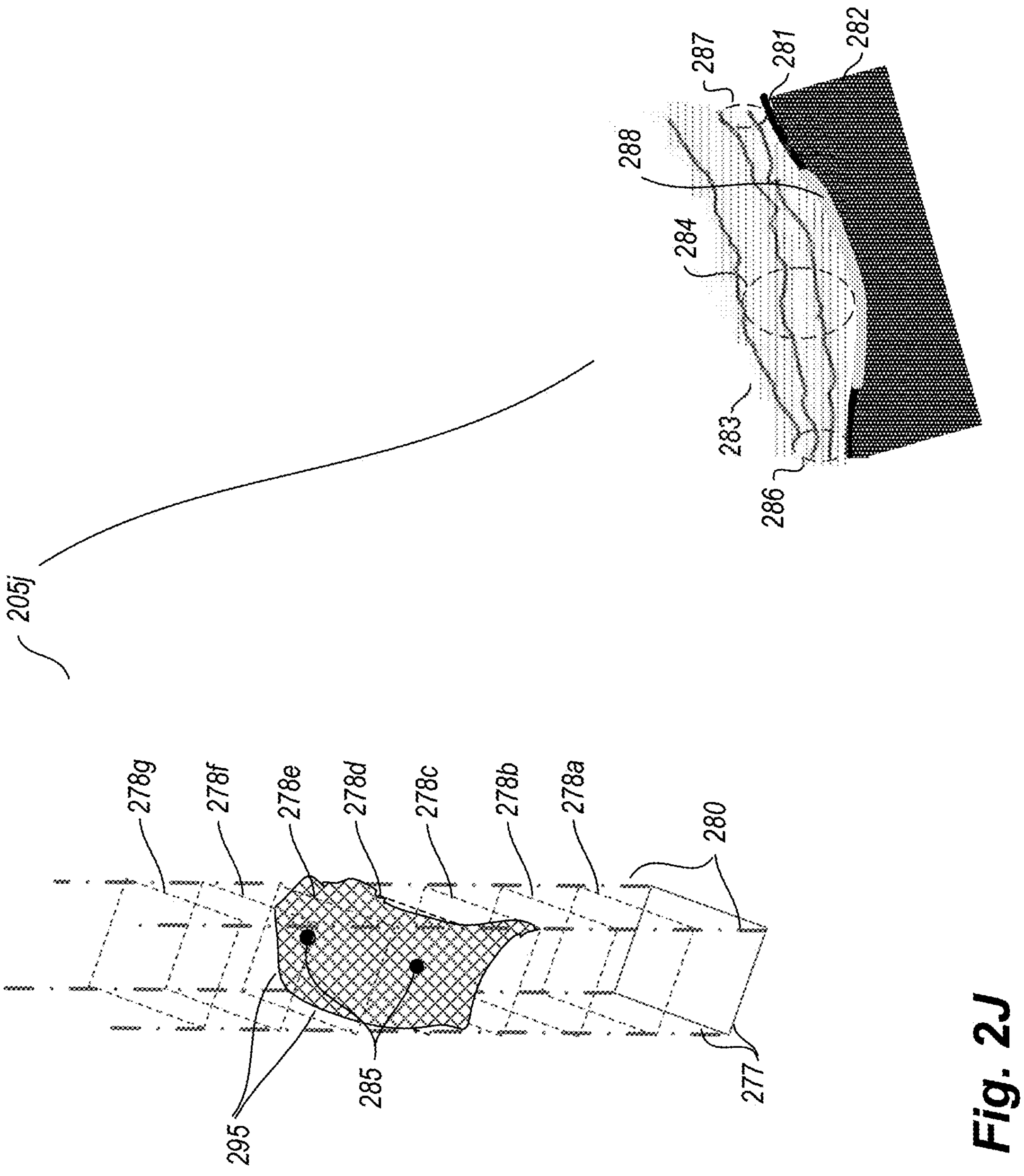
Figure 2K:
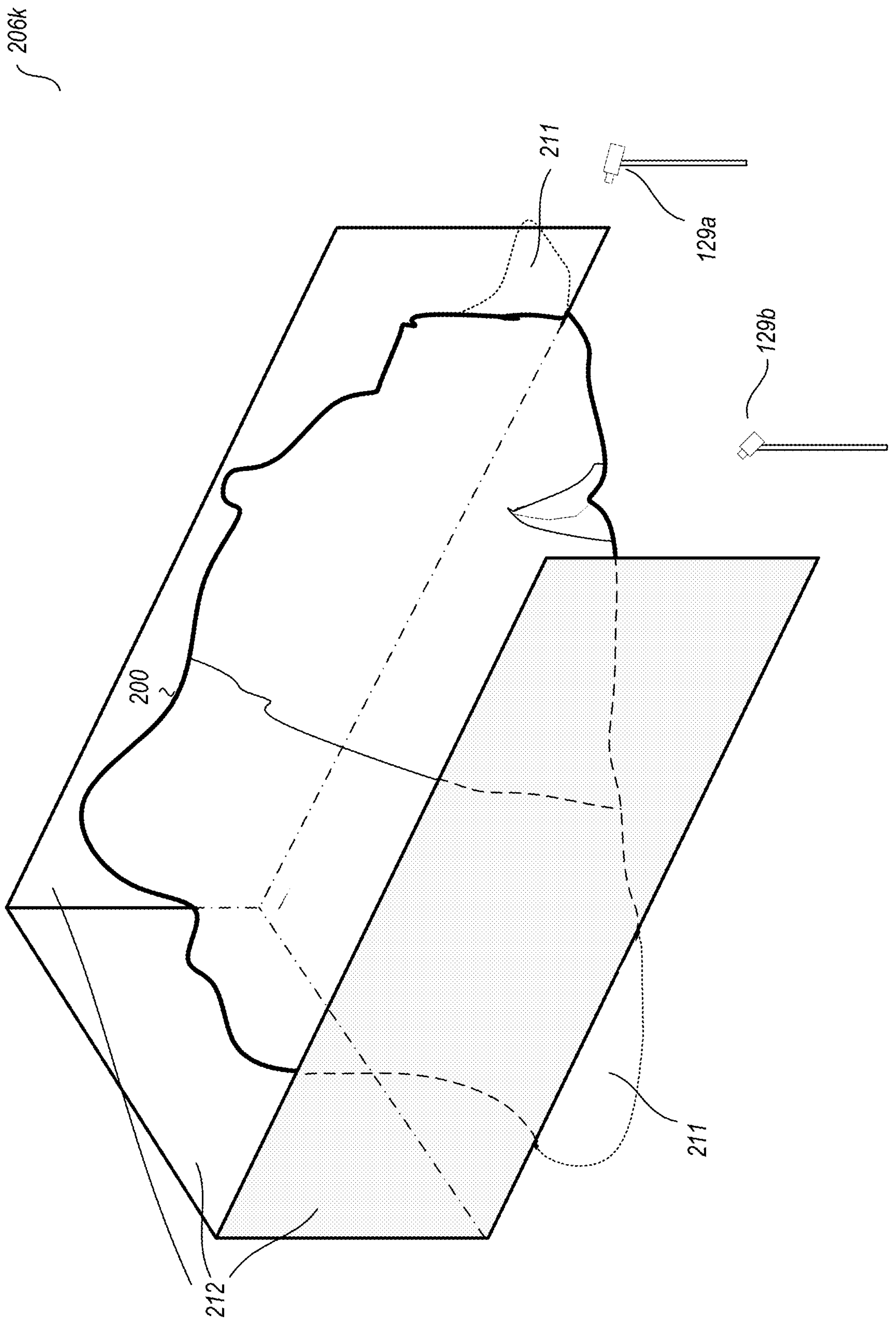
Figure 2L:
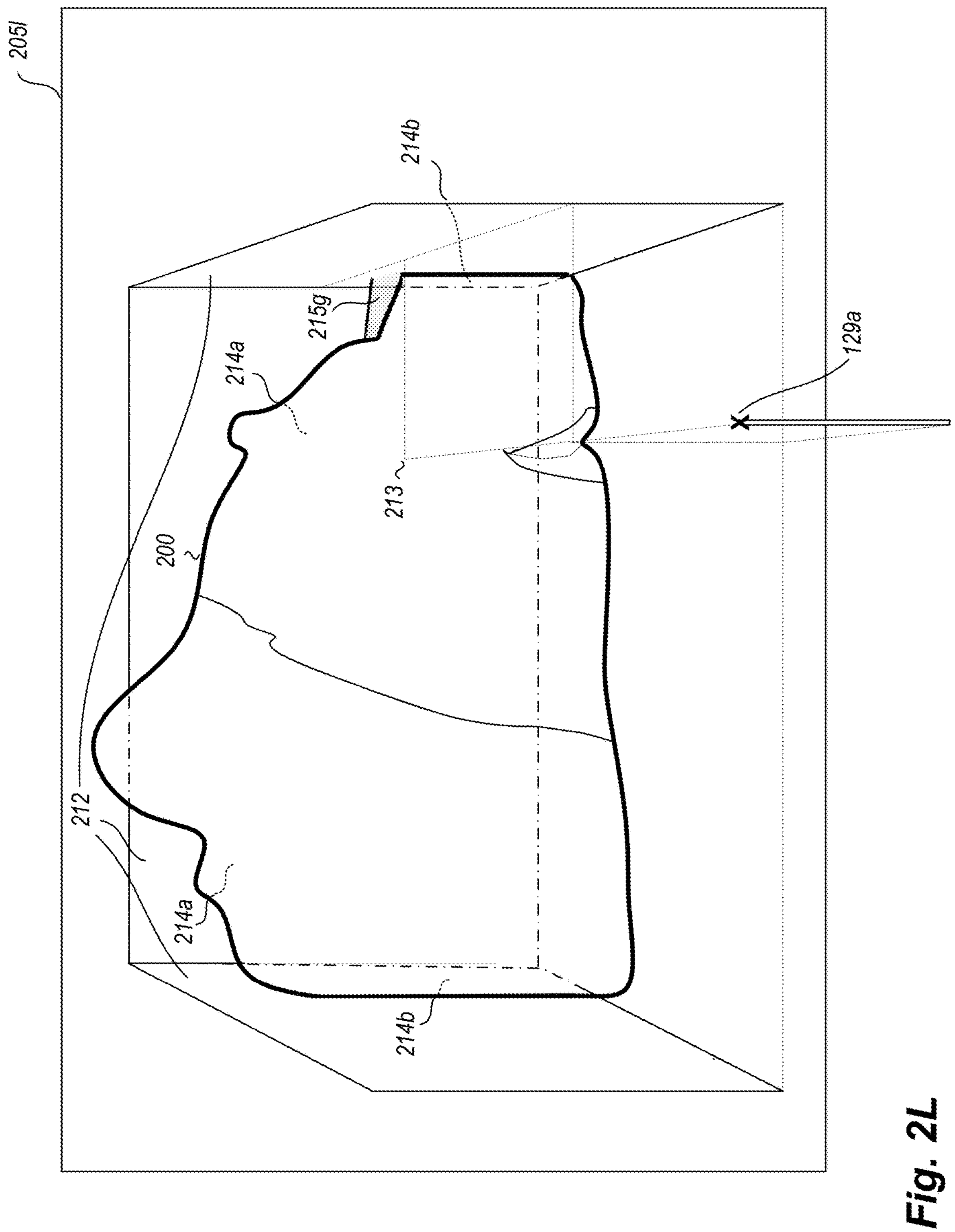
Figure 2M:
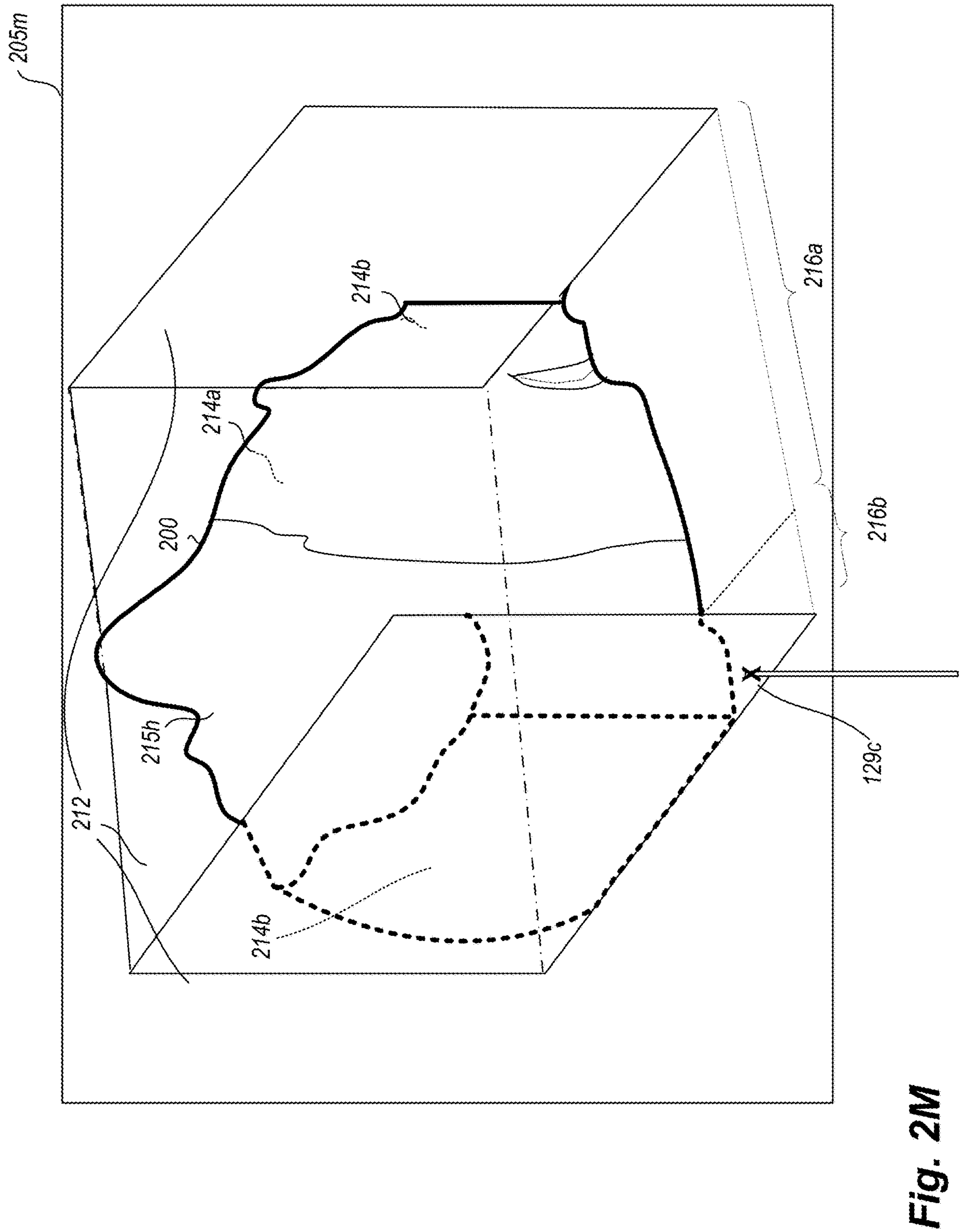
Figure 2N:
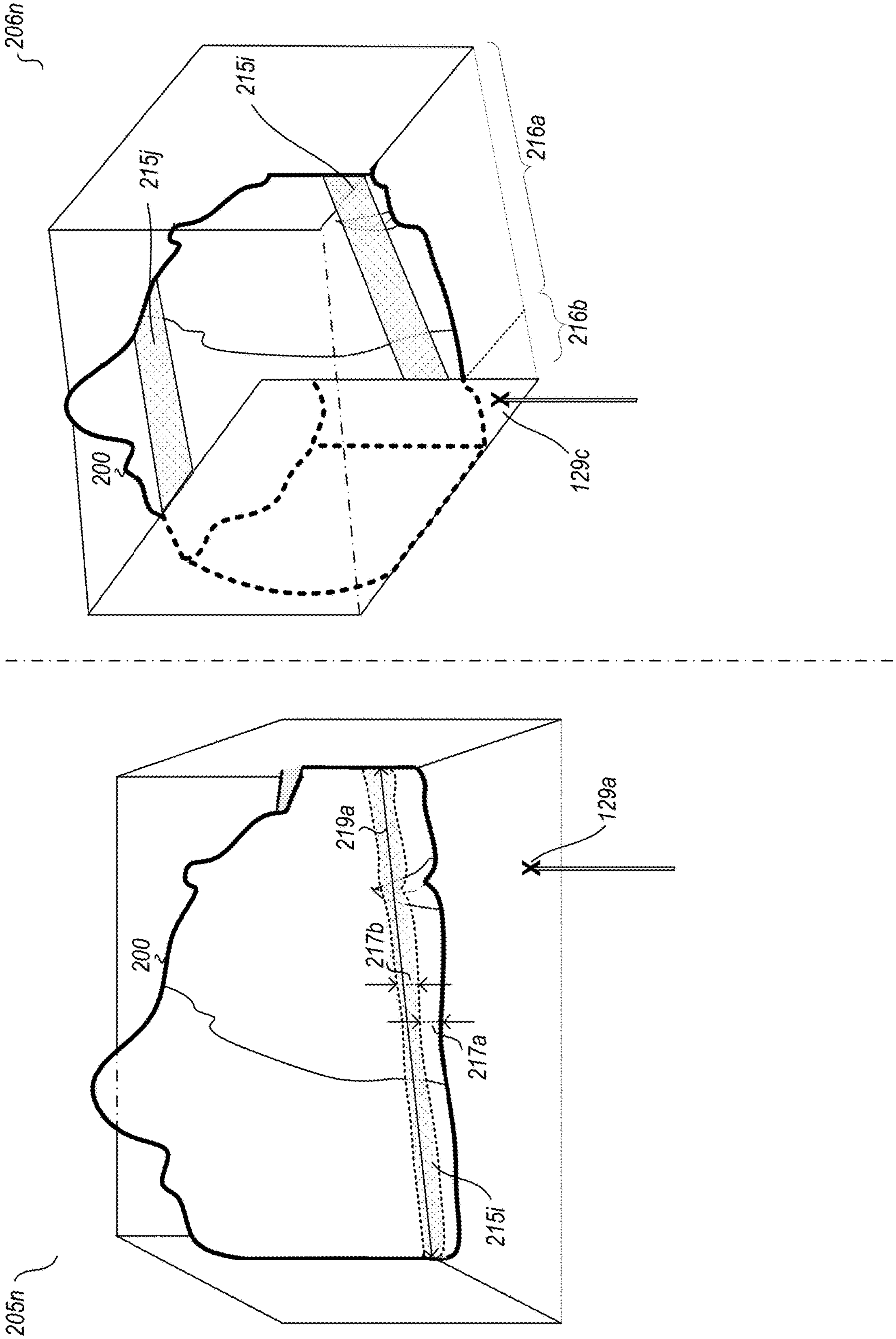
Figure 2P:
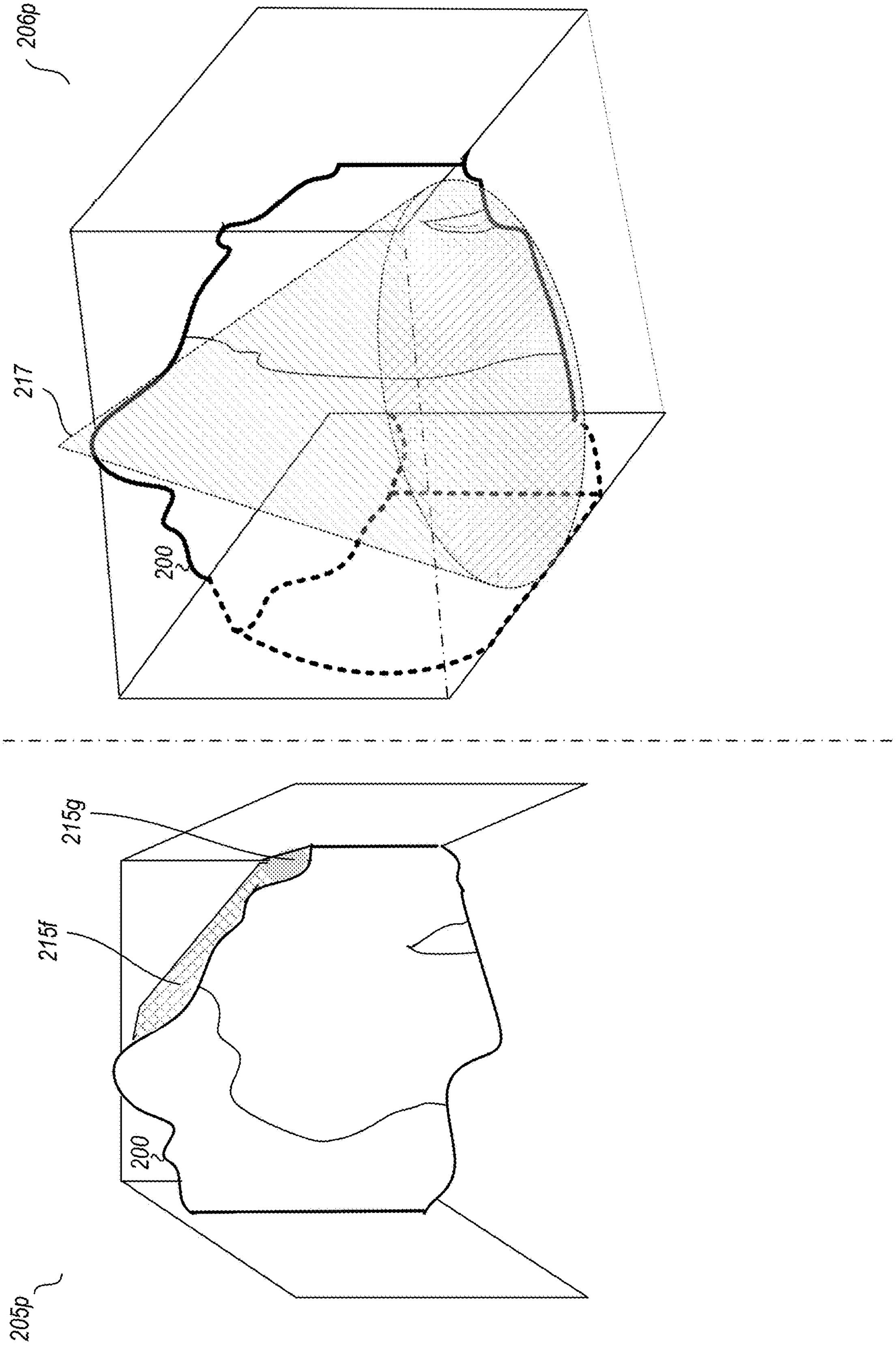
Figure 2Q:
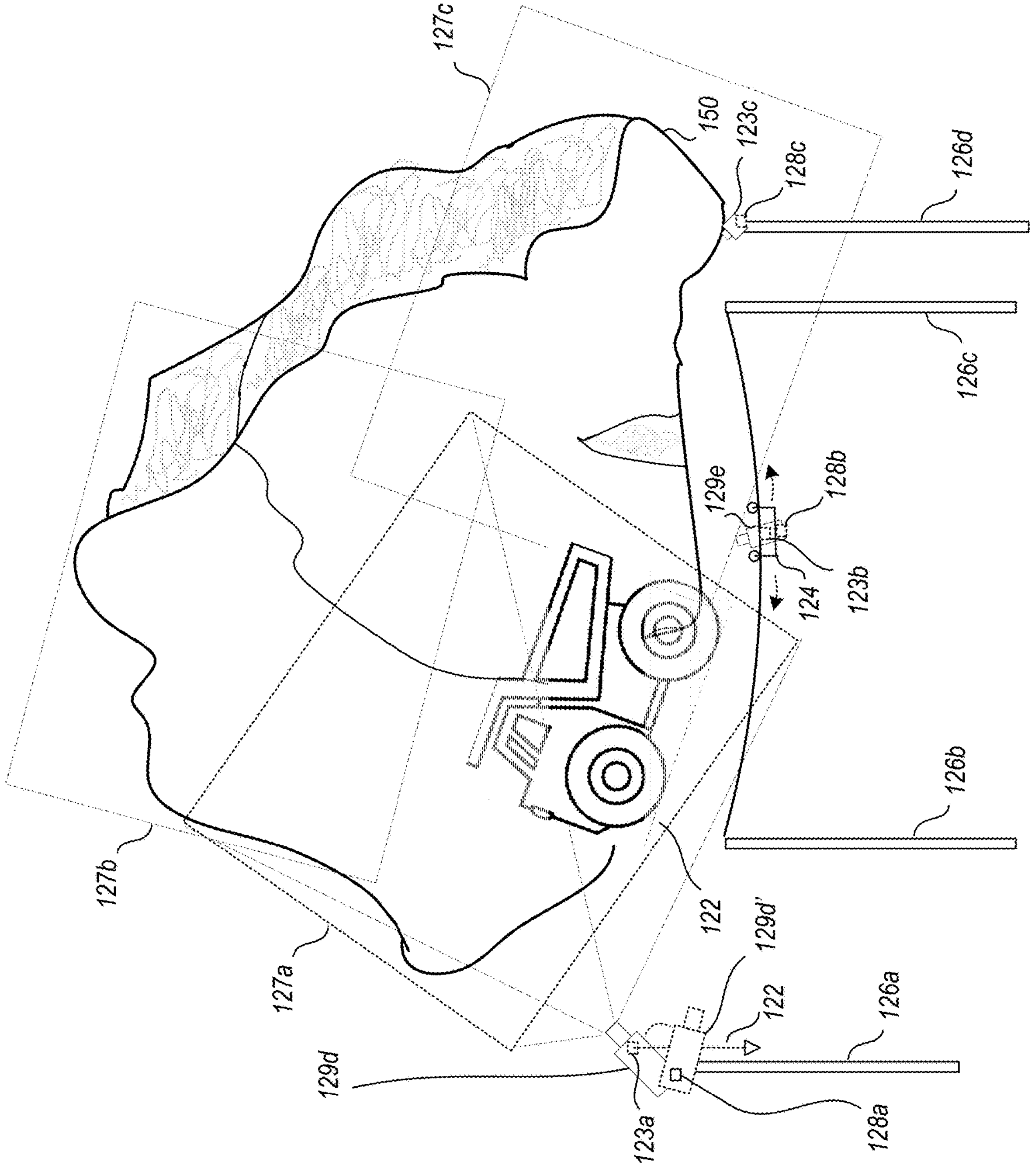

While the example of FIG. 1 involves multiple fixed-location camera devices 129 (e.g., with fixed orientations) and optionally an additional mobile device 110 to capture data regarding the object 150, in other situations and embodiments only a single fixed-location camera may be used, and/or additional fixed-location cameras may be used, and/or additional types of camera devices (e.g., one or more fixed-location cameras with variable orientations each having one or more associated motors used to adjust the orientation of that camera, one or more cable-mounted cameras each mounted at a fixed orientation to a structure that is attached to at least one cable and whose location among multiple contiguous locations along the cable(s) is controlled by one or more associated motors, one or more cable-mounted cameras each mounted to a structure that is attached to at least one cable and whose location among multiple contiguous locations along the cable(s) is controlled by one or more associated motors and that further each has variable orientations controllable by one or more associated motors, etc.), such as discussed in further detail with respect to FIG. 2Q and elsewhere herein. In addition, different devices and/or sensors may be used to acquire different types of data (e.g., simultaneously) in some embodiments, and the remote server computing systems and/or local computing devices (e.g., one or more fixed-location or otherwise physically mounted camera devices with computing capabilities, one or more other local computing devices at a site of the object and in communication with the fixed-location or otherwise physically mounted camera devices, etc.) may combine or otherwise use such different types of data-non-exclusive examples of types of data that may be acquired include image data in one or more light spectrums, non-light energy data, location data (e.g., via GPS), depth or distance data to the object, color data, sound data, etc. In addition, in some embodiments and situations, different devices and/or sensors may be used to acquire the same or overlapping types of data (e.g., simultaneously), and the remote server computing systems and/or local computing devices may combine or otherwise use such different types of data, including to determine differential information for a type of data. For example, one or more fixed-location or otherwise physically mounted devices in the environment may include GPS capabilities (or other location determination capabilities) and the mobile device may similarly include GPS capabilities (or other location determination capabilities), to enable image acquisition positions at a given time to be determined more accurately by tracking relative differences in the differing GPS data (e.g., to eliminate minor transitory variations or fluctuations from a GPS satellite or other common source of the GPS data), and such differential information may similarly be determined for some or all of the other types of data that may be captured. In addition, information such as GPS data or other location data may further be used to determine additional information about an object in some embodiments, such as to assist in determining rough scale information for the object—as one example, location data at different locations on a path or other exterior around the object may be used determine information about the width and/or length of the object, whether alone or in combination with additional data about depth or other distance values of a device or sensor to the object at particular such locations. However, such GPS data or other such location data may not have sufficient accuracy to create a 3D computer model with a desired level or threshold of accuracy in at least some embodiments and situations, such as to model features and other locations on a surface of an object to a scale of one or more inches or fractions of an inch, one or more feet, etc., and thus visual data of the acquired images may instead be used to determine object scale without such other location data in some embodiments.

FIG. 2Q continues the example of FIG. 1, and illustrates pile 150 in a manner similar to that of FIG. 1, but with additional details shown—in addition, while various elements shown in FIG. 1 may similarly be present and used in the embodiment of FIG. 2Q in an analogous manner to that described with respect to FIG. 1 (e.g., devices/systems 160 and 190, network 180, mobile cameras and associated image-capture vehicles 181-188, etc.), such elements are not illustrated in FIG. 2Q for the sake of brevity.

In the illustrated example embodiment of FIG. 2Q, physically mounted fixed-location camera 129*d* (e.g., mounted on pole 126*a*) with one or more imaging sensors (not shown separately) is further equipped with one or more motors 128*a* that enable use of the camera 129*d* as a pan/tilt camera in which the orientation of the camera from that fixed location may be varied (or optionally as a pan/tilt/zoom camera, although zoom capabilities are not illustrated in this example), such as to be controlled by the IOEA system 160 (not shown)—camera 129*d* may, for example, correspond to one of cameras 129*b* and 129*a* of FIG. 1. As non-exclusive examples, a first orientation of camera 129*d* may result in a field-of-view 127*a*, while other orientations of camera 129*d* may result in other fields-of-view (e.g., 127*b*, 127*c*, etc.), with multiple corresponding images of the pile 150 able to be captured from the camera 129*d* at a given time (e.g., over a period of seconds or minutes), and with an example version 129*d*' of the camera shown corresponding to field-of-view 127*c*. In addition, the camera 129*d* may further optionally include one or more additional sensors or other devices 123*a* in this example to provide additional data that is used, such as one or more accelerometer sensors that provide a direction 122 of gravity or that otherwise enable the orientation of the camera 129*d* to be determined, one or more depth-sensing devices with sensors that are part of or coupled to the camera 129*d* (e.g., to point in the same direction/orientation as the camera 129*d*) and that provide depth data to supplement the visual data, etc. It will be appreciated that visual data and/or other data depth may be acquired in various manners from the camera 129*d* and any associated sensors/devices 123*a* as the orientation of the camera 129*d* changes, such as to capture some or all such data in a continuous or substantially continuous manner as the orientation changes (e.g., to capture video or separate images that are separated by only small amounts of time and/or degrees of orientation, such as milliseconds or seconds and such as fractions of a degree or degrees; to similarly capture depth data in a continuous or substantially continuous manner as the camera orientation sweeps over the visible surface of the pile; etc.), to capture some or all such data at separate orientations after the camera has moved to that orientation and stopped (optionally separated by time periods of seconds or minutes or hours or days), etc.

FIG. 2Q further illustrates a physically mounted variable-location camera 129*e* (e.g., mounted on a rig or other structure 124 that is attached to and moveable along a cable positioned between poles 126*b* and 126*c*) with one or more imaging sensors (not shown separately) and such that one or more first motors (not shown) may be used to move the camera 129*e* to multiple positions along the cable and enable its use as a cable-mounted camera (e.g., motors on the structure 124 that move it along the cable; motors on one or more of poles 126*b* and 126*c* that move the cable, such as using pulleys; etc.), such as under control of the IOEA system 160 (not shown)—the camera 129*e* may further have a fixed orientation or optionally have one or more second motors 128*b* that allow the orientation of the camera 129*e* from those multiple locations to be varied (and optionally to further act as a zoom camera, although zoom capabilities are not illustrated in this example), such as under further control of the IOEA system 160 (not shown). Accordingly, the camera 129*e* may move to multiple locations along the cable and may further optionally have multiple orientations at one or some or all such multiple locations, with multiple corresponding images of the pile 150 able to be captured from the camera 129*e* at a given time. In addition, the camera 129*e* may further optionally include one or more sensors/devices 123*b* similar to those of sensors/device(s) 123*a* to provide additional data that is used (e.g., one or more accelerometers, one or more depth-sensing devices, etc.). It will be appreciated that visual data and/or other data may be acquired in various manners from the camera 129*e* and any associated sensors/devices 123*b* as the location and/or orientation of the camera 129*e* changes, such as to capture some or all such data in a continuous or substantially continuous manner as the location and/or orientation changes (e.g., to capture video or separate images that are separated by only small amounts of time and/or degrees of orientation, such as milliseconds or seconds and such as fractions of a degree or degrees; to similarly capture depth data in a continuous or substantially continuous manner as the camera orientation sweeps over the visible surface of the pile; etc.), to capture some or all such data at separate locations and/or orientations after the camera has moved to that location/orientation and stopped, etc. It will be appreciated that a physically mounted variable-location camera such as camera 129*e* may be used in addition to or instead of one or more fixed-location cameras such as camera 129*d* (whether cameras with fixed orientation or variable orientation), and that images and/or other data (e.g., depth data) acquired at different locations may be aligned (e.g., into a common coordinate system) or otherwise combined to enable their use together.

FIG. 2Q further illustrates a physically mounted sensor/device 123*c* (e.g., a depth-sensing device with one or more depth sensors), optionally with one or more motors 128*c* may be used to move the sensor/device 123*c* to multiple orientations and enable its use as a pan/tilt sensor device, such as under control of the IOEA system 160 (not shown). Accordingly, the sensor/device 123*c* may optionally have multiple orientations at its fixed location (although in other embodiments may similarly also have multiple possible locations in a manner similar to camera 129*e*), with one or more corresponding sensor readings (e.g., depth scans) of the pile 150 able to be captured from the sensor/device 123*c* at a given time for each of one or more orientations (and each of multiple locations in other embodiments in which the sensor/device 123*c* may move to multiple locations). It will be appreciated that depth data and/or other data may be acquired in various manners from the sensor/device 123*c* (e.g., as the location and/or orientation of the sensor/device 123*c* changes), such as to capture some or all such data in a continuous or substantially continuous manner as the location and/or orientation changes (e.g., to capture depth readings that are separated by only small amounts of time and/or degrees of orientation, such as milliseconds or seconds and such as fractions of a degree or degrees as the sensor/device orientation sweeps over the visible surface of the pile; etc.), to capture some or all such data at separate locations and/or orientations after the sensor/device has moved to that location/orientation and stopped, etc. It will be appreciated that a physically mounted sensor/device such as sensor/device 123*c* may be used in addition to or instead of one or more fixed-location cameras such as camera 129*d* (whether cameras with fixed orientation or variable orientation), and/or in addition to or instead of one or more variable-location cameras such as camera 129*e* (whether with fixed orientation or variable orientation), and that depth data and/or other data acquired at different locations may be aligned (e.g., into a common coordinate system) or otherwise combined to enable their use together.

FIG. 2Q further illustrates an example of an obstructing object that blocks part of the surface of the pile 150 (a dump truck vehicle 122 in this example). It will be appreciated that a cable-mounted camera (such as camera 129*e*) and/or other cable-mounted sensor/device (e.g., depth-sensing device) may provide greater coverage of the surface of the pile 150 than a fixed-location camera (such as camera 129*d*) or other fixed-location sensor/device (such as sensor/device 123*c*) when such obstructing objects are present, such as by changing the location of the camera 129*e* and/or other cable-mounted sensor/device and optionally their orientation to capture various images (i.e., sensor readings from one or more imaging sensors) and/or other sensor readings from different locations and optionally orientations. While only a single pile is shown in this example, it will also be appreciated that a cable-mounted camera such as camera 129*e* and/or other cable-mounted sensor/device may in some embodiments and situations be able to provide image sensor readings and/or other sensor readings (e.g., depth scans) of multiple piles, such as multiple piles that are part of a single site.

It will be appreciated that the details discussed with respect to FIG. 1 and FIG. 2Q are provided for illustrative purposes, and that the described techniques are not limited to these example details.

Figure 2R:
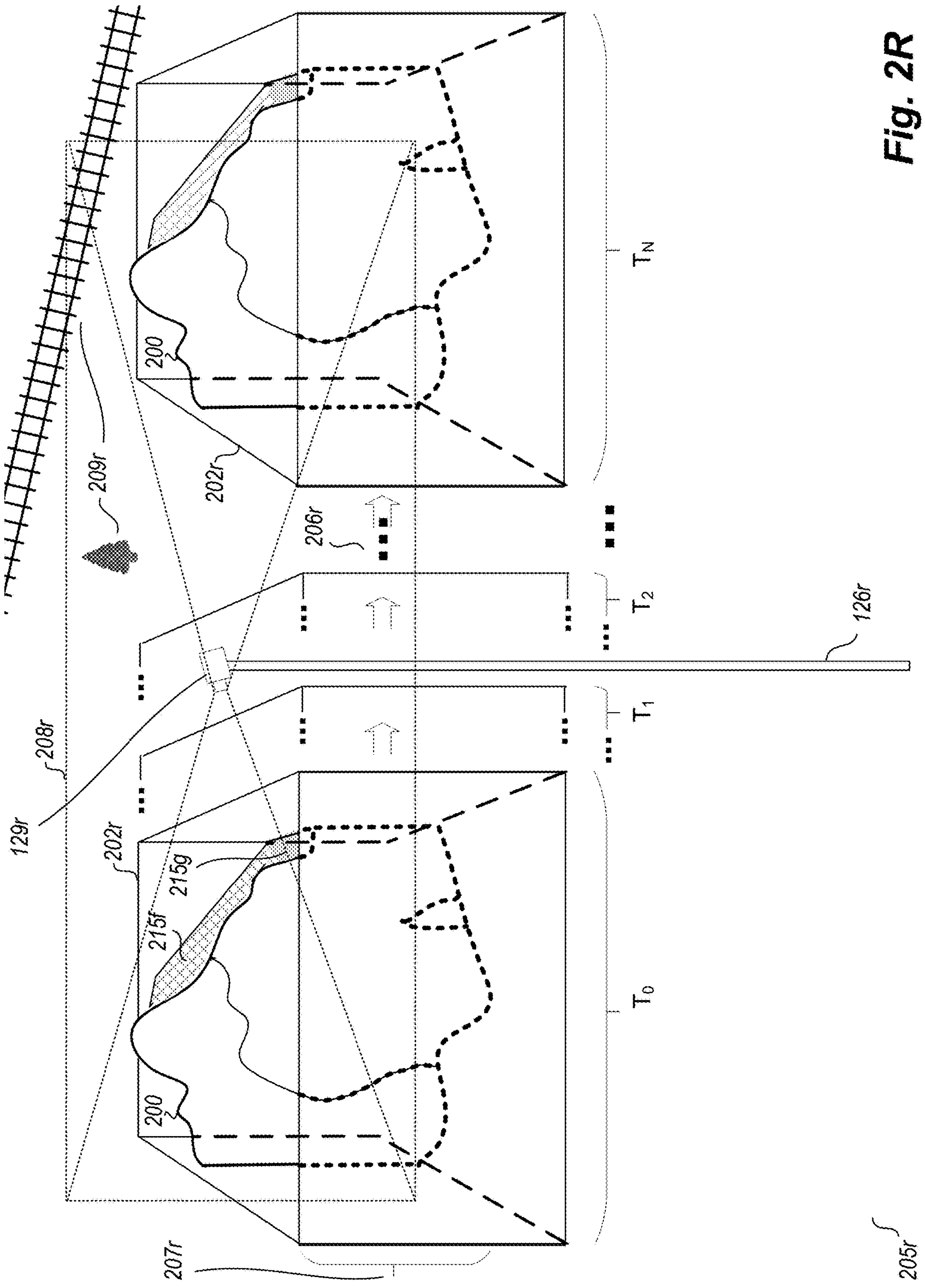
Figure 2S:
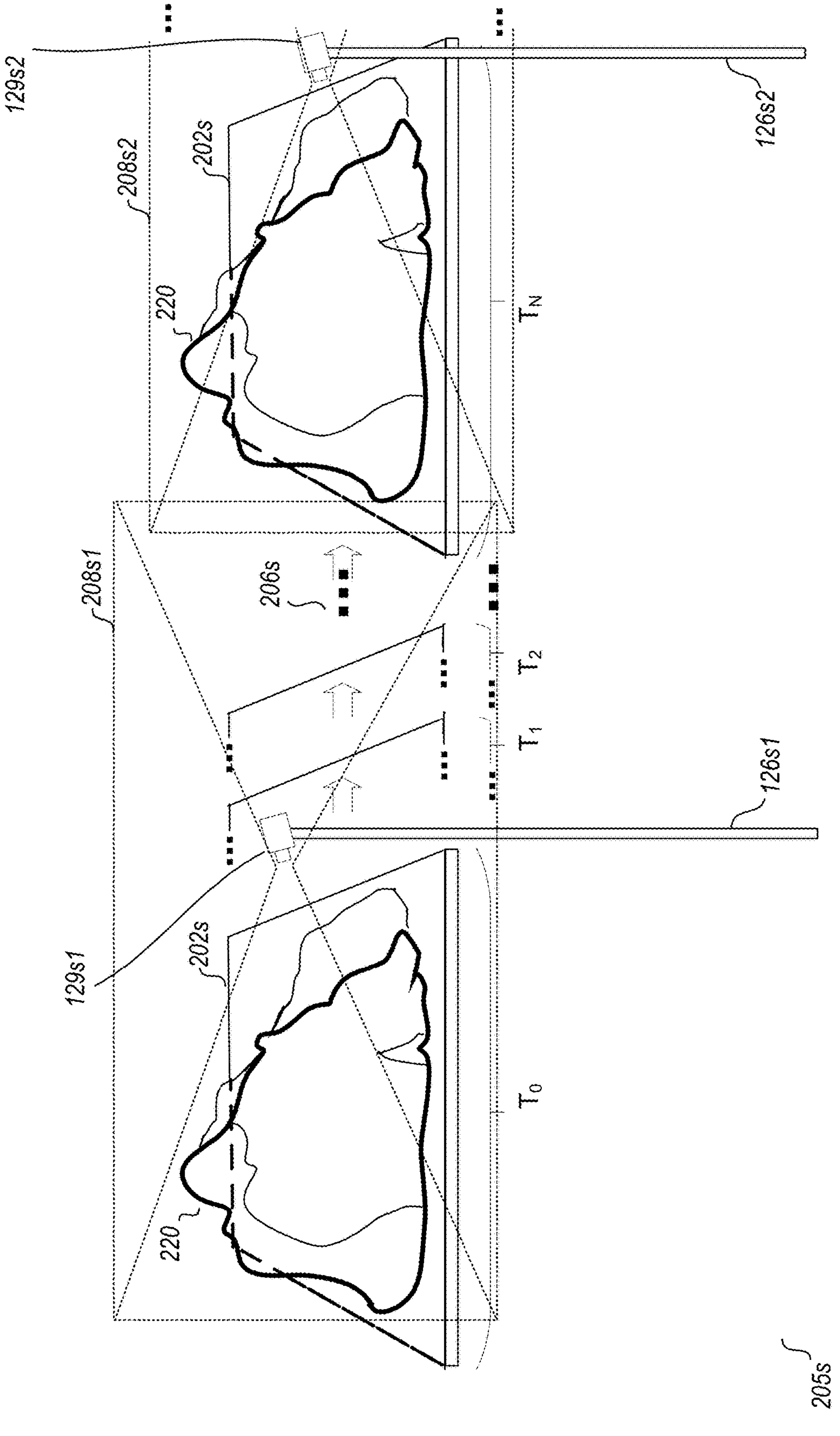
Figure 2T:
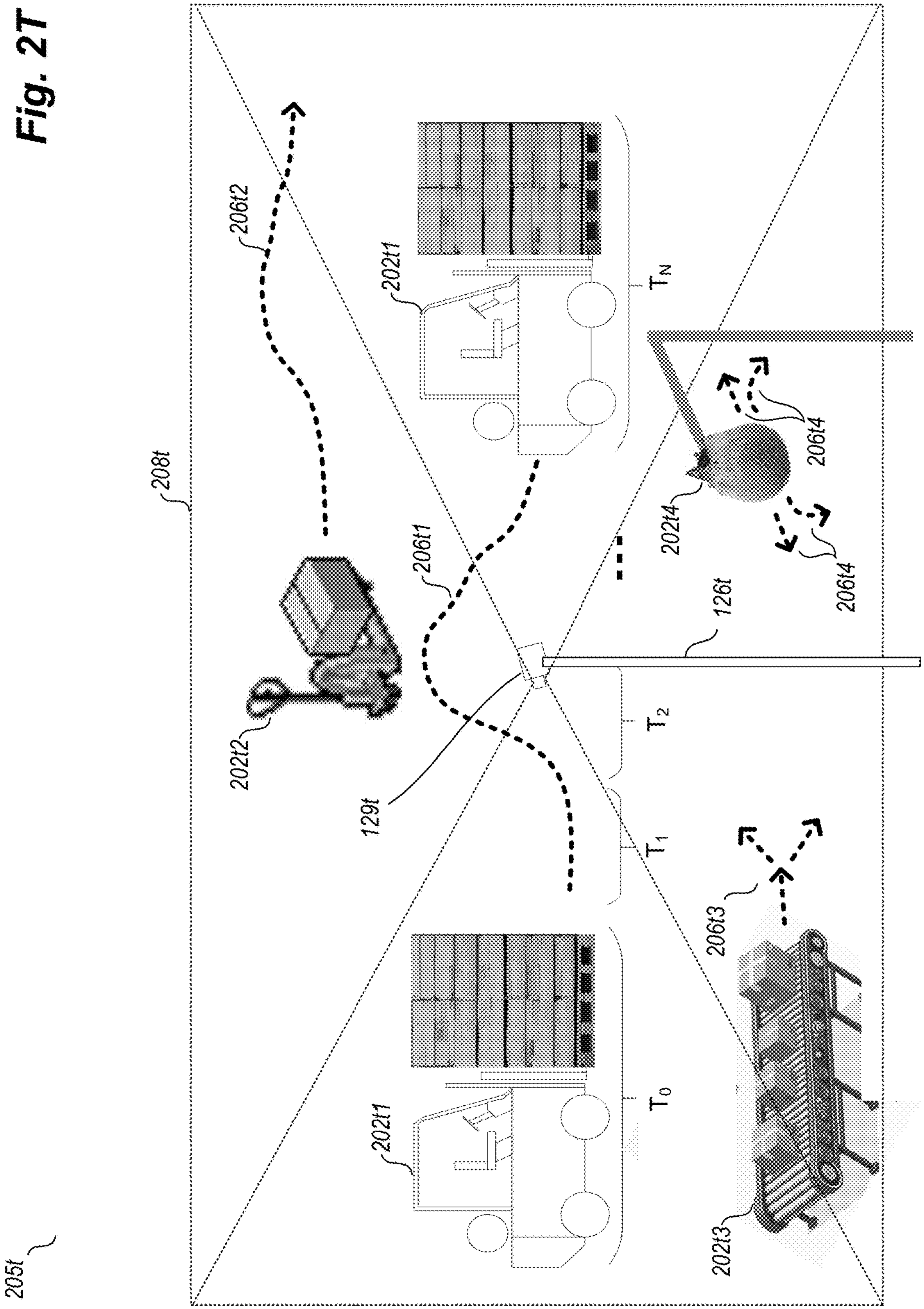

FIGS. 2R-2T continue the examples of FIGS. 1 and 2Q, and illustrate further non-exclusive examples of scenarios involving moving objects in which operations of the IOEA system may be used to provide functionality in generating and using 3D computer models of the moving objects.

In particular, FIG. 2R illustrates information 205*r* for an object 200 similar to that discussed with respect to FIGS. 2K-2P, but in which the object is being moved through an area monitored by a fixed location camera 129*r* on a pole 126*r* and is situated on a transporting vehicle or other transportation mechanism of which a portion 202*r* is shown—in this example, the enclosure portion 202*r* includes four sides but not a top (e.g., part of a train car or boat or truck/trailer), such that a lower portion 207*r* of the object is not visible from the point of view illustrated due to an intervening side of the enclosure (but with corresponding portions of the object being shown behind the side of the enclosure using dashed lines for the benefit of the reviewer), although a subset of that portion 207*r* may be visible from a higher point-of-view angle of the camera 129*r*. It will be appreciated that if a different type or transporting vehicle or other transportation mechanism is used that does not include sides or a top (e.g., a flatbed large or truck or trailer or railcar), such as is illustrated in FIG. 2S, the portion 207*r* of the object facing the camera 129*r* would instead be visible, although in this example scenario with a single camera with a fixed location, at least a backside of the object 200 will not be visible unless the object passes directly under a sufficiently wide-angle view of the camera and/or the object is rotated in part or in whole by the transporting vehicle or other transportation mechanism while passing through the point-of-view coverage of the camera, although multiple cameras on opposing sides of the object movement may capture all sides of the object (e.g., the object in its entirety) in other scenarios. In this example, camera 129*r* may operate in a manner similar to that of one or more of the cameras illustrated with respect to FIG. 2Q, and that one or more other cameras of the same or different types may similarly be used in an environment similar to that shown in FIG. 2R, in which the object is moving along a straight-line trajectory 206*r*, and in which the camera captures multiple images of the object during a period of time while it passes through field-of-view coverage 208*r* of the camera, such as a first image corresponding to time $T_0$, a final image corresponding to time $T_N$, and optionally one or more additional intermediate images for one or more intervening times. It will be appreciated that all images may not capture all of an object side facing the camera, such as if the final image captures only a portion of that object side while a farthest portion of the object has moved past the field of view of the camera, and that different positions of the object within the field-of-view will cause particular features of the object to shown in different locations of images captured for those different object positions. In addition, one or some or all of the images may further include visual data for other than the object, such as to show at least part of the enclosure 202*r* of the transporting vehicle or other transportation mechanism or other parts of the transporting vehicle or other transportation mechanism, and/or to show background information behind the object that may change only a little or not at all between the multiple images (in this example, a tree and railroad track 209*r*)—as is discussed in greater detail elsewhere herein, the processing of the multiple images may include identifying the pixels of each of the images that correspond to the object and segmenting them from other non-object pixels, such as for a segmented background portion of the image, such that further image analysis is performed only for the pixel subset corresponding to the object.

FIG. 2S continues the examples of FIGS. 1 and 2Q-2R, and illustrates information 205*s* for an object 220 similar to that discussed with respect to FIGS. 2A-2I, but in which a visible portion 202*s* of the transporting vehicle or other transportation mechanism does not have sides or a top, such that all of the object on a side facing the camera is visible to the camera. FIG. 2S further illustrates a situation involving using two cameras 129*s*1 and 129*s*2 with respective separate fixed locations (in this example attached to separate poles 126*s*1 and 126*s*2) and having separate fields of view 208*s*1 and 208*s*2, with each camera capturing one or more images of the object as it passes the cameras along a straight trajectory 206*s* through the fields of view over a period of time lasting from time $T_0$ to at least time $T_N$—it will be further appreciated that if one or both of the illustrated cameras have a motor to act as a pan/tilt and/or pan/tilt/zoom camera, then each such camera will have a plurality of fields of view corresponding to the various orientations at which the camera may be directed.

FIG. 2T continues the examples of FIGS. 1 and 2Q-2S and illustrates information 205*t* about multiple other example objects of multiple types that may be moved in other manners by other types of transporting vehicles or other transportation mechanisms. In particular, in this example, a forklift 202*t*1 is illustrated that is carrying multiple pallet objects along a nonlinear trajectory 206*t*1 over a period of time from $T_0$ to $T_N$—in such an example with multiple objects moving together as a group, each pallet may be modeled as a separate object or the group of pallets may be modeled together as a single object. In addition, another example transporting vehicle is shown in which a dolly 202*t*2 is carrying a box along a nonlinear trajectory 206*t*2, while a conveyor belt transportation mechanism 202*t*3 is shown moving multiple box objects along a trajectory 206*t*3 that has an illustrated split point in which some boxes may move to the left along a first further conveyor belt (not shown) while other boxes may move to the right along a second further conveyor belt (also not shown)—in this manner, a determined trajectory of movement of each box may be tracked to determine which split path is taken, such that the determined movement trajectories may differ for different objects. As yet another example, a crane 202*t*4 is illustrated carrying one or more objects within a net, with the movement of the crane and analogous movements of the corresponding objects below the crane able to move along a trajectory 206*t*4 that in this example may include linear and/or rotational movement in one or more dimensions. It will be appreciated that transportation mechanisms and objects of FIGS. 2R-2T are provided for illustrative purposes only, and are not intended to limit the scope of the invention.

As discussed in greater detail elsewhere herein, in situations in which two or more cameras are positioned to provide sufficient data (e.g., sufficient overlap in their views, proper spacing between the cameras, etc.), a 3D reconstruction of the object is performed, such as using photogrammetry and/or Structure from Motion (SfM) techniques. With only one stationary camera, 3D reconstruction techniques may further be used by using other data sources (e.g., previously captured images and/or previous 3D computer models; depth sensor data, such as via LiDAR or structured light; etc.) and/or other inferencing techniques (e.g., trained machine learning model(s), a determined object shape type, etc.).

In one non-exclusive example embodiment, the IOEA system performs 3D computer model reconstruction of a moving object in particular manners, which further enables measurement tasks such as volume computation, trajectory analysis, object counting, etc. Non-exclusive examples of such moving objects include the following: an open-top railcar (e.g., hopper car) that is carrying a pile of material; an open-top truck (e.g., haul truck, dump truck, etc.) that is carrying a pile of material; a flatbed truck carrying boxes, pallets, or other stacked material; a barge carrying material, where the barge may have walls that contain the material on its sides (e.g., a bin or hopper) or the barge may have a flat top with the material stacked as a freestanding stockpile; a hanging net containing objects such as boxes or cargo, where the net may swing around or rotate in place; an object on a rotating turntable; a conveyor belt moving one or more of objects, boxes, bags, pallets of material, etc.; a free-moving object or vehicle, or an object that can be picked up and moved by a vehicle (e.g., a pallet that can be moved by a forklift); etc. In order to recover 3D information from a scene where the one or more cameras are stationary and the object is moving, SfM techniques are used in this example embodiment—while typical SfM pipelines assume that the scene is static and the camera is moving, and provide estimated separate camera poses recovered for each of the images corresponding to the assumed camera movement, the IOEA system in this example embodiment still uses SfM processing in the situation in which the camera is stationary and the object is moving to recover 3D information about the object, along with optional additional processing to determine additional information of use. For example, to determine the trajectory of the moving object, the IOEA system computes 3D transformations that would align all of the cameras to the same pose for the actual stationary camera, and these transformations are then individually applied to the various images to recover the separate poses of the moving object at the various times that it was observed and imaged by the camera.

In this example embodiment, the IOEA system further uses feature tracking and/or feature matching to align and analyze the multiple images from the single stationary camera, with the feature tracking leveraging the temporal nature of the captured imagery from a single camera in order to identify and efficiently follow a 2D point in the multiple images over time, and the feature matching (if used) able to detect loop closures (e.g., portions of the input set of imagery where the object is seen from a similar perspective, such as the object rotating in place and returning to its initial position). Thus, the IOEA system can efficiently track an object through the imagery, and detect when the object has returned to a similar pose. As an example, consider a single camera observing an object on a rotating turntable where the background behind the object is blank. As the object rotates, the camera can capture images or video, which are then used for feature tracking in order to follow 2D points on the object's surface over time. As the object rotates, parts of the object's surface will rotate out of view, and new parts will become visible. Feature tracking will continue to identify new points on the surface and track them through the imagery. If eventually the object completes a full revolution, parts of the object's surface that had previously rotated out of view will be visible again. Feature matching and loop closure detection will identify these surfaces, and establish 2D correspondence between them. SfM processing may then use these feature tracks and loop closure correspondences to recover a 3D reconstruction of the object, as well as a set of camera poses that appear to rotate around the object, with the reconstruction representing the geometry, shape, and appearance of the object. For the purpose of analyzing the object's trajectory, the recovered motion of the cameras in the reconstruction represents the motion of the object (though it's inverted, as when the object in the scene moved in one direction, it appeared as if the object was stationary and it was the camera that was moving in the opposite direction).

In situations in which the object of interest does not consistently occupy the majority of the camera's view, the influence of the background of the imagery may be removed by the IOEA system in this example embodiment, such as using one or more of the following: use one or more trained machine learning models to create a pixel mask that distinguishes between different groups of pixels for the foreground object and the background (so that no feature tracking or matching within the background mask is performed); apply motion and/or color analysis to the imagery to identify any part of the image that does not move or change color over a certain period of time, which is identified as belonging to the background (e.g., background subtraction), so that no feature tracking or matching within the background mask is performed; apply feature tracking on the entire images, after which the motion of each track is analyzed, with tracks that remain stationary being identified as background scene content and excluded from further analysis (such that an explicit image mask is not created); etc. Once the influence of the background scene is removed, the remaining visual data of the imagery represents the foreground object of interest, with the SfM processing analyzing the object for the purpose of 3D reconstruction.

In situations in which multiple stationary cameras are used simultaneously, the IOEA system may further use the extra visual data from the second and further cameras (if any) to increase the completeness of the reconstruction and/or provide redundancy. In this example embodiment, to process data for multiple cameras, each camera may be initially processed independently, before combining the results of the processing. For example, feature tracking and object segmentation can be performed independently for the image(s) captured by each camera. Then, the data from each camera can be brought together to create a single, combined result, such as using one or more of the following techniques: use feature matching and optionally loop closure detection between images from different cameras, so that feature correspondences can be discovered that link the imagery from different cameras together (with subsequent SfM processing then combining all of the images and cameras together into a single reconstruction); using known relative poses of the cameras (e.g., from a calibration procedure performed to compute the position and orientation of each camera) and synchronized timestamps for the images from each camera (e.g., with all cameras capturing imagery at the same points in time) to align independent 3D computer model reconstructions from each camera, such as by performing a 3D reconstruction for each camera and then aligning the reconstructions together by aligning camera poses that were captured at the same time (taking into account the calibrated relative pose between them); interpolating poses of each camera in situations in which the images were captured at unique times but with synchronized clocks and aligning their respective determined trajectories (e.g., taking into account the known relative poses between the cameras) in order to recover a common coordinate system; etc.—the relative poses can also be used to help guide the feature matching and loop closure detection procedure, where having a known pose between two cameras limits the possible parts of the images that match together (e.g., given a 2D feature point in one image, there is a line segment, derived from epipolar geometry, of possible positions in the second image where the 2D feature can find its best match). If the relative poses between the cameras are not known, then the IOEA system performs an independent 3D reconstruction for each camera, and then aligns the reconstructions via 3D registration techniques, such as by leveraging 3D feature descriptors (ones that summarize local parts of the object's 3D geometry) and/or by iterative 3D alignment techniques such as the ICP (iterative closest point) algorithm.

In addition to providing additional imagery of an object, leveraging multiple cameras also enables the IOEA system to scale 3D computer model reconstructions to actual dimensions of the object, such as by using a calibration procedure to determine the relative distance between the cameras, and then using this distance to scale the final reconstruction by enforcing that the trajectories for the corresponding cameras maintain the specified distance between them. Conversely, if only a single camera is used, the IOEA system may scale the 3D computer model reconstruction using various priors such as the camera's known distance to the surface upon which the moving object resides (for example, if a camera is mounted along a roadway where trucks are driving or along train tracks along which train cars are moving, the reconstruction can be scaled based on the known distance between the camera and the roadway or train tracks by automatically identifying the roadway or train tracks as the lowermost point on the 3D reconstruction of the objects being carried by the trucks or train cars, or as the lowermost point on the 3D reconstruction of the trucks or train cars or other transporting vehicles themselves).

In situations in which one or more moving cameras are used, the IOEA system may further perform the image analysis using only the subset of image pixels corresponding to the object of interest. Such camera movement may be due to, for example, one or more of the following: the cameras not being completely stationary (e.g., not perfectly rigidly physically mounted) and pre-calibrated camera poses not being relevant; the cameras not being stationary at all and moving freely around the scene; etc. In such situations, the IOEA system segments the background from the foreground object of interest in the captured images of the object, with the influence of the background thus able to be removed even though the camera may be moving, and with the SfM processing used to recover a 3D computer model reconstruction of the object.

Given the 3D computer model reconstruction of a moving object, the IOEA system may further analyze its 3D shape to compute measurements such as dimensions, surface area, or volume, as discussed in greater detail elsewhere herein. The IOEA system may further use a reconstructed 3D computer model of a moving object to determine various additional information about the object and to provide additional corresponding functionality. As one example, the IOEA system may use object detection algorithms (e.g., using one or more machine learning models, statistical methods, or other techniques) to analyze the obtained object imagery and/or the generated 3D computer model reconstruction to detect the moving objects—this enables further processing to identify and/or disambiguate particular objects, including in some situations by using the generated 3D computer model reconstruction to manage situations in which information was not identifiable from the 2D imagery alone. For example, an object in an image can be classified into a particular category based on its 3D size, dimensions, or volume (for example, different pallets of material where a pallet needs to be identified based on its volume)—as objects continue to move and pass by the camera(s), they can be classified and counted, giving a final report at the end of the total number of objects of each category that were observed. As another example, the IOEA system may use information from the generation of the 3D computer model reconstruction to determine the object movement trajectory over time, including the object's 3D pose over time—as discussed in greater detail elsewhere herein, this may be determined using the estimated changing poses of a stationary camera, which represents the inverse motion of the object (when the object moves one direction, the apparent motion is the camera moving in the opposite direction). By using the 3D computer model reconstruction and recovered trajectory, the 3D position and rotation of the object can be determined for each point in time that it was observed by the camera imagery, and with poses between such imagery points optionally interpolated or otherwise estimated. Such movement trajectory information may, for example, identify which of several paths an object took as it moved (e.g., did a box divert to the left or right at a particular point along a conveyor belt), whether the rotation of an object satisfies one or more defined criteria (e.g., did a box rotate as it moved along a conveyor belt), whether an object did not move at particular times (e.g., a box was moving along a conveyor belt but stopped for an extended portion of time). As yet another example, by performing object identification to detect and classify objects using 2D and/or 3D data and combining that information with object movement trajectory analysis, the IOEA system may further recover and analyze information about interactions between objects. For example, from a 2D image alone, it may be unclear if a vehicle is interacting with an object or is just near it (e.g., is a forklift positioned in front of a pallet and ready to lift it or is the forklift just near it; has a front loader driven its bucket into a stockpile and is ready to remove material, or is the front loader just driving around the pile; etc.). This kind of interaction analysis can be unclear using 2D imagery alone, but the IOEA system may determine such information using the 3D computer model reconstruction and determined object movement trajectory in the example embodiment in at least some situations.

FIGS. 2A-2H illustrate various example images that may be acquired with respect to an object of interest (e.g., such as for the stockpile object 150 of FIG. 1), such as by one or more mobile devices (e.g., mobile device 110 of FIG. 1), as well as corresponding analysis of the images that may be performed in at least some embodiments.

With respect to FIG. 2A, an example image 205*a* is shown, which includes a side view of an object 200, with the object in this example representing a stockpile of construction aggregate materials (e.g., the same as or similar to object 150 of FIGS. 1 and 2Q). The image 205*a* further includes additional information that is not part of the object 200, such as other objects 210 (in this example a tree and a cloud), a base surface 225 on which the object 200 and at least some other objects (e.g., the tree 210) rest, a horizon line 235, etc.—it will be appreciated that the surface 225 may in some situations be flat and level, while in other situations the surface may be sloped and/or irregular.

In addition, in this example, the exterior of the stockpile object 200 may include various visible aspects, at least some of which are shown in the image 205*a*, and which may be reflected in detectable features via an automated analysis of the image. For example, the surface of the object 200 may have varying textures, colors, and shades (although colors and textures are not illustrated in this example, and shading is shown only with respect to feature 215*e*), such as to reflect a type of material of the object, position of the sun or other lighting source, an angle of the object surface with respect to the viewpoint location of the imaging device, etc. In addition, the surface of the object 200 may have various irregularities or other features that may be identified in the image and used to track changes between images—in this example, various example features 215 are illustrated. Such features may include, for example, points along a top of a silhouette or other outline 220 of the object, such as feature 215*b* at an overall peak of the object 200, and feature 215*a* that corresponds to a local high point of the outline. In addition, other example features include feature 215*d* along the outline 220 of the object 200, such as based on its distinctive shape, feature 215*c* along a ridge line 230 of the object surface 220 that is not part of the object outline (from this view), feature 215*e* that indicates a local cavity or indentation on a portion of the surface (with shading added to show that it may have a darker color relative to other surrounding parts of the surface), etc. While feature 215*e* provides one example of a feature on the surface of the pile, a variety of other types of surface features may similarly be identified and used, including, for example, based on differing colors, shading, textures, angles, curvature, lack of continuity, etc. between different locations on the surface; based on cavities, indentation, protrusions, protuberances, lines, or other shapes; based on changes from one material type to another; etc. Thus, such features may include structural features that are identified based at least in part on their shape or other structure and/or appearance features with visible elements (e.g., patterns, colors, textures, etc.). It will be appreciated that a variety of types of features may be identified and selected in various manners, including in a manner specific to the type of image analysis that is performed.

FIG. 2B continues the example of FIG. 2A, and in particular illustrates an example of an image 205*b* based on image 205*a* of FIG. 2A, but in which data for a portion of the image corresponding to the object 200 is shown, while data for other portions of the image have been removed, such as based on analysis of the image 205*a*. In other embodiments, such a separation of an object portion of the image from non-object portions of the image may not be performed at all, or may be performed at a time of generation of a corresponding model.

FIG. 2C continues the examples of FIGS. 2A-2B, and in this example illustrates an image 205*c* based on image 205*a* of FIG. 2A, but in which only a portion of the information about the object 200 is shown. In particular, in this example, only outline or silhouette information 220 for the object 200 is shown, such as if lighting conditions prevent other surface features from being visible, and/or based on a type of image analysis (e.g., line detection or object boundary detection) that is performed. It will be appreciated that some embodiments may not use such outline information, while other embodiments may do so. In this example, the outline information of FIG. 2C still allows some current features of the object to be identified, such as features 215*a*, 215*b*, and 215*d*—however, surface-related portions of the object are not visible in this example, such as ridge line 230 and features 215*c* and 215*e*.

FIG. 2D continues the examples of FIGS. 2A-2C, and includes an example of a successive image 205*d* that may be acquired for the object 200 from a location very near that of the location at which image 205*a* of FIG. 2A was acquired, such as to correspond to one of the locations 125 illustrated in FIG. 1 relative to an initial starting location 120*a* (e.g., if image 205*d* is a digital image frame from a video taken by the mobile device that is near a frame corresponding to image 205*a* of FIG. 2A in the sequence of acquired frames). In the example of FIG. 2D, the image 205*d* varies only slightly as the mobile device begins to move to the right, such as to illustrate a slight additional portion 200*d* of the object. Accordingly, at a time of image selection for the group of images to represent the object 200, only one of images 205*a* and 205*d* may be selected, such as due to a relatively small amount of additional information available in the second of the two images relative to the first of the two images.

With respect to FIG. 2E, it illustrates an example of an image 205*e* similar to that of image 205*a* of FIG. 2A, but in which the image 205*e* has one or more quality problems, such as due to improper positioning of the mobile device when taking the image 205*e*, and/or due to features of the environment being imaged. In particular, as is illustrated in FIG. 205*e*, the image 205*e* is skewed or tilted (e.g., as illustrated by the horizon line 235), and one or more portions 234 and 236 of the object 200 have not been captured in the image due to improper positioning of the mobile device capturing the image. Accordingly, for such an example image 205*e*, if image monitoring is being performed, the quality of the image may be determined to be below a specified threshold or to otherwise not meet one or more specified quality criteria, such as with respect to degree of motion between images and/or for other reasons, and the image 205*e* may be discarded from further consideration (or not selected for use in the image group for the object) due to that failure. Missing portions 234 and 236 may, if not corrected and/or supplemented in other images, reduce an amount of data used to model the object (e.g., require data interpolation to estimate corresponding portions of the object, such as to estimate a flat top or more rounded top to reflect portion 234), and thus reduce a degree of completion and corresponding automated confidence value in the resulting model of the object, as discussed in greater detail elsewhere herein. In addition, FIG. 2E further provides examples of extraneous objects (in this example, a tree 237 external to the pile, vegetation 238 on the pile, and water 239 adjacent to the pile's boundary with the underlying surface) that for other images, depending on a location of the mobile device taking those images, could obstruct a portion of the pile of material and/or of the toe portion of the pile, and thus provide other quality problems that similarly reduce an amount of data used to model the object, with resulting confidence reduction in related object attributes (e.g., the object volume). Other such potential obstructions that block views of the object could include, for example, a vehicle and/or equipment (not shown) used to create or maintain the pile (e.g., a conveyor belt or crane to carry materials to upper levels of the pile), a human, an animal, etc. The puddle or other water 239 adjacent to the pile and proximate to the toe portion of the object may cause quality problems, as reflections from the water in images could make it difficult to determine the boundary of the object and underlying surface from analysis of those images, and/or the presence of the water may make it difficult to determine a location of the underlying surrounding surface from analysis of those images, such as by reflecting the object or other material. Such quality problems may reduce an amount of data used to model the toe area and/or underlying surface, and thus reduce a degree of completion and corresponding automated confidence value in a resulting model of the toe and/or underlying surface (and thus related object attributes such as the object volume), as discussed in greater detail elsewhere herein. Similarly, missing portion 236 may, if not corrected and/or supplemented in other images, reduce an amount of data used for a resulting model of the toe and/or underlying surface, and thus also reduce a degree of completion and corresponding automated confidence value for object attributes (e.g., object volume). While not illustrated in FIG. 2E, other image problems may occur from an adjacent pile (or other object) that partially overlaps with a portion of the pile of interest, and/or from a wall or other thing enclosing at least some of the object, thus causing problems for both toe and underlying surface detection and modeling, and for modeling of the pile itself. In addition, or alternatively, user feedback may be provided to a user that is carrying or operating the mobile device based on one or more such detected quality problems with image 205*e* (e.g., shortly after acquiring the image 205*e* and/or other related images), such as to indicate one or more of the problems that exist with respect to the FIG. 205*e*. For example, a variety of feedback messages may be displayed or otherwise indicated to the user, such as, for example, "user motion too fast", "image contrast too low", "object not centered in image", "mobile device skewed/tilted", "obstruction(s) detected", "obscuring vegetation detected", "adjacent water detected", "overlapping adjacent object detected", etc.

FIG. 2F continues the examples of FIGS. 2A-2E, and in particular illustrates an image 205*f*. In this example, the image 205*f* continues to correspond to object 200, but from a different viewpoint than that used for image 205*a* of FIG. 2A, such as from location 120*b* of FIG. 1. In this example, all features 215*a*-215*e* continue to be visible in image 205*f*, along with an additional portion 200*g* of object 200 relative to that of image 205*a*, based on the change in location.

FIG. 2G continues the examples of FIGS. 2A-2F, and in particular provides a view 206*g* that combines portions of images 205*a* and 205*f* of FIGS. 2A and 2F, such as to illustrate relative changes between features 215*a*-215*e* from those images. In particular, outlines of the object 200 from both images are shown overlaid on each other in view 206*g*, with dotted lines being used for the outline from image 205*a*, and with solid lines being used for the outline from image 205*f*. In addition, arrows 245*a-e* have been added corresponding to portions of features 215*a*-215*e*, respectively, to show an amount of movement of those features between the two images. Such information may be used in various manners, including to determine an amount of apparent motion between the images (e.g., based on the movement of the mobile device), an amount of overlap between images and/or additional portions of the object exterior that may be available from one image to another, etc.

FIG. 2H continues the examples of FIGS. 2A-2G, and illustrates an example image 205*h* that corresponds to object 200 from an additional location, such as from location 120*c* of FIG. 1. In this example, it can be seen that feature 215*a* is no longer visible due to the change in the view, such as based on other portions of object 200 obscuring those features, and additional portions 200*h* of the object 200 are shown relative to that of image 205*a*. Accordingly, when selecting images for the group to represent the object 200, and if image 205*a* is selected as an initial starting image, images 205*d*, 205*e*, and 205*h* of FIGS. 2D, 2E, and 2H, respectively, may not be chosen as a next selected image for the group for different reasons. As previously noted, image 205*e* may be discarded to its quality problems, while image 205*d* may not be chosen due to its relative lack of additional information compared to image 205*a* (due to the small change in location from which the additional image is acquired). Conversely, image 205*h* may not be preferred as a next image in the group after image 205*a* due to a relative large change in location for the two images, including to lose the ability to map features such as 215*a* between images 205*a* and 205*h* due to the change in location. Thus, in the examples of FIGS. 2A-2H, an image corresponding to information 205*g* of FIG. 2G for the updated pile position may be selected as the second image to include in the selected group to represent the object 200, after that of image 205*a* of FIG. 2A, and additional images may be further selected from other views 200 (e.g., to select image 205*h* as a next image after the image corresponding to information 205*g*), so as to include further overlapping portions that, in aggregate, include all of the exterior of the object.

More generally, in at least some embodiments, a goal of photogrammetric reconstruction is to take a set of input images that capture a scene including one or more objects of interest, and to recover the geometric and photometric (including hyperspectral information if captured in the images and/or by associated sensors) properties of the scene, as well as the geometric and intrinsic properties of the cameras associated with the input images. The outputs of such a process include, but are not limited to, the following: 3D representation of the scene's geometry and structure; texture and material properties of the scene's contents; 3D camera poses from which the images were taken; and camera and lens characteristics, with such techniques referred to at times as a 'photogrammetric reconstruction pipeline'. Given an input set of images, the first step in the reconstruction pipeline is to determine which images observe common parts of the scene. This can be accomplished through, for example, the use of 2D feature extraction, image retrieval, feature matching, and geometric verification. A goal of feature extraction is to identify distinct 2D locations (keypoints) within an image, and generate unique yet meaningful representations (numeric descriptors) of those locations' appearances in the image. These identified locations are preferably repeatable, such that if the same scene content is observed in another image, the corresponding identified 2D feature locations preferably lie on the same parts of the scene's content. Likewise, the representations of the same scene element preferably have a similar numeric value. Feature detectors to find keypoint locations may identify distinguishable locations such as image or scene corners or points of high contrast to their surroundings. Additionally, they may summarize geometric characteristics of the locally detected area, such as scale, orientation, or skew. Such feature descriptors may, for example, summarize the intensity, gradient, or color of the keypoint's local neighborhood in the image. Once features are extracted from every image, pairs of images are determined that are likely to have the same content, which is accomplished in some embodiments by generating a numeric descriptor that represents the entire image, where the descriptor is typically formed by summarizing the 2D features found in the image, so that only those image pairs with similar global representations may be considered for further overlap verification. Given candidate pairs of images with potential image overlap, the next step in the reconstruction pipeline is to find associations between the 2D features within the images, such as by computing the distance between the 2D feature descriptors' numeric representations, and selecting those pairs of descriptors from opposite images that have sufficiently high similarity, although additional match criteria may be employed in some embodiments to help refine the set of matched features. It will be appreciated that the selection of various images may be performed in various manners and using various techniques, as discussed in greater detail elsewhere.

FIGS. 2I-2J continue the examples of FIGS. 2A-2H, and illustrate some techniques for performing verification activities of a generated computer model of an object, while FIG. 2N illustrates other alternative techniques for performing verification activities of a generated computer model of an object. In particular, FIG. 2I continues the examples of FIGS. 2A-2H, and illustrates an example image 205*i* that is similar to image 205*h* of FIG. 2H, but in which various additional information is illustrated with respect to performing automated verification activities for the computer model(s) of the object and object attribute values resulting from the computer model(s). In particular, for the sake of discussion with respect to FIG. 2I, the representation 200*i* of the stockpile object 200 being modeled represents a rendered surface of a computer model generated from the image data acquired in FIGS. 2A-2H and optionally additional images (not shown) from other vantage points around the exterior of the object, and additional information 275-295 is added in FIG. 2I for the purpose of explaining some of the automated verification activities that may be performed.

As one example of automated verification activities illustrated with respect to FIG. 2I, automated operations may be performed to determine the confidence in a boundary of the modeled object and the underlying surface. In particular, and as discussed in greater detail elsewhere herein, various data points 282 may be acquired from portions of the surface area external to the object (with only partial limited sets of data 282 being shown in FIG. 2I for the sake of illustration), and may be used to generate an initial estimate of a base surface on which the object is situated. With respect to an initial estimate of a boundary or edge 270 of the object (with a non-visible portion 270*i* being illustrated with respect to the backside of the modeled object relative to the current view location), a lower toe portion 283 of the object above that boundary may be identified (shown in this example for only a small part of the object for the sake of illustration), and additional automated operations may be performed to refine the edge location and/or identify whether the toe portion of the object is likely to be accurately represented, such as based at least in part on one or more slope values and/or based at least in part on completeness of visual data for the toe (as discussed in greater detail with respect to FIG. 2N). FIG. 2J further illustrates additional example details related to such automated boundary verification activities. Furthermore, in some embodiments and situations, user-supplied information may assist in determining at least some of the boundary or edge 270, such as by a user after images have been acquired (e.g., based on manual input on images displayed via a GUI) and/or as part of the image acquisition process (e.g., by a user directing the image acquisition so that the boundary or edge 270 is at a specified location, such as at the bottom of the acquired images).

As another example of automated verification activities illustrated with respect to FIG. 2I, automated operations may be performed to determine the confidence in data coverage of the modeled object, such as with respect to its surface area and/or volume. In particular, and as discussed in greater detail elsewhere herein, a 2D grid 275 of cells may be generated under the surface of the modeled object (shown in this example for only a small part of the object for the sake of illustration), and a subset 295 of the surface of the modeled object above a particular cell may be examined to determine a quantity and/or density of data points 285 that are located in that surface subset 295, although other techniques for representing acquired data and/or data coverage may instead be used in other embodiments. After such operations are performed for each cell, the percentage (or other amount) of cells that are sufficiently supported by image-acquired data may be used as part of determining confidence in resulting surface area and/or volume values for the modeled object. FIG. 2J illustrates additional example details related to such automated data coverage verification activities.

FIG. 2J continues the example of FIG. 2I, and illustrates example information 205*j* that is similar to portions of information 275-295 of FIG. 2H, but in which various additional information is illustrated with respect to performing automated verification activities for the computer model(s) of the object and object attribute values resulting from the computer model(s). In particular, in a manner similar to information 282 and 283 on the lower right side of the object representation of FIG. 2I, related information 282 and 283 is illustrated in FIG. 2J along with additional information 281, 284 and 286-288. The information 282 of FIG. 2J represents a portion of an underlying surface outside a boundary 281 of a modeled object, and the information 283 of FIG. 2J represents a toe portion of the modeled object. In this example, contour lines have been added to the toe portion to provide a visual indication of slope, such that automated assessment and possible refinement of the object boundary may, depending on an amount of slope in an area 284 of lower slope in the search ring (relative to other areas 286 and 287 with higher slope), determine to exclude some or all of the lower-slope area 284 from the modeled object, and move the initial object boundary accordingly, although a revised object boundary is not illustrated in this example. While contour lines are not similarly illustrated for the underlying surface 282 in this example, the slope of that underlying surface may similarly be evaluated. If particular portions of the toe have a slope that is too low (e.g., relative to a slope, if any, of the overall underlying surface), uncertainty may exist regarding whether those toe portions are actually part of the object, while a sufficiently high slope for other portions of the toe may increase confidence that those toe portions are correctly identified as being part of the object. While particular low-slope and/or high-slope portions of the toe portion are not identified, a subset 288 of the object boundary has been identified as being a portion with associated toe surface that is either sufficiently high to affirm that boundary portion (e.g., as being a "good" boundary) or sufficiently low to disaffirm that boundary portion (e.g., as being a "bad" boundary). When performed for all portions of the modeled object's boundary, a corresponding percentage or other amount of the boundary that is affirmed (or not affirmed) may be calculated, and used to determine verification (or lack thereof) of the modeled object's boundary and resulting object attribute values, such as by determining whether the percentage or other amount satisfies one or more boundary accuracy thresholds. FIG. 2N illustrates an alternative technique for verifying coverage of the object's toe portion, as discussed in greater detail elsewhere herein.

In addition, and in a manner similar to the information 275, 280, 285 and 295 of FIG. 2I, related information 280, 285 and 295 is illustrated in FIG. 2J along with additional information 277 and 278*a*-278*g*. In particular, the cell 277 of FIG. 2J represents a particular cell in the grid 275 of FIG. 2I, the area 295 continues to represent a portion of the surface of the modeled object above that cell 277, and the data points 285 continue to represent image-acquired visual data that provides coverage of that surface portion 295. In this example, the column above the 2D cell 277 has further been separated into multiple 3D cells, with the indicators 278*a*-278*g* showing the upper boundary of each successive 3D cell in the column from bottom to top. In this example, the surface portion 295 extends through two of the 3D cells with upper boundaries 278*d* and 278*e*, and with the three 3D cells with upper boundaries 278*a*-278*c* being fully below the surface portion 295. The 3D cells of FIG. 2J may be used in some embodiments as part of determining a confidence in sufficient data coverage for a volume value for the object. For example, if the data points 285 are determined to be sufficient data coverage for the surface portion 295 (e.g., have a sufficient density), the corresponding volumes of at least the three 3D cells with upper boundaries 278*a*-278*c* may be affirmed as being sufficiently verified, and optionally some or all of the two enclosing 3D cells with upper boundaries 278*d* and 278*e* may similarly be marked-alternatively, if the data points 285 are determined to not be sufficient data coverage for the surface portion 295, the corresponding volumes of those 3D cells may be disaffirmed as not being sufficiently verified. When performed for all 3D cells under the modeled object's surface, a corresponding percentage or other amount of the volume that is affirmed (or is not affirmed) may be calculated, and used to determine verification (or lack thereof) of the modeled object's volume value, such as by determining whether that percentage or other amount satisfies one or more corresponding surface coverage thresholds. As discussed in greater detail elsewhere herein, other embodiments may determine sufficient data coverage for such 3D cells in other manners, including based on an individualized probability that is determined for each cell of it being sufficiently covered by the image-acquired data.

As noted above, once a set of images to represent a pile or other object (e.g., a structure) are selected, they may be analyzed to generate a 3D model of the object, such as a 3D point cloud, and such techniques may further be used to model multiple piles or other objects at a common site. In some (but not all) embodiments, an automated above-ground object extraction method (e.g., for stockpile extraction) starts with a 3D point cloud of a surveyed site (e.g., a bulk materials site for stockpiles), and proceeds as follows. An automatic classifier is used to label points as either object (example described here is a pile), near ground (ground close to object) or far ground (ground farther away from the object). After classifying points, the labeled points are placed in a grid, and each grid cell is analyzed with respect to a threshold according to its likelihood of being a near, far or in-between ground point. Points that are more than likely ground and form large contiguous areas are candidate ground areas. A region-growing operation (e.g., a flood fill operation) is used to filter out ground points that are mislabeled (e.g., on the tops of tall, flat objects). Finally, ground points that are within the filled, contiguous ground areas and have probability of being ground greater than a threshold are selected. Although a grid is used to accumulate probability information from multiple points in a given location in this example, other approaches are possible, such as continuous spatial probability representations, extremely fine grids where each point contributes probability in its local neighborhood and with the contribution of a given point falling off the farther the grid cell is from the point, etc. A multi-resolution, nonlinear optimization is then used to fit a (gridded) point surface to the filtered ground points, although other techniques may be used in other embodiments, such as a parametric surface fit to the points. The ground surface finding approach used in this example extracts the ground surface from the (labeled) point cloud, using constraints for the optimization that encourage the surface to be close to the filtered ground points in height, smoothly vary and to be below the point cloud (it will be appreciated that in the absence of a constraint to be below the point cloud, fitting a surface to the ground points may allow the surface to pass through and over the point cloud in areas with large terrain height variation). The (multi-resolution) surface fitting used in this example first fits a surface with a larger point spacing to the points and then does a second fine-grained surface fit, with the low resolution surface fit allowing the method to quickly converge to the gross shape of the site at a low computational cost, and the final, high resolution fit filling in the details. In other embodiments, a single step may instead be used, with a high grid resolution fit that is typically computationally expensive because the propagation of the height corrections between distant points takes more iterations of the solver than performing it hierarchically. Points may be present in the surface around the boundary of the site, which are constrained by smoothness in the optimization—such points are used in the next phase to cause the pile surface to meet the ground outside of the reconstructed area, ensuring that no volume is added by the difference in the surfaces outside of the reconstructed area. Now that a ground surface exists, the pile surface is calculated. Taking the difference of these two surfaces provides the pile height. The same (multi-resolution) non-linear optimization is used in this example to fit the pile surface as the ground surface, with the boundary points from the ground surface being added here as constraints to the pile surface. These point constraints at the border penalize the pile surface deviating in height both above and below the ground surface points and cause the two surfaces to have the same height outside the reconstructed area.

Alternatively, when calculating statistics about the extracted piles, one could mask out any points outside the reconstructed area to achieve a similar purpose. It is preferable to ensure that only 3D points within the reconstructed point cloud are used in visualization, generating summary statistics such as volume, etc. The final stage in stockpile extraction is to subtract the pile and ground surfaces to get an above bare earth height map of the site, with all of the connected components higher than a threshold level being found, and a watershed algorithm then used to extend these connected components down until they either run into each other or would grow into a region lower than a minimum height threshold. A final classification is performed based on pile boundary shape and color to exclude non-pile components, as certain parts of a site might not be used to store stockpiles. For example, a company may have a policy to never store stockpiles pushed up against safety berms or high walls, and if so, a geo-referenced storage area mask may be used along with geo-referencing data in the point cloud to exclude contours that could not be piles. In cases in which two materials are stored together in a stockpile that runs together, the piles may be separated in various manners (e.g., based at least in part on feedback or instructions from a human operator regarding how to separate out the piles) or instead treated as a single combined pile. Another possibility is to use a machine learning method, e.g. classifier, leveraging texture from the original images and the camera poses found in object from motion to separate out these piles—this would involve training a classifier to find separate piles in the images and then back projecting those pile outlines onto the 3D point cloud. Additionally, if prior data about the site is available (such as a bare earth model, geo-referenced material mask, geo-registered labeled point cloud, etc.), it may be incorporated into the final ground/pile/other classification. More specifically, once a site has been labeled, future image collections of that site can be aligned into the same coordinate system of this dataset (as discussed elsewhere herein), and then benefit from that initial labeling when determining the point classification of those future image collections.

FIGS. 2K-2Q continue the examples of FIGS. 2A-2J, and illustrate additional techniques for generating and verifying a computer model of an object and resulting object attribute value determinations, based on analyzing visual data in images acquired in part or in whole from one or more fixed-location or otherwise physically mounted cameras with imaging sensors and/or other sensors/devices (e.g., depth-sensing devices with corresponding depth sensors).

In particular, with respect to FIG. 2K, information 206*k* is illustrated to show an alternative situation in which an object of interest is partially enclosed by one or more walls (or other structures or things) against which at least some of the object volume/surface is constrained, and in which only one or more fixed-location or otherwise physically mounted cameras 129 are being used at a current time to acquire images to model the object. In the example of FIG. 2K, the object is a version of pile 200 from FIGS. 2A-2J, but in which some of the toe area on the sides and back (relative to the locations of two fixed-location or otherwise physically mounted cameras 129*a* and 129*b*) of the pile are not present due to the locations of walls 212 surrounding three sides of the pile that constrain the pile from expanding to the full width and depth as in FIGS. 2A-2J—in particular, left and right sides 211 of the pile that would be present in object 200 of FIGS. 2A-2J are cut off by left and right walls 212 (relative to the field of view of the fixed-location or otherwise physically mounted cameras 129), respectively, and a similar back portion of the pile (not shown) is cut off by the back wall 212 (relative to the field of view of the fixed-location or otherwise physically mounted cameras 129). While not illustrated in FIG. 2K, in other embodiments one or both of the physically mounted fixed-location cameras 129*a* and 129*b* in FIG. 2K may further be pan/tilt or pan/tilt/zoom cameras (e.g., in a manner similar to that of FIG. 2Q), and one or more other physically mounted devices (e.g., one or more cable-mounted cameras, one or more cable-mounted depth-sensing devices, one or more fixed-location depth-sensing devices, etc.) may be present and used, whether in addition to or instead of the fixed-location cameras 129*a* and 129*b*.

As will be appreciated, the fixed-location or otherwise physically mounted cameras 129 in this example of FIG. 2K have only a partial view of the pile (in this example, potentially less than 50% of the surface area of the pile), and the generation of a model of the entire pile using images acquired from the fixed-location or otherwise physically mounted cameras 129 includes using additional techniques relative to those used in a situation such as that of FIGS. 2A-H, in which images are acquired by one or more mobile devices of all (or substantially all) of the exterior of the pile. In particular, FIG. 2L continues the example of FIG. 2K, and illustrates an example image 205l that may be captured by fixed-location or otherwise physically mounted camera 129*a* from a position between the left and right walls and outside the area enclosed by the walls. In this example, information 213 is visually added to the image 205l to illustrate that the location of the fixed-location or otherwise physically mounted camera 129*a* (which in this example is a security camera attached to a pole in front of the walled enclosure where the pile is located) corresponds to a point midway between the bottom and top of the pile and on the right half of the front face of the pile (relative to the position of the fixed-location or otherwise physically mounted camera(s)), resulting in the backside 214*a* of the pile (relative to the fixed-location or otherwise physically mounted camera 129*a*) not being visible from that camera location, and the right and left sides 214*b* of the pile that are piled up along the left and right walls not being visible from any camera location (assuming that the walls are not transparent, which they are not in this example). In this example, an additional portion 215*g* of the pile may be partially visible from the fixed-location or otherwise physically mounted camera

129*a*, such as if it slopes upward, but with less visual data available than the front of the pile (e.g., if it is partially shaded).

FIG. 2M continues the examples of FIGS. 2K-2L, and illustrates an additional example image 205*m* that may be captured in an alternative situation in which a fixed-location or otherwise physically mounted camera 129*c* that is being used to acquire images of the pile is located to the side of the walled enclosure and has only a partial view of a portion 216*a* of the front face of the pile that is otherwise visible when directly in front of the pile (i.e., with the left wall blocking an additional portion 216*b* of the front of the pile) and of an additional portion 215*h* of the pile that is visible over the top of the left wall from the pose location of the fixed-location or otherwise physically mounted camera 129*c*. Thus, if only image 205*m* is used to model the pile at a given time, shape information for the exterior of the pile will need to be estimated not only for the sides 214*b* and backside 214*a*, but also for a portion 216*b* of the pile that is blocked by the left side wall (other than an upper portion 215*h* of the area 216*b*, if any, that is visible over the left side wall from the position of the fixed-location or otherwise physically mounted camera device 129*c*). In a manner similar to that of FIG. 2K, in other embodiments the physically mounted fixed-location camera 129*c* in FIG. 2M may further be a pan/tilt or pan/tilt/zoom camera (e.g., in a manner similar to that of FIG. 2Q), and one or more other physically mounted devices (e.g., one or more cable-mounted cameras, one or more cable-mounted depth-sensing devices, one or more fixed-location depth-sensing devices, etc.) may be present and used, whether in addition to or instead of the fixed-location camera 129*c*.

FIG. 2N continues the examples of FIGS. 2K-2M, and illustrates information 205*n* and 206*n* related to additional verification techniques that may be used, including in situations in which the images used to represent the pile are available from only one or more fixed-location or otherwise physically mounted cameras. In this example, information 205*n* shows a representation of the pile similar to that of FIG. 2L, from the perspective of fixed-location or otherwise physically mounted camera 129*a*, but with some of the details of FIG. 2L not being shown. In addition, information 205*n* further illustrates additional information 215*i* related to an additional technique for verifying whether the visual data of the one or more images used to generate the model for the pile have sufficient visual data to accurately model the toe portion of the pile. In this example, a strip 215*i* is shown across the front face of the pile representation in an area proximate to the ground or other underlying surface on which the pile rests, such as with a height 217*b* and being located within a defined distance 217*a*+217*b* above a boundary with the ground or other underlying surface, although in other embodiments the strip may be located in part or in whole within the defined distance 217*a* from the boundary. As discussed in greater detail elsewhere herein, the verification techniques may include assessing the 3D visual data points within the strip that are available in the visual data of the one or more images used to generate a model of the pile, and verifying whether a distance 219*a* that those data points span horizontally across the strip exceeds a defined threshold (such as 100% of the width, or another defined width threshold amount for the width of the strip that is less than 100%), with the verification being satisfied if the defined threshold is reached (and optionally having increasing degrees of confidence in the verification as the amount of the width of the strip increases above the threshold).

Information 206*n* of FIG. 2N similarly illustrates a representation of the pile that includes a strip 215*i* across the front face of the pile, but with the representation in information 206*n* being shown from the perspective of physically mounted fixed-location camera 129*c* to the side of the enclosure walls in a manner similar to that shown in FIG. 2M. As discussed with respect to FIG. 2M, since only a subset 216*a* of the front face of the pile is visible from the images acquired from physically mounted fixed-location camera 129*c*, the verification of the toe area of the pile in a situation such as that shown for information 206*n* may include assessing only the portion of the strip 215*i* in the area 216*a* of the face of the pile, and optionally using a verification threshold amount of the horizontal width that is different from that used for information 205*n* (e.g., a lower threshold to reflect that the visual strip in information 206*n* is shorter than that of information 205*n*, such as by using a shorter absolute distance or instead by using a percentage-based threshold of the width of the visible portion of the strip), while in other embodiments the same distance threshold as in information 205*n* may continue to be used. Information 206*n* further illustrates an additional area 215*j* on the surface of the pile representation that is used to assess surface coverage of the pile, such as by assessing a density of 3D visual data points that are present in the area 215*j*, and verifying that the density exceeds a defined surface coverage threshold amount for the density—while the surface 215*j* in this example covers only a portion of the front face of the pile and is further restricted to the area 216*a* visible from the physically mounted fixed-location camera 129*c*, in other embodiments the surface 215*j* that is assessed with respect to the density of 3D visual data points may include some or all of the visible portion 216*a* and/or some or all of the total front face 216*a*+216*b*. Such a surface coverage verification may similarly be performed using a situation such as that shown in information 205*n* across the full front face of the pile, although is not illustrated for that information.

FIG. 2O (referred to herein as "2-0" for the sake of clarity) continues the examples of FIGS. 2K-2N, and illustrates information 2050 regarding estimating the shapes of portions of the pile surface that are not visible from the one or more fixed-location or otherwise physically mounted cameras whose acquired images as used for the modeling, which in the example of FIG. 2-O is physically mounted fixed-location camera 129*c*. In particular, for portions of the pile that are blocked by the left wall (based on the position of the fixed-location camera 129*c*), surface shapes 215*k* may be estimated for the exterior of the pile that is blocked by the wall but would not otherwise be blocked if a position such as that of fixed-location camera 129*a* was instead used to acquire the images. Such estimated surface shapes 215*k* may, for example, be interpolated and/or extrapolated using other visual data from the visible area 216*a*, such as to fit flat or curved regular surfaces to represent those areas, as discussed in greater detail elsewhere herein.

FIG. 2P continues the examples of FIGS. 2K to 2-O, and illustrates information 205*p* and 206*p* that shows additional techniques for estimating shapes of portions of the pile's exterior that are not visible from the locations of one or more fixed-location or otherwise physically mounted cameras, whether cameras 129*a*, 129*b* and/or 129*c*. In particular, information 205*p* illustrates a representation of the pile from a higher altitude at which part of a pile backside estimated shape 215*f* is shown but which is not visible from the poses (locations and orientations) of the one or more fixed-location cameras, as well as an estimated shape 215*g* for an upper side portion of the pile that may be only partially visible from the one or more fixed-location cameras. In this example, the backside estimated shape 215*f* may similarly be a flat or curved regular shape that is estimated based at least in part on the visible portions of the pile from the one or more fixed-location cameras, such as to treat a top of a visible portion of the pile 200 as a primary ridgeline for the pile, to estimate a slope of the backside (e.g., based on the slope of the visible portions and/or in other manners, such as based at least in part on the distance from the visible portions of the pile to a back wall of the enclosure), and to estimate the shape of the backside surface area using the flat or curved regular shape with the estimated slope. It will be appreciated that estimating a surface of such a backside area (or any other portion of the pile that is not visible) may be separated into multiple subparts whose shapes are each estimated separately.

Information 206*p* of FIG. 2P illustrates an alternative technique for estimating a shape of one or more nonvisible parts of the pile, such as a backside surface, including in situations in which only a single fixed-location or otherwise physically mounted camera is used to provide images used for generating the model of the pile for a given time. In the example of information 206*p*, a type of geometric shape of the overall pile is assessed or otherwise estimated (e.g., such as based on an overall shape of the visible subset of the pile), which in this example is a conical shape 217 that is fitted to the visible portion of the pile—in such a situation, the surface shapes of some or all of the nonvisible portions of the pile may then be estimated using the fitted conical shape 217, such as to estimate the shape of the backside of the pile to correspond to that of the backside of the fitted conical shape. It will be appreciated that a variety of other types of geometrical shapes may be used in other situations.

In addition, while not shown in the examples of FIGS. 2K-2Q, another technique that is used in at least some embodiments to estimate shapes of nonvisible portions of a pile (or other object) from one or more images acquired from one or more fixed-location or otherwise physically mounted cameras includes retrieving previously captured images (e.g., from a mobile device that has additional visual coverage of the pile or other object and/or a resulting previous model generated from those previous images), and using previous data from those previous images and/or previous model that corresponds to portions of the pile (or other object) not visible from the fixed-location or otherwise physically mounted camera(s) but which were visible from the previous images. In particular, such previous data from those previous images and/or previous model may be used to supplement the visual data included in the one or more images captured at the current time (or other given time) by the one or more fixed-location or otherwise physically mounted cameras, such as to estimate some or all of the shapes of nonvisible portions of the pile using corresponding shape data from the previous data, as discussed in greater detail elsewhere herein. Analogous techniques may be used with one or more sets of depth data sensor readings, whether in addition to or instead of one or more images, such as by retrieving previously capture depth data (e.g., from a mobile device that has additional coverage of the pile or other object and/or a resulting previous model generated from that previous depth data), and using previous data from those previous depth data sensor readings and/or previous model that corresponds to portions of the pile (or other object) not visible from the fixed-location or otherwise physically mounted depth-sensing device(s) but which were covered in the previous depth data sensor readings (e.g., to use such previous depth data and/or previous model may be used to supplement the depth data included in the one or more depth data sensor readings captured at the current time (or other given time) by the one or more fixed-location or otherwise physically mounted depth-sensing devices, such as to estimate some or all of the shapes of non-covered portions of the pile using corresponding shape data from the previous data), as discussed in greater detail elsewhere herein.

It will be appreciated that the details discussed with respect to the examples of FIGS. 2A-2T are provided for illustrative purposes, and that the described techniques are not limited to these example details. It will be further appreciated that while various shape estimation and determination techniques and various verification techniques have been shown, including in the examples of FIGS. 2K-2T, any combination of such techniques may be used together in particular embodiments, while in other embodiments only a single shape estimation/determination technique may be used and/or only a single verification techniques may be used.

In addition, further details related to some aspects of generating and verifying computer models are included in U.S. patent application Ser. No. 13/843,833, filed Mar. 15, 2013 and entitled "Determining Object Volume From Mobile Device Images", Now U.S. Pat. No. 9,196,084; In U.S. patent application Ser. No. 15/076,493, Filed Mar. 21, 2016 And Entitled "Verifying Object Measurements Determined From Mobile Device Images", Now U.S. Pat. No. 10,403,037; In U.S. patent application Ser. No. 15/912,406, Filed Mar. 5, 2018 And Entitled "Determining Changes In Object Structure Over Time Using Mobile Device Images", Now U.S. Pat. No. 10,186,049; And In U.S. patent application Ser. No. 15/076,321, Filed Mar. 21, 2016 And Entitled "Verifying Object Measurements Determined From Mobile Device Images", now U.S. Pat. No. 9,495,764; each of which is hereby incorporated by reference in its entirety.

FIGS. 10A-10D provide additional example details related to automated data analysis activities for determining and tracking information about object attribute values, and for displaying and controlling information about changing object shapes and other attribute values, as well as other information about particular example embodiments. Various details are included in the example embodiments described below with respect to FIGS. 10A-10D for the purposes of illustration, but it will be appreciated that other embodiments may differ in various manners from these examples.

In the examples discussed with respect to FIGS. 10A-10D, the automated IOEA system captures, identifies, analyzes, quantifies and presents to a user the shape and other determined attributes of objects on a temporally surveyed site, such as a bulk materials storage site with one or more pile objects monitored over time. The IOEA system allows users to frequently, or in some cases continuously, update a representation of their storage site, extract information about the state of their site, and monitor changes to their site, such as by using one or more fixed-location or otherwise physically mounted cameras that provide continuous or frequent images of the site. The monitored site information (e.g., geometry, material, semantic change, etc.) may include, but is not limited to, the volume or tonnage of the different materials stored, their location, their 3D shape, temperature, moisture content and material type (e.g., sand, gravel, topsoil, pine bark, etc.). The described techniques may be used to provide a complete solution to align in 3D the different site representations over time and/or the captured images over time, detect changes in 3D representation, texture or other quantities of interest, and form associations between bulk material stockpiles over time. The described techniques further provide functionality for visualizing changes in stockpiles or other objects, providing insights into how a user's inventory changes as they add, move and remove material.

Attempts to manually handle large and frequent data collects (or collections) are typically not successful, as adding a temporal dimension multiplies the data volume by the temporal capture frequency. Instead, the described automated techniques allow such functionality to be provided, including in at least some embodiments by using machine learning techniques to automatically extract stockpiles from 3D point cloud(s) and associated images with camera calibration (rotation, translation and intrinsic calibration) that is known or determined (e.g., via autocalibration). Thus, use of these described techniques enable high frequency monitoring of temporally surveyed sites, such as bulk material site(s), to identify, understand, quantify, analyze, and present to a user its changes over time. When one or more mobile camera devices and/or fixed-location or otherwise physically mounted camera devices capture imagery of the same location over time, the captured information can be leveraged to perform temporal analysis. In the context of a site with various stockpiles of material (such as an aggregates, mulch, or construction site etc.), or a pit from which material is being extracted, this analysis and/or visualization may include, but is not limited to, the following: detecting and quantifying the change in volume of the stockpiles; analyzing the progress of material being removed from a pit, and measuring its fill volume; and tracking the location and movement of material across the site.

Figure 10A:
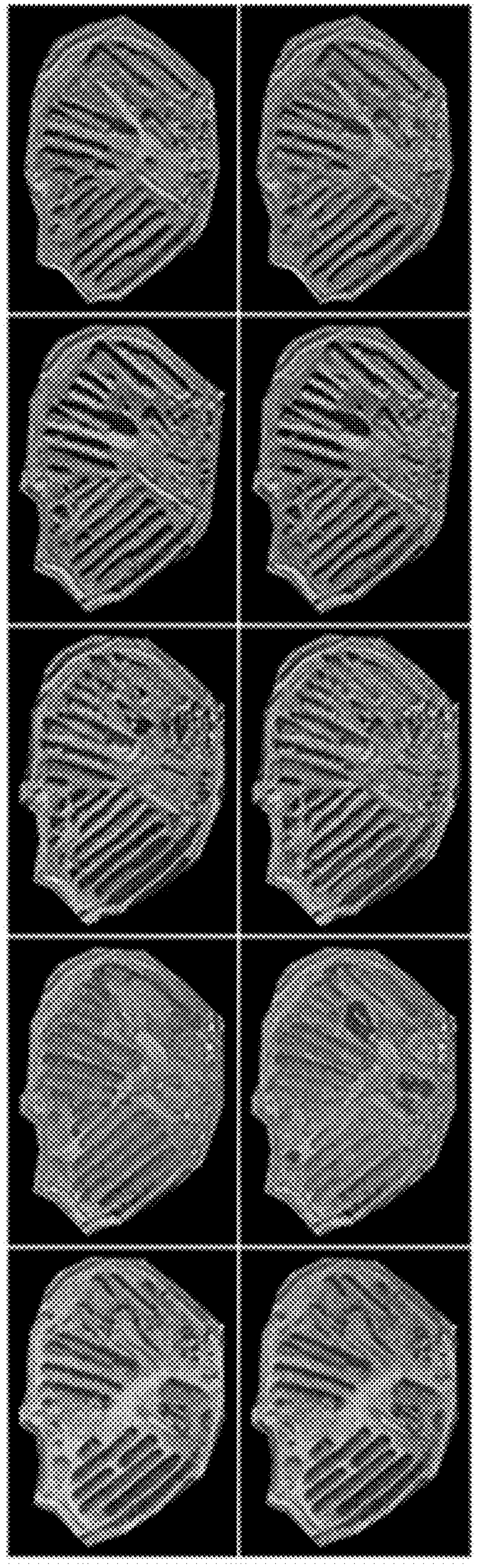
FIGS. 10A-10D illustrate examples of determining and tracking information about changing object shape and attributes over time, and of corresponding user interfaces for displaying and controlling such information.

FIG. 10A provides an example visualization 1000-26 that can be performed when the temporal dynamics of a site are analyzed. Here, the top row of images denote several image collections (or "collects") of the same site on different dates, where the sites have all been registered into the same spatiotemporal space. The bottom row indicates the relative change that has occurred on the site since the previous dataset. Areas of the site that have increased in elevation may be visually indicated in a first manner (e.g., colored green), while those areas that have decreased in elevation may be visually indicated in a second manner (e.g., colored red). The visual indications may further be used to provide an indication about the magnitude of the differences (e.g., using saturation of the colors).

In order to compare images and/or resulting generated 3D computer models for two different times to provide such a comparison, the images and/or models are first determined to correspond to the same one or more objects, and are aligned (also referred to as "registered") so that particular features or portions of the object(s) are associated together in the different images and/or models. Such techniques may include aligning all of the captured images into a common 3D coordinate system, and then analyzing the differences between different sets of images and/or their resulting computer models, where each set was captured at a common time. By aligning the images in a common 3D coordinate system, the reconstructed 3D models may be used to provide a foundation on which reasoning and analysis is performed. To prepare a dataset for inclusion in the temporal analysis, it is first reconstructed to determine the relative poses of the images and the relative location of the site's geometry. To do so, a photogrammetric reconstruction pipeline is described herein that generates a 3D representation of the scene's geometry (e.g., sparse or dense point cloud, triangle mesh, surface or volumetric representation, etc.). Additionally, 3D camera poses and their correspondence with the scene geometry's representation may optionally be used.

In at least some embodiments and situations, including situations in which multiple objects are co-located near each other at a single site, an object being captured in multiple images may need to be identified, such as to distinguish it from other nearby objects. Such object identification may be performed in various manners based at least in part on an analysis of the images, including to compare object information in the images to object information in other previously acquired images at a different time (e.g., to determine that the object visually represented in the images is a same object as the object visually represented in the other previously acquired images), compare object information from a computer model generated from the images to object information in one or more other previously generated computer models from other images (e.g., to select one or more other such computer models as matching or otherwise corresponding to a currently generated computer model, such as to determine a match between two computer models using at least one of location, a type of material, an appearance feature between the first and second computer models, a structural feature between the first and second computer models, a shape of the objects, etc.), etc. Additional details are included below related to identifying an object captured in image(s).

Given multiple independent 3D computer model reconstructions of a single object or the same site (each captured at a different point in time), they are next aligned into the same coordinate system. This may be implemented as a multi-step process, which includes the following: optionally determine an initial, approximate alignment between the sites; find corresponding locations between the geometry of the sites for which corresponding portions of the 3D computer model reconstructions are associated; optionally identify planar ground regions within the sites; and estimate a smooth warping to finely align the sites using the constraints provided by site-to-site correspondences and planar ground regions. If performed (e.g., depending on the availability of data), obtaining an initial alignment of the sites simplifies later processing. For two or more generated computer models, their alignment may be performed in various manners in various embodiments, including one or more of the following: associating multiple corresponding portions of the first and second computer models together based at least in part on determining relationships between the multiple corresponding portions; determining and matching three-dimensional locations of points for the object(s) represented by the computer models (e.g., such that matching locations are within a defined distance threshold), such as by analyzing location information associated with images used to create the models and/or retrieving location information associated with predefined additional ground points visible in such images and/or identifying and matching regions with multiple locations in the images and/or resulting computer models; determining and matching one or more appearance features visible in such images and placing appearance features that correspond with each other in different computer models at same locations in one or more coordinate systems used for the computer models (e.g., for appearance features on the surfaces of the objects, for predefined points visible in the environment around the object, for planar ground areas in the environment having corresponding shapes, etc.); etc. In addition, one computer model may be deformed or otherwise transformed to match another similar computer model (e.g., for the same object at different times), including to do one or more of the following: use constraints identified for one or both computer models during an initial alignment to modify at least one of a shape or location of the one of the computer models to correspond to the other of the computer models as a final alignment; determining locations and orientations of one or more devices used to acquire the images used to create at least one of the computer models, and altering such determined locations and orientations to minimize re-projection errors of portions of a computer model resulting from those images; etc.

Furthermore, in at least some embodiments two or more of the object identification and computer model generation and computer model alignment are performed together at substantially the same time, including in situations in which images are received with geotags or other location information that enables at least initial or tentative object identification and/or alignment from such location information (e.g., based at least in part on relationships determined between corresponding portions of the resulting generated computer models). For example, if image geotags are available (such as those often embedded by commercial unmanned aerial vehicles), then an initial alignment can be obtained by rigidly transforming the 3D reconstruction, such that the recovered camera poses closely match their corresponding geotags. This rigid alignment is achieved using, for example, a robust estimation method (such as, but not limited to, RANSAC, MLESAC, Hough transform, or their many variants) that estimates a similarity transform between the recovered 3D camera positions and the 3D coordinates represented by the image geotags. If the robust method fails (e.g., if the geotags are sufficiently noisy), then a least-squares approach can be leveraged to obtain an approximate alignment between the cameras and their geotags. An alternative strategy would be to use an iterative approach to alignment, leveraging such techniques as ICP or non-linear refinement. Additional details are included below related to performing alignment of at least two computer models.

Once an initial, rigid alignment is achieved, a refinement may be performed that allows the 3D reconstruction to deform slightly to better align with the geotags (e.g., remove curvature, adjust scale, modify camera intrinsics, etc.). Note that this initial refinement is optional, but often helps with the convergence behavior of the refinement. The refinement is formulated as a non-linear error mitigation, e.g. a bundle adjustment, where the residual is computed as a camera position's radial deviation from the trajectory defined by the sequential geotag positions. Other possible residuals are a camera position's absolute deviation from its associated geotag, a weighted distance between the positions based on a priori or measured insights into the error distribution of the GPS values, or other strategies that seek to combine the 3D reconstructed camera positions with image geotags in order to create a more accurate solution.

One possibility of the non-linear error mitigation method is a trajectory-based approach, such as to take the form of defining the error in terms of a camera's radial deviation from the trajectory defined by the sequential geotag positions. To define the trajectory, linear segments of the camera's path are identified by finding three consecutive camera poses that are roughly collinear (enforcing a similar direction of flight). Additionally, a constraint may optionally be imposed that the cameras' associated geotags should also be roughly collinear. For each of these 3-camera segments, a residual value for the middle camera's position is added, which measures its radial deviation from the line segments between the first and second, and second and third cameras' GPS positions. For camera positions falling outside the line segments, radial constraints may optionally be imposed with respect to the endpoints of the line segments. When forming the trajectory-based approach, parameters may be added to the optimization that model an airframe bias (structured error in the GPS positions relative to the camera's pose, and optionally, direction of movement). Additionally, a GPS bias may be modeled that may occur when the GPS receiver is turned off and then back on again (which results in a structured error for each separate flight of the site). This trajectory-based approach is one specific example, and could be reformulated to model a smoother camera trajectory, incorporate other values from sensors (such as ground-based tracking units, inertial sensors on the camera's platform, etc.), or other modifications.

If image geotags are not available, known ground control points (GCPs) within the site can alternatively be leveraged. These ground control points may have a known GPS position and/or unique appearance (e.g., high-contrast targets that have been permanently placed on the site and surveyed). Thus, by identifying the 2D observation position of these ground control points in the images, the GCPs' positions within the site may be triangulated. Then, a rigid similarity transform is estimated between the triangulated GCP positions within the site and their known GPS coordinates. Here, a robust estimator, e.g. a RANSAC-based method, can again be employed, as it effectively deals with outlier values. To identify the 2D observations in the image, an automatic method may be used that attempts to detect the GCPs' unique appearance in the image. Alternatively, a human-in-the-loop approach could be employed in some other embodiments, where a user can manually supply this information, e.g. by clicking on the GCPs' positions within the images. Given this initial rigid alignment, the solution is further refined by utilizing a nonlinear error mitigation, such as a bundle adjustment operation, which minimizes the distance between the triangulated GCP positions and their known GPS coordinates. This could additionally be reformulated as minimizing the reprojection errors between 2D observations of the 3D GCPs' positions, or other strategies which seek to generate an accurate alignment between the 3D reconstruction and known (geotagged) locations within the scene.

If both geotags and ground control points are unavailable, another method may be used to align a site to a reference 3D reconstruction of the location, by attempting to find correspondences between 2D image-based features or between parts of the 3D geometry. To find these correspondences, image-based or geometry-based descriptors are used. A descriptor is a numeric representation of the local 2D or 3D neighborhood of a point, and summarizes such things as texture, curvature, variance, and other local characteristics, e.g. depth, etc. Once a set of descriptors is created for each dataset to be aligned, similar descriptors (candidate correspondences) are found by comparing the numeric representations of those descriptors, and selecting those that are most similar. These candidate correspondences are then filtered using a robust estimator (e.g., a RANSAC) for a (piecewise or smooth continuous) 3D similarity transformation estimation phase, and the resulting transform is used to approximately align the datasets.

A next phase of the pipeline detects corresponding parts of the site that have not changed, and forms a set of constraints to use to align those parts of the site together. While ground control points and geometry descriptors fall into this category of site-to-site correspondences, this step preferably finds a significant number of these correspondences, with these correspondences being as accurate as possible. To do so, patches of unique geometry are first identified within the currently reconstructed site. Here, the uniqueness of the patch refers to the characteristic that it is unambiguous in its shape, and has no rotational or translational symmetry (a planar patch would be ambiguous). This uses a 3D region of interest detector, which identifies parts of the geometry with high curvature along multiple axes. Once a set of these geometry patches are identified, they are independently aligned to the reference site's reconstruction, using an alignment transform estimator, for example the iterative closest point (ICP) algorithm. Here, ICP is initialized using the alignment found in the initial alignment phase. Other (robust) estimators may similarly be suitable to perform this task. Once ICP converges, the quality of the patch's alignment is scored. As the goal is to identify parts of the site that have not changed, alignments of patches where any part of the patch deviates significantly from the corresponding patch in the reference dataset may be rejected-if so, only those patches that maintain a very close alignment across the entire patch are retained as valid correspondences. An additional way to find correspondences would be the image and geometry descriptors from the previous stage of initial alignment estimation. Both methods can be employed in parallel, or either one alone may be used, although the ICP based patch alignment may provide finer control on the ability to reject patch correspondences that do not exactly align.

While the site correspondences discussed above define direct one-to-one mappings between unique parts of the sites, no constraints were added in those examples for large planar regions such as the ground. However, in the final alignment of the sites, one would expect that the ground surfaces should align closely or perfectly (assuming that they haven't changed). Toward this end, a further optional step to the alignment pipeline may explicitly detect the ground of the site, and constrain it to align with the ground of the other site, or more generally align temporally invariant surfaces or scene elements to each other. To initially identify the ground in both datasets, a ground detection routine may be used, as discussed below with respect to automatic pile extraction techniques. Then, regions of the site where the ground has not changed are found, so that their alignment can be later enforced. To find these unchanged regions, both datasets are scanned, and any ground points that do not have a sufficiently invariant local neighborhood are removed (e.g., for stockpile sites locally planar surfaces). In general, the invariant surface characteristics will vary with the application area, and can be objects or natural features in the environment. Given the resulting regions of invariant points, the intersection of these regions are found (those parts of the site that are planar in both datasets)—this intersection leverages the initial approximate site alignment found earlier in the alignment pipeline. While the initial alignment may have some registration error, as long as that expected error is no greater than the radius of the local invariant region, e.g. local planar region, then a valid alignment can still be found between the intersecting regions (and their invariant neighborhoods).

Given the previous detections of correspondences between two sites and their resulting 3D computer models, either through local geometry alignment or local planar regions, these correspondences are formulated as constraints within a bundle adjustment operation. The goal is to deform one dataset such that it aligns with a previously determined reference reconstruction of the site. This reference reconstruction can be the first reconstruction of the site, any later reconstruction, a 3D representation of the site obtained from other techniques, etc. The reference reconstruction may additionally be augmented with reference values such as ground control point constraints, distance or angular values between fixed objects, or constraints which limit the scene's geometry. However the reference reconstruction is determined, it provides a coordinate system with which the current reconstruction will be aligned.

Using the site correspondences, they are parameterized as constraints in non-linear error mitigation, e.g. bundle adjustment, by minimizing the residual between the corresponding locations (this can be formulated as a distance, angular, or other error measure). For improved accuracy, surface characteristics such as geometric normals and local neighborhoods may be incorporated. For example, instead of utilizing point-to-point distance constraints, point-to-plane constraints may be leveraged, where a point in one dataset should lie within the local planar neighborhood of the other dataset surface representation. Similar to the site correspondence constraints, the coplanar ground constraints may be formulated as minimizing a residual function, which seeks to achieve an accurate alignment between two roughly locally planar neighborhoods of the corresponding 3D representations. One way this can be formulated is point-to-plane, or plane-to-plane distances, which minimize the deviation between the two local surfaces.

During this deformation process, discontinuities, or large, exaggerated transforms, are avoided, such as by imposing a smoothness constraint on the deformations that are possible. To efficiently and compactly represent this smoothness constraint, deformation amounts (magnitudes and directions) may be estimated only at vertices of a large, fixed 3D grid (where grid cells are typically 10 to 50 meters on each side). Given these deformation vectors defined on a regular grid, they may be smoothly interpolated in 3D to define the currently estimated deformation at every point in 3D space for the site. Thus, when constructing the non-linear, e.g. bundle adjustment, based alignment, the possible motion of the scene's geometry is parameterized using this regular grid of deformations. Alternatively, smoothness can be enforced explicitly through smoothness constraints (where neighboring deformations should be similar), through sparsity constraints (where points of inflection or surface variation should be sparse in their arrangement), or through other techniques which constrain the realm of possible scene deformations. Additionally, instead of representing the scene's deformation as an explicit deformation field, the scene's geometry may instead be allowed to deform, and constraints on the scene's connectivity, curvature, and other characteristics may be imposed to limit the permissible amount of deformation.

Finally, a bundle adjustment constraint is included that the cameras should minimize the reprojection errors of their observed 3D points. In this manner, as the site deforms, the camera poses and intrinsics may be altered to match the new geometry of the scene. In order to achieve this, the non-linear optimization, e.g. bundle adjustment, operates not only on the sparse 3D points (from which reprojection errors are computed), but optionally also on the dense 3D point cloud or triangle mesh (where the site correspondences and coplanar ground constraints are defined). Both of these geometries are deformed simultaneously using the same deformation field, which allows the various constraints to operate in a combined, consistent system.

While the examples above have discussed only two datasets (the current dataset that is being analyzed, and a reference dataset to which the current one is aligned), use of pairwise alignments computed between the current collect and the one previous to it may in some situations allow the scaling of the site to drift over time. One solution to this is to always align a new dataset to the same, original reconstruction of the site. That way, the scaling of the site will remain consistent as there is a constant reference for the deformation. However, this technique has the drawback that the reference reconstruction may become no longer relevant, if the content of the site has changed drastically over time. This issue may be mitigated by, for example, the use of ground control points (e.g., temporally stationary points of interest, including buildings or permanent structures). If the alignment of these parts of the site remains accurate over time, then the scaling of the site will remain consistent. In addition, while some examples above discuss alignment of two datasets (a current dataset that is being analyzed, and a reference dataset to which the current one is aligned), in other embodiments more than two datasets may be aligned to each other, such as to align the current dataset to an arbitrary number of previous reference datasets (e.g., all of which are already aligned) or resulting models, and optionally to give differing weights to at least some datasets (e.g., to decrease the weight given to a dataset as its age, or lack of recency, increases). The benefit of this approach is that older datasets, while potentially less relevant, may still contribute to the alignment and be used to constrain the drift in a scene via their stationary points of interest and planar ground regions, while more recent datasets (which are frequently more relevant) help constrain the alignment via their more numerous site correspondences (as there is less change in the scene's geometry between the current dataset and these more recent datasets).

Once two (or more) datasets are aligned (e.g., a new dataset with a reference coordinate system of a previous dataset), changes in the site's geometry may be determined, such as directly from the current (or most recent) dataset relative to one or more earlier datasets, and/or by comparing computer models generated from the images for the datasets and aligned with each other (e.g., by comparing one or more corresponding portions of two such aligned computer models, including using the alignment to identify such corresponding portions). One way to accomplish this is to compute the nearest distance between every point of the current collect (either a point in the dense point cloud, or a position along the triangulated mesh) and the geometry on which the comparison is being performed. However, this approach can suffer from artifacts, in that the nearest geometry may not always be in the same consistent direction or even the nearest point in the new reconstruction. Alternatively, another way to quantify the difference is to measure the nearest distance only along a scene-specific fixed direction, e.g. within the vertical direction of the dataset (perpendicular to the ground plane) for stockpiles. In this manner, the output set of distances between the reconstructions matches the change in elevation between the datasets. When constraining the distance vectors to be computed along the Z axis (or perpendicular to the ground plane), the computed distances accurately characterize the difference in elevations between the surfaces. To avoid quantization artifacts, and to accelerate the distance computation, the nearest distance determination may be performed using a kd-tree and radius-based query. If so, each point in the reference dataset is projected to the plane perpendicular to the specific direction, e.g. the ground plane (e.g., XY plane) for the up vector, and then indexed into a kd-tree. Then, for each point in the current dataset, a radius-based query (with a typical radius of 0.1 to 1.0 meters) is performed. This retrieves all points in the reference dataset that were within the specified radius within the XY plane. Then, to determine the amount of change for that part of the site, the query point's distance value along the direction is compared to the distance values of the retrieved coordinates. The maximum Z difference is returned as the final distance for the examples discussed here, but other statistics such as minimum, median, or mean may be employed to compute the final value. One benefit of using the maximum is that it more accurately represents the case when a column of points is present in one dataset and not the other. For example, if the reference dataset contained a column of points, and the query point in the new dataset corresponded to the base of the column, then the minimum distance would be minimal, as the points at the base of the column would agree in Z value. However, if the maximum distance is computed, then the distance will be the height of the column, as the query point will be compared to the point at the top of the column.

Another efficient way to compute change detection between two datasets is through the use of geo-registered elevation maps (e.g., GeoTIFFs, raster images with geographic information, or other data formats). Such elevation maps represent the height of the terrain at a particular geographic point relative to some base surface or elevation. These maps may be computed by, for example, fitting a smooth surface to the dense 3D point cloud, by using the 3D triangular mesh, or other schemes that determine the elevation of the terrain. Depending on the particular application, particular parts of the scene may be excluded when computing the site's elevation map. For instance, if the elevation of the bare earth surface is being modeled, objects such as trees, equipment, or buildings may be excluded from the elevation map. Once an elevation map is computed for each dataset, change in the datasets can be detected by subtracting the heights of corresponding geographic positions.

To further enhance the usefulness of the change detection, semantics and other attributes may be handled, such as if the height of the geometry has not changed, but the content creating that geometry is different. For example, if the pile in one collect is replaced by equipment that is exactly the same height, then the computed height difference will be minimal. However, by defining, tracking, and comparing the sites' contents, differences that are not only geometric in nature may be detected and highlighted.

Pile association links consecutive values of the same physical pile or other object over time. For inventory purposes an object may be identified by its location and additional attributes such as, for example, the material it is made of. The IOEA system assigns a unique ID ("identifier") to each pile, and in some embodiments each pile or other object may have one or more unique labels or names (whether generated automatically by the system and/or manually specified by a user), such as for use when displaying or presenting or otherwise providing information about the object to one or more users. Over time material is added to and removed from the pile, which changes its shape and appearance. The lifespan of piles varies greatly. They may appear and disappear from one computer modeling session to another. Some static piles may never change. Additionally, a pile may be split up and two or more piles may be merged into one. To associate an object value to a specific object, its attributes (e.g., material), location and possibly shape are matched to previous values of the same object. For a given value, the association process may use, among other things, the object's images, its point cloud, surface model, orthographic image, and volume value. Seasonal factors like illumination and moisture content affect the appearance of the object, and image quality and vantage point also affect the quality of the data.

The association process has a first automated stage that uses a classifier to produce candidate material and object identities, and may optionally be done in a batch mode. If the confidence in the results is not sufficient or if it is ambiguous, a human operator may optionally provide further information in a second stage, such as to approve and/or refine the results of the classifier in the first stage by adding or excluding pile materials and locations. In such a second stage, a GUI may be used to present the user with the input data (object images, derived material chips, etc.) along with exemplars of matched material chips, object locations, object id, and historical data from previous values (images, volumes, locations, etc.). If no object association is made, the modified data is then fed back into the first stage.

The material of a pile may be identified by automated texture and color analysis. The IOEA system may, for example, first create a material database made of image chips collected from the images of piles over time. The chips are used to train a material classifier. Given a set of input chips from a pile, the classifier outputs most likely material classes along with exemplar chips from the material database. In addition to image chips, the material database may store additional information examples, such as site ID, object ID, object location, pile footprint, and date and time of day-such information may improve the classifier's site-specific and season-specific classification accuracy. In some embodiments, a hierarchy of classifiers may be used to refine a set of candidate materials. The location of a pile may be determined by comparing the position of its centroid with the centroid of previous values. The match may be further refined by matching the shape of the pile with those of previous neighboring values.

There are different types of shape descriptors, such as 2D rasterized footprint, rasterized height maps, local and global point cloud detectors, etc. The shape matching process for 2D rasterized footprint is further discussed, but other descriptors that have an overlap measure may be used. Normalized cross-correlation is a suitable measure for 2D rasterized footprints.

If the footprints overlap between a new object with the last object in the same location, then the IOEA system may assign the previous object's ID to the new one, with the confidence in this initial match being a function of the overlap measure. The IOEA system may further confirm or reject the match by comparing the new footprint to those of older objects. This technique is particularly advantageous to identify static objects. The IOEA system may further be configured to perform initial matches exclusively with the latest historical dataset, and/or to search within a time window that encompasses several datasets. If the new object overlaps with several separate previous objects taken at the same time and the same material, the IOEA system may detect an object merge, e.g. merging piles. Likewise, if two new objects overlap with a single previous object then the IOEA system may detect an object split, e.g. a pile split. New object information with no matches correspond to new objects. In some embodiments, user input may be used to confirm such new objects. Some objects may be so small that their footprint is at the scale of the co-registration error between the current dataset and the historical objects. If so, the matching may be performed by adding random offsets and rotations to the footprint with a given search window before comparing it to historical ones. In some embodiments, a single classifier may be used to determine material, position and shape matching.

Figure 10B:
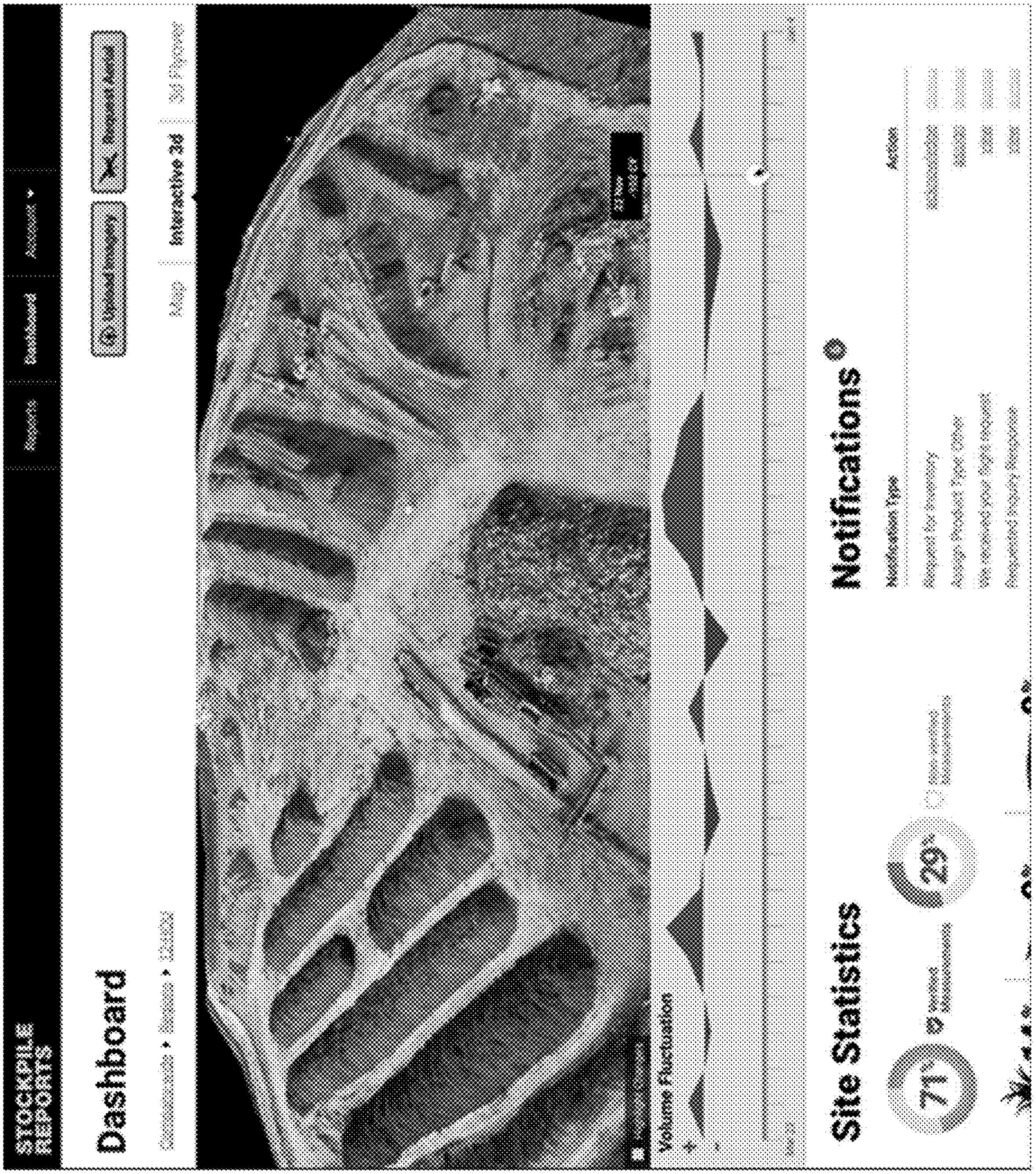
Figure 10C:

Using 3D renderings generated at different points in time, a visual representation may be provided of where the addition and removal of materials took place. For example, FIGS. 10B-10C depict a displayed GUI in which a user adjusts dates using a displayed user-selectable date slider to see 3D renderings changing over time (e.g., using one or more times specified with the slider), such as for information 1100-37 and 1100-40 in FIGS. 10B and 10C respectively, thus providing a progression of changes over time. In addition, the user may use one or more user-selectable controls of such a GUI to specify one or more other types of information to display (e.g., a visual representation of the exterior of one or more objects from one or more computer models that represent the object(s), including in some cases to illustrate types of materials or other appearance features; a visual representation of boundaries of one or more such objects; a visual representation of a change for one or more such objects between two or more times, such as for a change in volume or at least one structural change or another indicated type of change for one or more other object attributes including location, temperature, moisture type of material, etc., and such as for individual object changes and/or an aggregate change for all objects co-located at a site; an animation of one or more such changes over two or more times; etc.), and/or one or more such types of information may be displayed by default or otherwise without user selection in some embodiments and situations. For example, a Volume Fluctuation graph is displayed above the date slider showing the gross total/aggregate volume of change, communicating whether the site's total/aggregate volume has increased or decreased over the given time range.

Figure 10D:
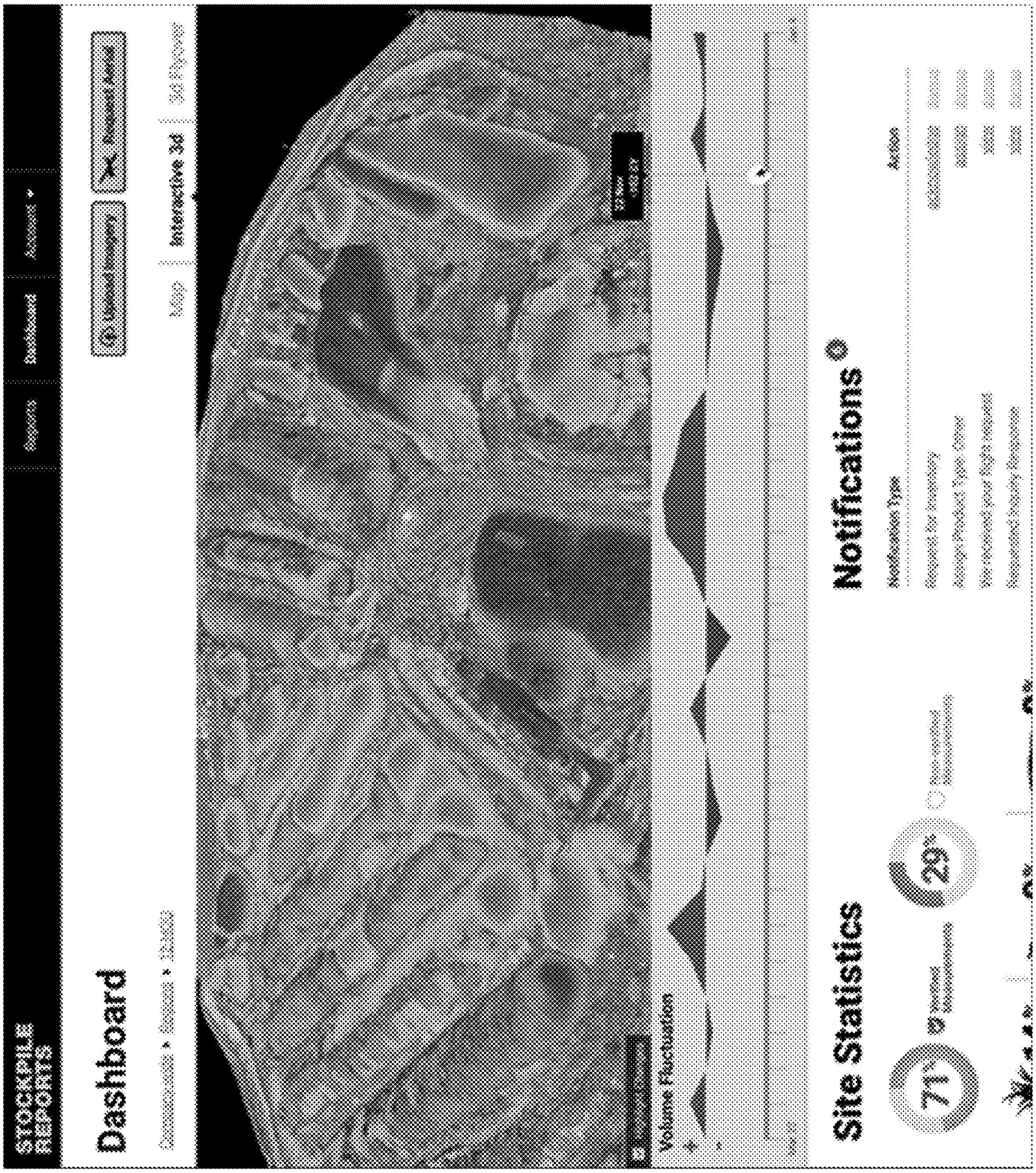

Additionally, the user can choose to toggle a Highlight Changes view in the example GUI, such as by selecting a corresponding displayed user-selectable control, to depict a 'heat map' of specifically where the volumes of material were added or removed from the designated points in time, including to illustrate structural changes within portions of an object (e.g., by using a color, such as green, and/or one or more other effects to visually identify where material is added, and by using another color, such as red, and/or one or more other different visual effects to visually identify where material is removed). FIG. 10D further depicts the user changing to such a heat map view 1100-43 to see specifically where materials volume was added or removed from the given site for a specified time, including changes in structure to particular piles and portions of those piles. Additionally, when viewing a heat map of change on a site, contours of one or more particular piles can be overlaid to more quickly quantify the amount of change that has occurred. However, an annotated color-bar mapping heat map colors to elevation change (or other visual reference) also serves a similar purpose. In addition, when transitioning between consecutive datasets (e.g., by using the slider or otherwise advancing from one time at which images were collected and one or more corresponding pile model(s) created to a next time at which additional images were collected and one or more additional corresponding pile model(s) created), various visual effects can be employed. For instance, one approach is to blend between the imagery or heat maps over a short period as the transition is occurring. Other strategies leverage the 3D data associated with each dataset, enabling the geometry to morph (interpolate) between two datasets, yielding not only animated textures (imagery) but also animated geometry, including to successively animate changes through a series or succession of several computer models and associated times (e.g., all times/models, all times/models between user-specified start and end times, all times/models that satisfy one or more user-specified criteria, etc.). For example, by performing an animated sequence for two or more times and associated computer models, the additions and subtractions in materials may be viewed over time as they change. It will be appreciated that various additional types of user-selectable controls and information may be displayed or otherwise provided in other embodiments.

It will be appreciated that the details discussed with respect to the examples of FIGS. 10A-10D are provided for illustrative purposes, and that the described techniques are not limited to these example details.

In addition, particular additional activities of particular types may be performed in some embodiments, such as is described in the following non-exclusive embodiments provided for illustrative purposes.

As a high-level overview, the techniques in at least some such embodiments include using the visual data in the one or more images acquired at a given time to generate and use a resulting model of an object for the given time (referred to for purposes of these illustrative embodiments as a 'reconstruction', and discussed with respect to a pile object in this example). Doing so may include, for example, determining the 3D position of one or more physically mounted fixed-location cameras, and then keeping them fixed for future reconstructions—to determine the 3D position of the cameras, a baseline reconstruction is performed, where imagery from the fixed-location or otherwise physically mounted cameras is optionally augmented with additional imagery from one or more other cameras and then used to generate a 3D reconstruction. Once fixed-location or otherwise physically mounted cameras are mounted and the baseline process is performed, the cameras can capture imagery at various intervals to perform measurements of the pile(s) and related attributes. For instance, the cameras can capture at fixed or dynamic intervals based on available sunlight, scene activity, or other information. To overcome harsh and varied lighting conditions, imagery taken at multiple exposures or with high dynamic range settings can be leveraged. Given a set of images acquired from the fixed-location or otherwise physically mounted camera(s), the scene is reconstructed, and measurements of the visible stockpile(s) are performed, such as by using multi-view reconstruction techniques. It is beneficial to leverage the same coordinate system in the reconstruction from measurement to measurement, as it allows for direct re-use of manually annotated clipping surfaces, or other 3D information.

With respect to supplementing visual data in one or more images acquired at a given time of an object (which is discussed with respect to a pile object in this example) that provide visual coverage of only a subset of the pile (e.g., from one or more fixed-location or otherwise physically mounted camera devices), by using visual data from prior images acquired at an earlier time and optionally used to generate a prior model of the object for that earlier time, multiple techniques may be used. One technique to do this is to assume that the visual data in the one or more images acquired at a given time and the resulting object model for the given time (referred to for purposes of these illustrative embodiments as a 'reconstruction') captures the dominant ridgeline of the pile, and then interpolate the omitted surfaces of the pile that are not included in the visual coverage of the images acquired at the given time (referred to for purposes of these illustrative embodiments as a 'backside' of the pile) so that it slopes down to the ground. This slope can be chosen empirically, can be determined by the angle-of-repose property of the stockpiled material, or it could be determined based on observations of the existing or similar piles. Another technique to do so is to leverage known information about the pile's shape. For instance, if the pile is determined to be conical (either through prior labeling or through automatic techniques), then a conical pile shape can be extrapolated from the subset of the pile that is reconstructed. This can be achieved by fitting a geometric model to the reconstruction, as well as by reflecting or rotating the reconstruction around the apex of the cone. A similar strategy can be applied to other piles that have a regular shape (such as rectangular piles), where viewing a subset of the pile's faces allows extrapolation of the remaining extent of the pile.

For bunkered piles of material (piles that adjoin one or more enclosing walls), the shape of the non-visible parts of the pile may be estimated by automatically estimating the intersection between the assumed pile surface and the wall's face (referred to for purposes of these illustrative embodiments as a 'waterline'). The pile shape is then defined by extending (through smooth interpolation) the reconstructed visible parts of the pile to meet the waterline, at which point the extent of the pile is bounded by the wall. For remaining non-visible parts of the pile that aren't bounded by walls, the other types of surface estimation techniques can be applied. Consider an example in which the pile is surrounded by at least three walls, such as discussed with respect to FIGS. 2K-2R. If so, some or all of the walls may be modeled/reconstructed from the images acquired at a given time, and used as part of modeling the object for the given time. For example, a smooth surface may be fit to the pile's shape, and then intersected with walls that are known to bound the pile-if the walls have a known maximum height, the height of the waterlines may be bounded above by the height of the walls.

In cases where the non-visible portions (or a subset of them) of a pile are known or assumed to have little or no changes over time (e.g., at a backside of a pile enclosed by three walls), a prior reconstruction of these portions of the pile may be used to supplement the visual data in the one or more images acquired at a given time. For example, the front surface of a pile which is visible and reconstructed may be merged together (into a common coordinate system) with the information about the reconstruction of the back side of the pile that was reconstructed at an earlier time. There are two general ways in which the current and prior reconstructions may be combined into a common coordinate system. The first is to reconstruct the visible portions of the pile in a consistent, common coordinate system (e.g., with respect to the physical control points and dimensions on the site of the object), so that the non-visible portion of the pile can be stored in this coordinate system and directly merged in without requiring any additional alignment or special logic. The second way to combine the reconstructions is to use one or more alignment procedures that to find the 3D transformation that positions and orients the current and prior reconstructions so that they represent the pile's shape at the current time or other given time. If there is overlap between the reconstructions, then this alignment can be computed by aligning the common portions via 3D descriptor matching, iterative geometry alignment, or other techniques. If there is no overlap between the reconstructed portions of the piles, then supplemental information can be used such as known control point locations within the scene, or other data points that allow a 3D association to be determined.

When combining the current and prior reconstructions, there might be gaps between the reconstructions, such as for non-visible portions that are not reconstructed in the current or prior reconstructions. To fill in these gaps and generate a model of the pile's overall shape, interpolation may be used through surface estimation techniques that were previously discussed. The gaps in the pile may be treated as non-visible portions that slope toward the ground, and the surface will smoothly fill the space between the reconstructed surfaces. However, if the material does not slope toward the ground in these areas, other techniques may be used, such as to analyze the shape of the current and prior reconstructions and fit flat or smooth surfaces to fill in the non-visible portions. For example, consider a rectangular pile where the back face of the pile was previously reconstructed, the front face is visible and has been reconstructed, but the sides are not included in either reconstruction. Given the front and back faces of the pile, flat planes can be fitted to sides of the front and back faces, in order to approximate the overall extent and shape of the pile. As an extension of this idea, the pile may be analyzed in vertical layers (segments of the pile's height), with separate flat surfaces fit to each of these segments. In this manner, the non-visible sides of the pile are built up by piecewise planar surfaces that fit the pile's shape even if the side of the pile cannot be represented by a single plane. A variation of this technique can be used when the pile is determined to have a conical or circular shape. As opposed to fitting planar surfaces between the edges of the current and prior reconstructions, curved surfaces can be created that match the curvature and size of the pile at its various elevations. For example, missing data between the front and back face may be estimated by binning the pile points into horizontal slices of thickness t, and for each slice, the center point of the slice is found and the area around it is divided into radial regions of some angle theta. For each binned slice, some minimum number of points may exist, and if so, they may be used to determine the slice centroid, and if not, estimated (interpolated) points are added along a line segment between the previous and next slice centroids and are added to the collection of points representing the pile surface.

With respect to verifying, for visual data in one or more images acquired at a given time of a pile object that provide visual coverage of only a subset of the pile (e.g., from one or more fixed-location or otherwise physically mounted camera devices), that the visual data provides sufficient coverage of a pile toe area and/or surface area coverage of the pile, multiple techniques may be used, such as to determine the quality and completeness of a pile reconstruction specifically when it's reconstructed from a limited set of vantage points (e.g., from one or more fixed-location or otherwise physically mounted camera devices that provide visual coverage of only a subset of the object exterior, such as to not fully reconstruct ground in front of the pile as well as the pile's top or back side). For example, the ground may fail to reconstruct if the cameras are mounted sufficiently far away from the pile, and the view of the ground is too oblique (a viewing angle that is close to parallel to the ground surface). Similarly, with fixed-location or otherwise physically mounted cameras mounted in front of a pile, the top and back of the pile may not be reconstructed, and therefore verification of coverage of the entire surface of the object would produce a low score (as much of the pile's surface cannot be reconstructed from the images acquired at a given time from those fixed-location or otherwise physically mounted cameras). Accordingly, instead of, for example, analyzing the curvature of the pile-to-ground transition to determine the toe in such situations, points near the base of the pile (for example, within 1 meter of the ground) may be analyzed to look for a strip of connectivity that spans the pile's width, as a conclusion that the toe region of the pile was successfully reconstructed (e.g., was not occluded by an obstruction) if such a set of points is identified. To handle cases where the pile is self-occluded by one of its own bunker walls (an exterior wall of the pile blocks the view of part of the pile and its toe, referred to as 'oblique bunkers' for purposes of these illustrative embodiments, as the camera(s) are viewing the pile at an oblique angle as opposed to centered and head-on), the analysis may be limited to only those parts of the pile that should be visible. As part of doing so, a virtual "oblique" wall is created that delineates the boundary between visible and non-visible portions of the pile due to the wall's occlusion, and once the region of the pile that should be visible is defined, the toe area analysis is limited to this area (by using the visible and "oblique" wall as the pile's extent). A minimum obstruction limit threshold (amount of the strip of toe points that can be missing) may be used in order to assign a pass/fail status to the toe verification test. If the bunker wall does not have a rectangular shape (uniform height along its entire depth), then the irregular shape of the wall is modeled and the "oblique" wall is no longer a straight line. Continuity of the pile's surface may also be verified, to ensure a sufficient density of points along the entire width of the pile. The visible region of interest (the parts of the pile not self-occluded by oblique walls) may be used to quantify surface density, such as by using a density verification test that enforces a minimum limit threshold on the number of visual data points per unit in order to classify the test as pass/fail. Obstruction by equipment (trucks, loaders, conveyors, etc.) may also be performed by using object detection methods, including checking for overlap between the detected equipment and the pile, and optionally using per-site/per-pile obstruction limits to assign pass/fail statuses.

With respect to aligning two or more images (e.g., acquired at different times) and/or two or more resulting generated object models, such as by determining a common coordinate system for them, multiple techniques may be used. To enable greater consistency and ease of processing, it is preferable to reconstruct the scene (e.g., the pile and its surroundings) in a common (though potentially arbitrary) coordinate system, as having the coordinate system remain consistent from measurement to measurement allows reconstructions of the non-visible parts of the pile and/or definitions for the ground surface or bunker walls and/or clipping boundaries for nearby vegetation or equipment to be reused. There are several ways to accomplish this consistent coordinate system by using cameras physically mounted at fixed-location positions.

In a theoretical situation in which the mounted fixed-location or otherwise physically mounted cameras are perfectly rigid and do not move at all in either their location or orientation with respect to their surroundings, then known camera pose information (locations and orientations) can merely be kept fixed for all future reconstructions, so as to use the latest imagery from the cameras to directly proceed with multi-view stereo depth estimation to determine the depth of points in the scene (and then continue on to volume estimation of any piles that were present). Instead, for actual situations in which the mounted fixed-location or otherwise physically mounted cameras are not perfectly rigid (e.g., due to changes in weather or temperature, vibration in nearby equipment, movement of the camera lens, etc.), an up-to-date pose for the camera is computed and used for a given time at which acquired images are used to model an object. As part of doing so, a structure-from-motion reconstruction can be created (whether previously or at that given time) using both imagery from the fixed-location or otherwise physically mounted cameras as well as additional imagery from other sources (such as handheld cameras, drones, etc.), and can be used as a baseline or reference that defines initial camera poses and their relationship to the piles on the site. One way to compensate for motion in the fixed-location or otherwise physically mounted cameras based on 2D feature matching is to use reference imagery and poses (from the baseline reconstruction), and then compute an alignment or transformation between the current (moved) imagery and the reference images, such as for situations in which the scene's appearance remains relatively static (the objects in the scene have little-to-no movement, and the lighting remains constant, such as may be true in some indoor environments)—based on feature matches between current and reference images, an updated camera orientation can be computed, and adjustments to the cameras' poses (e.g., to their orientations) can also be made if there are sufficient matches. One way to modify the feature matching approach is to leverage 2D image features that are more robust and can handle a much wider range of scene appearance, such as for features (and feature matching algorithms) that utilize machine learning to both improve the robustness of the feature's representation, as well as accuracy of the matching (such as works similar to "SuperGlue: Learning Feature Matching With Graph Neural Networks", Sarlin et al., Conference on Computer Vision and Pattern Recognition, 2020).

Alternatively, rather than using local 2D features which focus on a specific 2D point and its neighborhood within an image, algorithms can be used that consider the whole image at once, such as to seek to find the homography (or simplified version if the camera's intrinsic calibration is known) that best aligns the current image to the reference, and with a corresponding updated camera orientation being computed. One way to accomplish this whole image alignment is to utilize an iterative, coarse-to-fine process. The image is first downsized to a smaller resolution, a variety of homography transforms are attempted, and the best alignment is found. Then, the results are upsampled to a higher resolution, the process is repeated, and eventually the alignment is carried out on the original resolution of the image at which point the best alignment has been found. Using smaller image resolutions provides efficiency, as it reduces the effective number of transformations that need to be searched, but in other situations the search for the alignment is performed using only the original resolution. When computing the alignment, a scoring function is used to determine if one alignment of the current and reference image is better than another one, such as one of multiple techniques from multi-view stereo analysis (e.g., sum of squared differences, or SSD; normalized cross correlation, or NCC; census transform and hamming distance, such as discussed in "Non-parametric local transforms for computing visual correspondence", Zabih and Woodfill, European Conference on Computer Vision, 1994; etc.). For efficiency, during the coarse-to-fine alignment, a gradient descent algorithm can be used to iteratively select new alignments that give a better result until it converges to a local minimum (rather than exhaustively evaluating all possible transforms), and an initial alignment using an affine transform may be performed and then refined with a homography as the affine transform has fewer degrees of freedom and more quickly converges.

As yet another alternative, to find and use 3D control point positions within new imagery, the general strategies from whole image alignment are applied to a smaller patch of pixels. Such 3D control points could be, for example, known signage with a particular pattern, static objects in the scene that maintain a similar appearance over time, etc., with such control points directly searched for in image (using object detection techniques) or reference imagery used to locate the annotated points-once these points are identified in the 2D images, their known corresponding 3D location within the scene can be used to estimate the relative camera motion between the reference and current imagery. Since whole image alignment can be slow to compute (as each pixel in the image must be considered multiple times as the algorithm converges), a faster method is to apply the ideas of whole image alignment to local patches of pixels that are known to be important in the image (i.e., static structure that will more likely give good and stable alignments). The general strategy is to identify distinct static structures within the reference scene, record their 2D locations in one or more images, and then seek to find those positions again in the new imagery. Once the positions are found, they can be used to compute the transform that aligns the current imagery with the reference. Specifically, for each 2D control point position in the reference image, a square patch of pixels around it is extracted, possible transforms are evaluated with respect to how well the reference patch of pixels aligns with parts of the current image (using a scoring method like the census transform and Hamming distance), and an affine transform is used to warp the patch (as the effects of perspective distortion are less pronounced so it is faster to compute than using a homography). Once the alignment for the set of control points in each image is found, updated orientations for the cameras can be computed, such as by keeping the 3D camera positions fixed, and using the control points as constraints to solve for the updated rotation. This can be formulated by treating each 2D control point observation as a 3D viewing ray, and then minimizing the angle between the current and reference viewing rays. In the case that a control point is seen by two or more cameras, that control point can be triangulated into a 3D position. Then, instead of minimizing the angle between the viewing ray from the 2D position in the current and reference imagery, the angle (or alternatively the reprojection error) between the 2D position in the current imagery and the 3D position from the reference reconstruction can be minimized (enforcing that control points triangulate to 3D positions can help filter out outlier 2D positions that were incorrectly marked). To further refine the orientations of the cameras, 2D feature matches between the images may also be used, and may be computed using structure-from-motion techniques. To solve for the orientation of each camera, its 3D position is kept fixed (based on the initial baseline reconstruction), and then constraints for the absolute rotation using control point observations are added, as are constraints on the relative rotations using the 2D feature matches and resulting triangulated 3D points. By using both sources of constraints, the absolute orientation of a camera can be determined in some situations (e.g., when multiple fixed-location or otherwise physically mounted cameras are used), even if no control points are identified for that camera (as the camera will be tied to neighboring cameras via feature matches, where the neighboring cameras will have control point observations that can be used to determine the absolute orientation within the scene). To help accelerate the search for the 2D control points within the images and ensure that they are accurate, additional logic can be employed. For instance, in the case that a control point is not visible in an image (for example, if it's temporarily blocked or has moved), the lack of a good alignment can be detected by analyzing the alignment scores for the various transforms, such as by using a technique called non-maximum suppression (which identifies the best scores that were found, and then compares their relative values to determine if the best score is significant compared to the other one), including identifying local peaks within the scoring matrix (local maxima within the 3D space defined by the affine transforms), and then comparing the best to second-best peaks that are found. If their scores are too close (by analyzing their ratio), the alignment is rejected, and the control point is assumed to not be present. Another technique that can be used is to propagate good alignments from one control point to another to help accelerate the search. For instance, if one control point has found a good, high-confidence alignment (by analyzing the relative ratio from the non-maximum suppression logic noted above), the alignment transform can be used as an initialization for the start of the search for other control points.

With respect to identifying temporary problems in images acquired from one or more fixed-location or otherwise physically mounted camera devices, multiple techniques may be used. For example, temporary problems related to rolling shutter situations may be caused by digital cameras with sensors that do not record the entire image at once and instead record the image into memory by progressively reading each line of pixels, causing artifacts to appear if there is motion (e.g., when the camera is moving while the image is being recorded, as it can result in imagery that is blurred, warped, or distorted). To detect when a camera is moving, a burst of photos can be taken in quick succession, such as at different exposures to also help reconstruct scenes that have high dynamic range. Specifically, 2D features are detected in one image, and then tracked to the other images-if the camera is not moving, then a large fraction of those features should remain in the same (or very similar) 2D positions from image to image, while if many of the features are detected to have moved (e.g., by analyzing the average motion, median motion, or other summary statistic), camera motion can be determined and the images may be discarded from use in modeling activities. Another way to detect camera motion is via inertial sensors. If the camera is equipped with an accelerometer, its accelerations can be monitored, and if an acceleration is being applied that is not in the consistent direction of gravity, camera movement can be concluded.

Another type of temporary problem results from poor imagery, such as blurry imagery (due to the camera being improperly focused), hazy or foggy imagery (due to fog or dust in the air, or dust or dirt on the lens), noisy or poorly illuminated imagery (due to low-light environmental conditions), washed out or overexposed imagery (due to the sun shining or refracting in the camera's lens), etc. Each of these issues cause a similar result in the reconstruction, mainly that there is insufficient detail in the image to correctly observe and reconstruct the scene. Several techniques can be used to detect these types of issues. First, a set of heuristics based on image filters (such as gaussian, laplacian, etc.) can be used—by convolving the image with these filters, analyzing the results, and enforcing thresholds, cases where the image content has too much variation or sharp changes in contrast (e.g., images that are too noisy) can be detected, or cases where there is not enough variation (e.g., blurry images). Another way to detect these artifacts is via machine learning, using examples of both good and bad imagery to train an image classifier to predict if a new image is usable or not.

Another type of temporary problem results from temporary obstructions in front of a pile, such as due to vehicles or other equipment that are in front of a pile and blocking the view of it from one or more fixed-location or otherwise physically mounted camera devices. In these cases, the reconstruction and measurement of the pile will be incomplete. If the pile is contained within a bunker of a known, fixed size, this issue can be detected in some situations by measuring how well the reconstructed pile's face spans between the walls (by analyzing the extent of the reconstructed pile compared to the extent of the bunker). Alternatively, a machine learning object detection method may be used that, given an image, identifies the extent of vehicles, equipment, or other obstructions that are present in it (similar to the object detection work of Redmon et al., "You Only Look Once: Unified, Real-Time Object Detection", Conference on Computer Vision and Pattern Recognition, 2016, as one example). The extent of the obstructions may then be compared to the extent of the pile, and the overlap between the two measured (where the obstruction and pile extents can be represented as bounding boxes, polygons, per-pixel segmentations, etc.)—if the overlap is too high, the measurement can be determined to be compromised, and the confidence in the accuracy of the results is reduced. In addition, when obstructions due to vehicles or equipment are detected, such as corresponding to deliveries of material being added to the pile(s) or material being removed, it can be used to trigger additional image acquisition and/or pile reconstruction.

With respect to, for situations in which a single fixed-location or otherwise physically mounted camera device is used, multiple techniques may be used to model portions of an object that are not visible from that single fixed-location or otherwise physically mounted camera. Standard stereo or multi-view methods may not be effective, as two or more views of an object or scene from different perspectives are typically used in order to triangulate points in the scene and determine its depth, while depth is ambiguous from a single image. However, there are a variety of cues in an image that can still allow the distance or size of an object to be estimated, such as to estimate the size and volume of a pile from only a single view, optionally by further using other supplementary information. One mechanism to accomplish this is via machine learning. Once the boundary for a pile is known (either through a known, fixed boundary in the image, or through a machine learning object detection method), image classification or regression methods can be used to predict the size and volume of the pile (which respectively generate predictions in either discrete increments or as a continuous function of values). To utilize the machine learning method, a large collection of training images is first assembled, where piles have been labeled with their corresponding absolute volume (or a relative volume such as 0% full, 50% full, 100% full, etc.), and are then used to train the classifier or regresser to predict a volume based on an image input. To help the machine learning method give more consistent and accurate results, supplemental information can also be leveraged—for example, if any information is known about the distance between the camera and the pile, the distance between objects in the scene, or other measurements about the size, shape, and positioning of the scene around the pile (for instance, such as walls that are surrounding the pile and limit its extent), these can all be passed as extra inputs to the machine learning method to help it correct resolve the volume of the pile. Another way to determine the volume of a pile from a single image is to rely more heavily on the pile's boundary in 2D coordinates and make some assumptions about its overall shape. For instance, given the per-pixel segmentation or bounding box around the pile (either through hand-labeling or a machine learning object detection algorithm), as well as the approximate distance between the camera and the pile, an estimate can be made for the cross-sectional area of the pile. From this cross-sectional area, a volume can be computed by assuming that the pile has either a roughly circular or square-like shape, with the example cross section used for other dimensions of its shape (e.g., by rotating the cross section by its center to sweep out a 3D volume, or extruding the cross section into a 3D volume that has equal width and depth). In the case that extra views of the pile from one or more alternate (ideally orthogonal) directions are available, the cross sections can be fused together to model the 3D shape of the pile, similar to shape-from-silhouette methods that compute the visual hull of a 3D object from multiple views of its 2D boundary.

As previously noted, in some embodiments, one or more verification tests may be performed with respect to the orientation of a camera or other device (e.g., as part of determining that the camera or other device has not moved by more than a defined threshold amount, or otherwise has an orientation that does not differ from a predefined target orientation by more than a defined orientation deviation threshold), such as part of verifying a 3D computer model that is generated using image data and/or other data (e.g., depth data) from the camera or other device by automatically applying one or more such verification tests and determining that the applied one or more verification tests are satisfied for the 3D computer model—such techniques may be used with fixed-orientation devices and/or variable orientation devices. As one non-exclusive example, the techniques may include determining the orientation at an indicated time of the camera or other device based at least in part on an analysis of data from one or more accelerometers of the camera or other device—for example, gravity and magnetic field vector values from accelerometer and magnetometer sensors may be embedded into an image's file (e.g., using EXIF, or Exchangeable Image File Format) to provide information on the orientation of the device when the data was captured, and by comparing the values at time of data capture with reference data, a determination may be made about the device's orientation (e.g., if the device is still in a serviceable orientation, needs to be remotely updated, needs on-site service, etc.). As another non-exclusive example, the techniques may include determining the orientation at an indicated time of the camera or other device based at least in part on an analysis of visual data from a camera device that includes determining a location of at least one defined control point—for example, 2D locations of known targets within a scene (e.g., particular signs or other static structures) may be identified, and if the 2D positions of these targets change significantly from their locations in the reference imagery, it may be an indication that the camera device may have moved. As yet another non-exclusive example, the techniques may include determining the orientation at an indicated time of the camera or other device based at least in part on an analysis of visual data from multiple images captured by a camera device that includes determining one or more locations of at least one feature on the surface of the exterior of the pile of material—for example, rolling shutter detection techniques (or other, similar 2D feature tracking techniques) may be used to look for motion between images from separate points in time to determine if the camera has significantly moved. As another non-exclusive example, the techniques may include using at least one trained machine learning model to determine that the orientation at the indicated time of the at least one physically mounted camera or other device differs from a predetermined target orientation by at most a defined orientation deviation threshold by comparing one or more images or other data captured at that indicated time to one or more other images or other data captured at another time (e.g., a reference image or other reference data)—for example, by training a machine learning model using pairs of images that have similar orientation or dissimilar orientation, the machine learning model can be used to predict if a new image from a camera is at a significantly different orientation than a reference image from that camera.

In addition, for cameras or other devices that have variable location and/or orientation, additional techniques may be used with respect to performing associated verification tests, such as by using visual data from a camera to track movement of the camera as its orientation is modified by one or more motors and by then determining each of the multiple orientations of the camera based at least in part on the tracked movement, and/or by using visual data from a camera to track movement the first camera as its location is modified by one or more motors and by then determining each of the multiple locations of the camera based at least in part on the tracked movement.

As previously noted, in some embodiments, one or more verification tests may be performed with respect to an amount of change between the exterior of a pile of material at an indicated time and the exterior of the pile of material at another different time (e.g., as part of determining that the amount of change does not exceed one or more change thresholds), such as part of verifying a 3D computer model that is generated using image data and/or other data (e.g., depth data) from the camera or other device by automatically applying one or more such verification tests and determining that the applied one or more verification tests are satisfied for the 3D computer model. As one non-exclusive example, the techniques may include comparison of visual data from indicated images captured of the exterior of the pile of material at an indicated time and another time to determine differences in pixel values of the indicated images, and further determining that the determined differences in pixel values do not exceed a defined pile pixel change threshold—for example, a pixel-wise segmentation of the pile material (e.g., versus other objects in the scene, as determined using a machine learning process) may be used to create a mask of the region of interest (e.g., just the material in the pile) and perform the comparison of these regions only. As another non-exclusive example, the techniques may include using at least one trained machine learning model to compare visual data from indicated images captured of the exterior of the pile of material at an indicated time and another time to determine that the amount of change does not exceed the defined pile exterior change threshold—for example, by training a machine learning model using pairs of images showing the same pile where the pile has either changed or remained the same, the trained machine learning model may predict if two other images of a pile show the same volume, or if the pile has changed and thus has a different volume.

As previously noted, in some embodiments, one or more verification tests may be performed with respect to quality of images acquired of a pile of material from a camera, such as part of verifying a 3D computer model that is generated based at least in part on such image data by automatically applying one or more such verification tests and determining that the applied one or more verification tests are satisfied for the 3D computer model. As one non-exclusive example, the one or more applied verification tests may correspond to quality of one or more images, and the techniques may include determining that one or more ISO exposure values for the visual data of the one or more images do not exceed a defined ISO exposure value threshold—for example, an ISO exposure value may be used to infer the quality of the image and lighting conditions and decide if the images have acceptable quality (e.g., taken when sufficient lighting was present), and if not acceptable quality, to optionally switch to using alternate reconstruction settings that may give better results.

In addition, in some embodiments, one or more applied verification tests may correspond to at least one object that is located between one or more cameras or other devices and the exterior of a pile of material and that obstructs at least one surface of the exterior, such as to verify that generating of a 3D computer model of the pile includes identifying the object(s) in the visual data of the one or more images and/or in other data (e.g., depth data) and excluding a volume of the object(s) from the estimated shape of the exterior of the pile of material—for example, a vehicle may be inside a boundary of a bunker in which a pile is located and would otherwise be included in a volume estimation of the pile, which is prevented by detecting and removing the additional volume of the vehicle from inside the bunker by subtracting the 3D points associated with the equipment and leaving behind just the 3D points associated with the pile, such as by using a machine learning model that has been trained to discriminate between piles and equipment, and by using output pixel labels to segment the vehicle from the pile material in 2D before extrapolating to 3D. Alternatively, in some embodiments, an initial 3D model may be generated for such a pile of material that includes a subset of the 3D model that corresponds to a vehicle or other object that is located between one or more cameras or other devices and the exterior of a pile of material and that obstructs at least one surface of the exterior—in at least some such embodiments, a machine learning model trained to analyze such a 3D model and to segment the 3D subset of the model corresponding to the vehicle or other object may be used, with that 3D subset then removed from the 3D model (e.g., without relying on image analysis, such as using pixel labels in images, to determine what parts of the images' visual data correspond to the vehicle or other object).

In some embodiments, depth-sensing devices may be used to obtain depth data for at least some of the surface of a pile of material and to generate a corresponding 3D computer model of the pile, whether in combination with image data of the pile or instead of such image data. For example, surface measurement can be performed by one or more depth-sensing devices (e.g., a depth sensor) as a scan is captured (e.g., relatively slowly, such as over a period of minutes instead of seconds, to provide more detailed scanning), and by using single point scanners and/or 2D depth sensors. With point scanners, as well as with 2D sensors with low fields of view, a gimbal controlled by one or more motors may be used to sweep the measurement area across the surface of a pile, with internal servo data of the gimbal used to generate a full 3D point cloud of the scene. If a single sensor generates the point cloud, on-device processing may further optionally be used to estimate the surface and volume, allowing the device to save bandwidth by only sending changes in the surface and volume instead of images or a full point cloud. With respect to multiple depth data sensor readings, 3D feature matching or iterative closest point solvers may be used to align each new data sensor reading scan with previously captured data sensor reading scans, such as to enable reuse of bunker specifications and pile difference maps. Once the point clouds are matched, surfaces can be extracted from the new 3D point cloud and used to measure volumes—in addition, image-based artifact detection (e.g. vehicle detection, site condition assessments, etc.) may optionally be used to verify the accuracy of the scan alignments, and if a color camera is rigidly attached to the depth sensor, resulting images from the camera can be aligned in the same 3D space as depth data from the depth scanner, which can be particularly used for low-texture materials (e.g., fine sand).

In some embodiments, cable-mounted cameras or other devices may be used to obtain data for at least some of the surface of a pile of material and to generate a corresponding 3D computer model of the pile, whether in combination with data from other sources (e.g., fixed-location cameras or other devices, mobile cameras or other devices, etc.). For example, a camera (optionally on a pan/tilt gimbal) may be driven from a cable (e.g., strung high and out of the way), with a single camera able to capture multiple angles with a baseline distance large enough to reconstruct the surface of a pile, whether by a smooth cinematic style camera pans while the camera captures video or a more static approach to drive the platform to a requested position before aiming the camera and capturing a photo. When capturing video, feature tracking may optionally be used to determine which frames contain the most geometrically relevant information, and/or constraints and assumptions may be used to estimate the camera's location and viewing direction, such as to supplement feature tracking and/or optical flow with data from the optional gimbaled camera mount, as well as rotary encoders tracking how far the camera has traveled on the cable. Due to gravity, the camera can be assumed to travel in a plane that contains the gravity vector as well as the two mounting points of the cable, so as to reduce mathematical complexity in estimating the camera location by using 4 parameters shared by all cameras to represent the plane as well as 2 parameters per camera to represent its position on the plane instead of the traditional 3 position parameters unique to each camera. Alternatively, a constraint on the possible camera position may use a physics-based model of a mass suspended from an elastic, in which constants such as the end positions of the cable and the elasticity of the cable and the weight of the mount may be determined once, leaving the distance traveled along the cable as the only parameter to be solved for each camera.

In some embodiments, pan/tilt cameras or other devices may be used to obtain data for at least some of the surface of a pile of material and to generate a corresponding 3D computer model of the pile, whether in combination with data from other sources (e.g., cable-mounted cameras or other devices, mobile cameras or other devices, cameras or other devices with both fixed location and fixed orientation, etc.). For example, attaching a camera to a gimbal driven by one or more motors allows the orientation (viewing direction) of the camera to be modified, and movement of the gimbaled camera may be used to track the orientation, such as by feature matching and extraction, optical flow-based tracking, etc., optionally using rotation data from the gimbal servo motors to initialize the tracking—in such a situation, a camera may be scanned across a pile's surface to obtain higher resolution data or to cover a larger pile than its optics would otherwise view, and specific use cases (e.g., aisles of bunkers) may be imaged more efficiently using a same camera system to image bunkers on either side of an aisle.

It will be appreciated that the details discussed above with respect to the example non-exclusive embodiments are provided for illustrative purposes, and that the described techniques are not limited to these example details.

Figure 3:
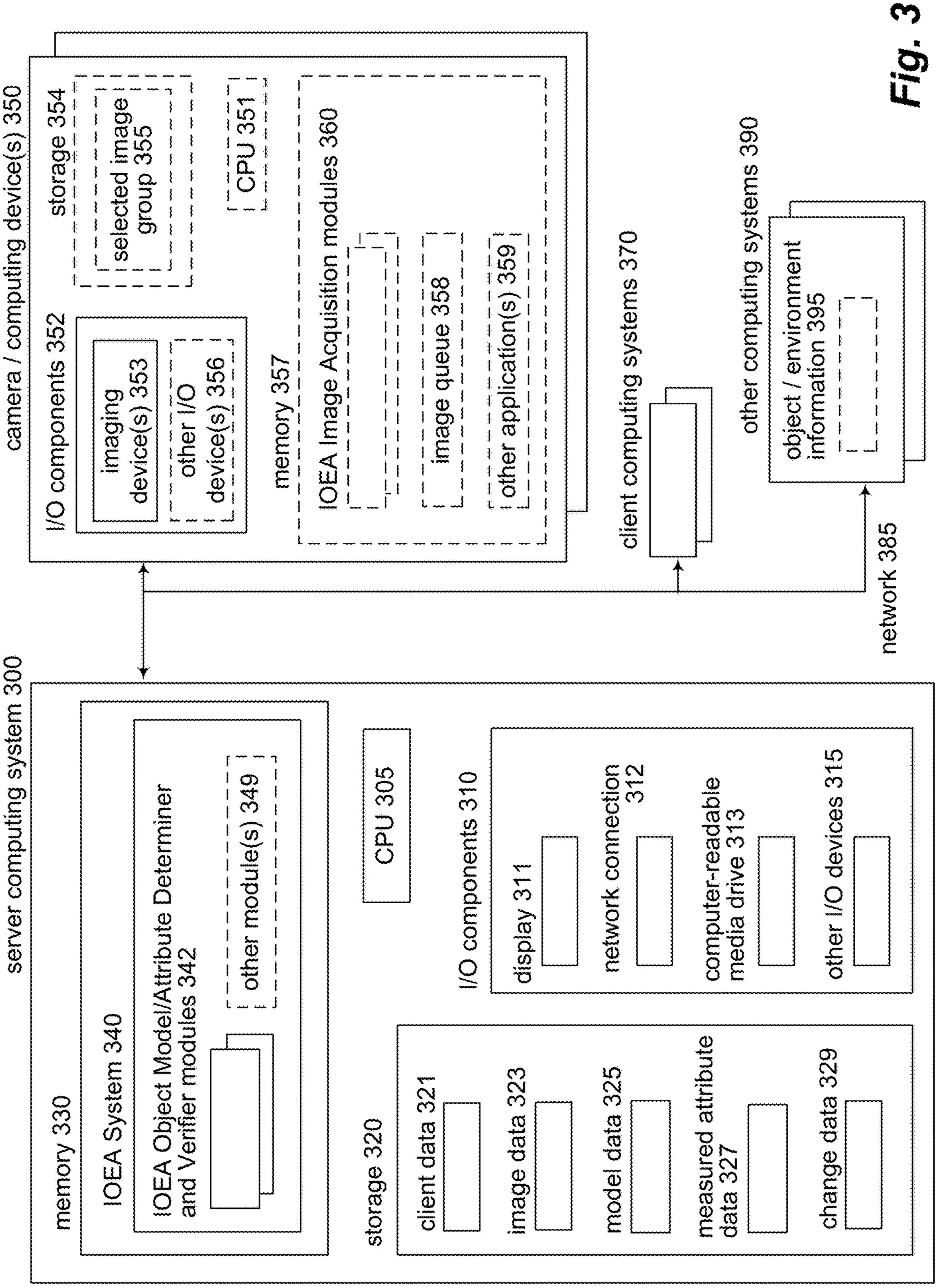
FIG. 3 is a block diagram illustrating computing systems suitable for executing embodiments of a described system for analyzing acquired images to assess volume and/or other attributes of one or more objects visible in the images.

FIG. 3 is a block diagram illustrating an embodiment of a server computing system 300 that is suitable for performing at least some of the described techniques, such as by executing an embodiment of an IOEA system 340 that provides an image-based object exterior analysis service available to various clients. The example server computing system 300 includes one or more central processing unit ("CPU") hardware processors 305, various input/output ("I/O") components 310, storage 320, and memory 330, although in other embodiments multiple such server computing systems may operate together to execute the system 340 in a distributed manner. Illustrated I/O components in this example embodiment include a display 311, a network connection 312, a computer-readable media drive 313, and other I/O devices 315 (e.g., keyboards, mice or other pointing devices, microphones, speakers, etc.)—such I/O components may enable a variety of types of interaction types (e.g., voice control, gesture control, etc.).

One or more camera devices 350 are illustrated as including one or more cameras or other image capture devices 353 to enable acquisition of images, such as corresponding to a fixed-location or otherwise physically mounted camera device or a mobile camera device. In at least some embodiments, one or more such camera devices 350 may further include computing capabilities, such as by each similarly optionally having one or more CPU hardware processors 351, one or more I/O components 352 other than the image capture devices 353 (e.g., other I/O devices 356), memory 357, and/or storage 354—in other embodiments, one or more separate local computing devices may include such computing capabilities and perform corresponding analysis activities after receiving images acquired by one or more camera devices. For the camera device and/or associated local device having computing capabilities, one or more IOEA system image acquisition modules 360 may optionally be present and executing in memory 357 (e.g., as part of one or more software applications provided by the IOEA system 340 or the entity operating the system 340), such as one or more of the image acquisition modules 168 of FIG. 1—one or more other software applications 359 may also optionally be executing in memory (e.g., to allow wireless communication with the server computing system 300 and/or with one or more separate camera devices and/or with other systems). As images are acquired and/or received, the camera device and/or associated local device having computing capabilities may optionally create and use a temporary image queue 358 in memory as part of performing image selection activities, and/or may store some or all of the acquired images on storage 354—in this example, storage 354 may optionally include multiple images selected for an image group 355 to represent an object whose images are being acquired.

The other computing systems 370 and 390 may similarly include some or all of the same types of components as the server computing system 300 and/or devices 350, but such components are not illustrated in this example for the sake of brevity. The server computing system 300 and devices 350, and the IOEA system 340 and the system 340 modules 342, 349 and 360, may also communicate with each other and/or other computing devices and systems in various manners, including via one or more networks 385 (e.g., the Internet, one or more cellular telephone networks, etc.).

In the illustrated embodiment, at least a portion of the IOEA system 340 is executing in memory 330 of the server computing system 300, and in this example includes one or more IOEA system object model/attribute determination and verification modules 342, such as one or more of the modules 169 of FIG. 1—one or more other modules 349 (e.g., IOEA system image acquisition modules) and/or other software applications (not shown) may also optionally be executing in the memory 330, including in some embodiments to execute all of the IOEA system on the server computing system. Similarly, while not illustrated in this example, in other embodiments all of the IOEA system may optionally execute in the memory 357 of a camera device and/or associated local computing device, such as to enable those device(s) to perform all of the described techniques without interacting with the server computing system 300. Additional details are discussed elsewhere herein related to types of automated operations that various of the IOEA system modules may perform. The system 340 and/or the system modules 342, 360 and 349 may in some embodiments include software instructions that, when executed, program or otherwise configure the processor(s) 305 and server computing system(s) 300, and/or processor(s) 351 and device(s) 350, to perform automated operations that implement at least some of the described techniques.

The IOEA system 340 and its modules may obtain and use various information as part of its automated operations, such as client data 321, image data 323, model data 325, measured attributed data 327 and change data 329 on storage 320 of the server computing system 300 (e.g., in one or more database tables or other data structures)—such data and its use may be similar to that described with respect to data 161-165 of FIG. 1 and/or elsewhere herein. For example, the IOEA system 340 may obtain various types of client-related information from users or other entities that act as clients of the system 340, such as by interacting with corresponding client computing systems 370 (e.g., via a corresponding optional module 349 that enables clients to register with the system 340 and/or to provide other types of client-specific information), and may store some or all such information in client data 321 on storage 320. While not illustrated here, in other embodiments some or all of the IOEA system 340 may execute on behalf of a single client or a single entity (e.g., an organization with multiple employees or other members). In addition, the IOEA system may further obtain and use additional types of data in at least some embodiments, such as information about particular objects, object types (e.g., materials) and/or object environments from one or more other computing systems 390. Such other information may be used in various manners when analyzing images, determining object attribute values and/or presenting corresponding information to clients, as discussed elsewhere herein.

It will be appreciated that the illustrated computing systems and devices are merely illustrative and are not intended to limit the scope of the present invention. For example, computing system 300 and/or device(s) 350 may be connected to other devices that are not illustrated, including through one or more networks such as the Internet or via the Web. More generally, a "client" or "server" computing system or device may comprise any combination of hardware that can interact and perform the described types of functionality, such as when programmed or otherwise configured with software, including without limitation desktop computers, laptop computers, slate computers, tablet computers, embedded computers, specialized hardware such as ASICs or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate inter-communication capabilities. For example, the illustrated system 340 and/or its modules may include executable software instructions and/or data structures in at least some embodiments, which when loaded on and/or executed by particular computing systems or devices may be used to program or otherwise configure those systems or devices, such as to configure processors of those systems or devices. Alternatively, in other embodiments, some or all of the software modules and/or systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity. Furthermore, the functionality provided by the illustrated system modules may in some embodiments be combined in fewer modules or distributed in additional modules. Similarly, in some embodiments the functionality of some of the illustrated modules may not be provided and/or other additional functionality may be available.

Thus, in at least some embodiments, the illustrated modules and/or systems are software-based modules/systems including software instructions that, when executed by the CPU(s) 305 and/or CPU(s) 351 and/or other processor means, program the processor(s) to automatically perform the described operations for that module/system. Furthermore, in some embodiments, some or all of the modules and/or systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, modules or data structures may also be stored as contents (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

FIG. 4 is an example flow diagram of an illustrated embodiment of an IOEA (Image-based Object Exterior Analysis) System routine 400. The routine may be provided by, for example, execution of an embodiment of the IOEA system 160 of FIG. 1, the IOEA system 340 of FIG. 3, and/or the IOEA system discussed with respect to FIGS. 2A-2T and 10A-10D, such as to perform activities for clients of an IOEA service being provided by the IOEA system, including to acquire and analyze images via fixed-location or otherwise physically mounted and/or mobile camera devices to identify one or more objects represented in a group of acquired images (e.g., with respect to previously modeled objects), to estimate values for one or more attributes of an object included in the images, to determine changes in objects and object attribute values over time, to perform automated verification of such attribute values in various manners, and to present information to users about various types of acquired and determined information. It will be appreciated that the routine 400 may be performed by one or more configured devices or systems.

The routine begins in block 405, where instructions or information is received. The routine continues to block 410 to determine whether an instruction is received to register a new client of the IOEA Service and/or to modify existing information for such a client, and if so continues to block 415 to obtain corresponding client information and to perform a registration for the client. In at least some embodiments, the client information obtained may include information about, for example, notification preferences or other instructions (e.g., for use in providing information to a client about one or more analyzed attributes for an object of interest to the client, such as based on images of the object supplied by the client), and/or other types of client preferences and information (e.g., mobile devices that are registered for the client to provide image information, user representatives of the client who are authorized to perform particular activities, etc.). As discussed below with respect to block 485, the routine may in some embodiments display a GUI to present various types of information to a user representative of a client or other user. While not illustrated in this example routine, the routine may further, in at least some embodiments, provide the same or different user interfaces via which a user may further interact with the IOEA system, such as via which the user may perform other activities (e.g., to register a client and/or obtain information about previous activities performed for the client). Such GUI(s) or other user interface(s) may, for example, be provided over the Internet or other network to one or more computing devices of the client's user representative, such as via a Web browser executing on those client devices, and/or may be provided at least in part by an application program of the IOEA system that is downloaded to and executed on a mobile device or other configured device of the client's user representative (e.g., a client-side application that includes one or more modules of the IOEA system). Additional details are included herein related to example GUI screens that may be used in some embodiments.

After block 415, or if it is instead determined in block 410 that the information or instructions received in block 405 are not to register client information, the routine continues to block 420 to determine whether instructions or information have been received related to performing image acquisition for one or more objects of interest, such as on behalf of a client that has just been registered in block 415 or instead for a previously registered client. For example, such a received indication may be based on a human user indicating via a mobile device or other configured device to the IOEA system that an image acquisition session is about to begin for one or more objects of interest, based on such a mobile camera device and/or a fixed-location or otherwise physically mounted camera device beginning to supply one or more acquired images as part of a new image acquisition session, based on the IOEA system providing a reminder or other instructions to a human user and/or to a fixed-location or otherwise physically mounted camera device to begin an image acquisition session (e.g., in accordance with previously defined instructions for a corresponding client), etc. If so, the routine continues to block 430 to execute an IOEA Image Acquisition routine, such as by executing one or more image acquisition modules of the IOEA system. One example of such an IOEA Image Acquisition routine is discussed in greater detail with respect to FIGS. 5A-5B.

After block 430, or if it is instead determined in block 420 that the instructions or information received in block 405 are not related to performing an image acquisition session, the routine continues to block 435 to determine whether the information or instructions received in block 405 correspond to performing object identification for a group of acquired images, such as to attempt to match those one or more objects to one or more previously modeled objects (e.g., to determine if an object represented by a group of acquired images corresponds to a changed object that was previously modeled, or is instead a new object). In some embodiments and situations, such automated object identification may not be performed, such as if the group of acquired images are known to represent a particular object (e.g., if a single object is repeatedly modeled at different times to determine changes, if user input or other information specifies the object(s) for the images without performing automated identification, etc.). Additional details are described elsewhere herein regarding performing such object identification.

After block 438, or if it is instead determined in block 435 that the instructions or information received in block 405 are not related to identifying one or more objects for a group of acquired images, the routine continues to block 440 to determine whether the information or instructions received in block 405 correspond to determining one or more models to represent one or more objects of interest and for using the model(s) to determine one or more attribute values for the object(s), such as for images just acquired with respect to block 430 or instead with respect to previously acquired and stored images. If so, the routine continues to block 450 to perform an IOEA Object Model/Attribute Determiner routine, such as by executing one or more object model/attribute determiner modules of the IOEA system. One example of such an IOEA Object Model/Attribute Determiner routine is illustrated in greater detail with respect to FIGS. 6A-6C.

After block 450, or if it is instead determined in block 440 that the instructions or information received in block 405 are not related to determining object models and corresponding attribute values, the routine continues to block 460 to determine whether the information or instructions received in block 405 correspond to verifying one or more attribute values and/or the corresponding computer model(s) for one or more objects of interest, such as for attribute values just determined with respect to block 450 or instead with respect to previously acquired and stored attribute values. If so, the routine continues to block 465 to perform an IOEA Object Model/Attribute Verifier routine, such as by executing one or more corresponding verification modules of the IOEA system. One example of such an IOEA Object Model/Attribute Verifier routine is illustrated in greater detail with respect to FIG. 7.

After block 465, or if it is instead determined in block 460 that the instructions or information received in block 405 are not related to performing automated operations to verify attribute values, the routine continues to block 470 to determine whether the instructions or information received in block 405 include determining change information over one or more times for one or more objects (and/or for a location that includes one or more objects), whether for attribute values just performed with respect to block 450 or instead for previously determined object attribute information. If so, the routine continues to block 475 to perform an IOEA Object Change Determiner routine, such as by executing one or more corresponding information change determination modules of the IOEA system. One example of such an IOEA Object Change Determiner routine is illustrated in greater detail with respect to FIG. 8.

After block 475, or if it is instead determined in block 470 that the instructions or information received in block 405 are not related to performing automated operations to determine change information for one or more objects, the routine continues to block 480 to determine whether the instructions or information received in block 405 include providing measured attribute information and/or determined change information and/or verified attribute values to a client and/or other source, whether for attribute values just determined with respect to block 450 or instead for previously determined object attribute information, and/or for change information determination just performed with respect to block 475 or instead for previously determined change information, and/or for attribute value verification just performed with respect to block 465 or instead for previously determined object attribute verification information. If so, the routine continues to block 485 to perform an IOEA Object Information Visualizer and Recipient Interactor routine, such as by executing one or more corresponding information visualizer and/or recipient interactor modules of the IOEA system. One example of such an IOEA Object Information Visualizer and Recipient Interactor routine is illustrated in greater detail with respect to FIG. 9, corresponding to using a GUI to perform interactions with one or more users. While not illustrated in FIG. 9, in other embodiments such a routine may include generating and providing one or more reports for a client or other user (whether in addition to or instead of performing user interactions via a GUI), such as by retrieving corresponding information of interest, optionally formatting the information in an indicated manner, and providing it to the user—as previously noted, in some embodiments, the providing and/or formatting of information for a client may be performed in manners previously indicated by the client, such as with respect to preferences specified by the client. Such reports are able to be provided to the client in various manners (e.g., an electronic report sent over one or more networks via one or more electronic communications, a paper-based report, etc.).

If it is instead determined in block 480 that the information or instructions received in block 405 are not to provide measured attribute information via a GUI presentation or other display, the routine continues instead to block 490 to perform one or more other indicated operations as appropriate. For example, the operations performed with respect to block 490 may include requesting or otherwise receiving additional information of one or more types about objects and/or their environments, with such additional information optionally being used as part of blocks 430 and/or 450. In addition, the operations performed with respect to block 490 may, in at least some embodiments, allow a client to perform a variety of other types of actions with respect to the IOEA system, such as to schedule notifications or activities for future times, to retrieve and monitor information about previous activities, etc. While not illustrated here, in some embodiments the routine may perform further interactions with a client or other end user, such as before, during or after providing information to the client in blocks 485 and/or 490, as discussed in greater detail elsewhere herein.

After blocks 485 or 490, the routine continues to block 495 to determine whether to continue, such as until an explicit indication to terminate is received. If it is determined to continue, the routine returns to block 405, and otherwise continues to block 499 and ends.

Figure 5B:
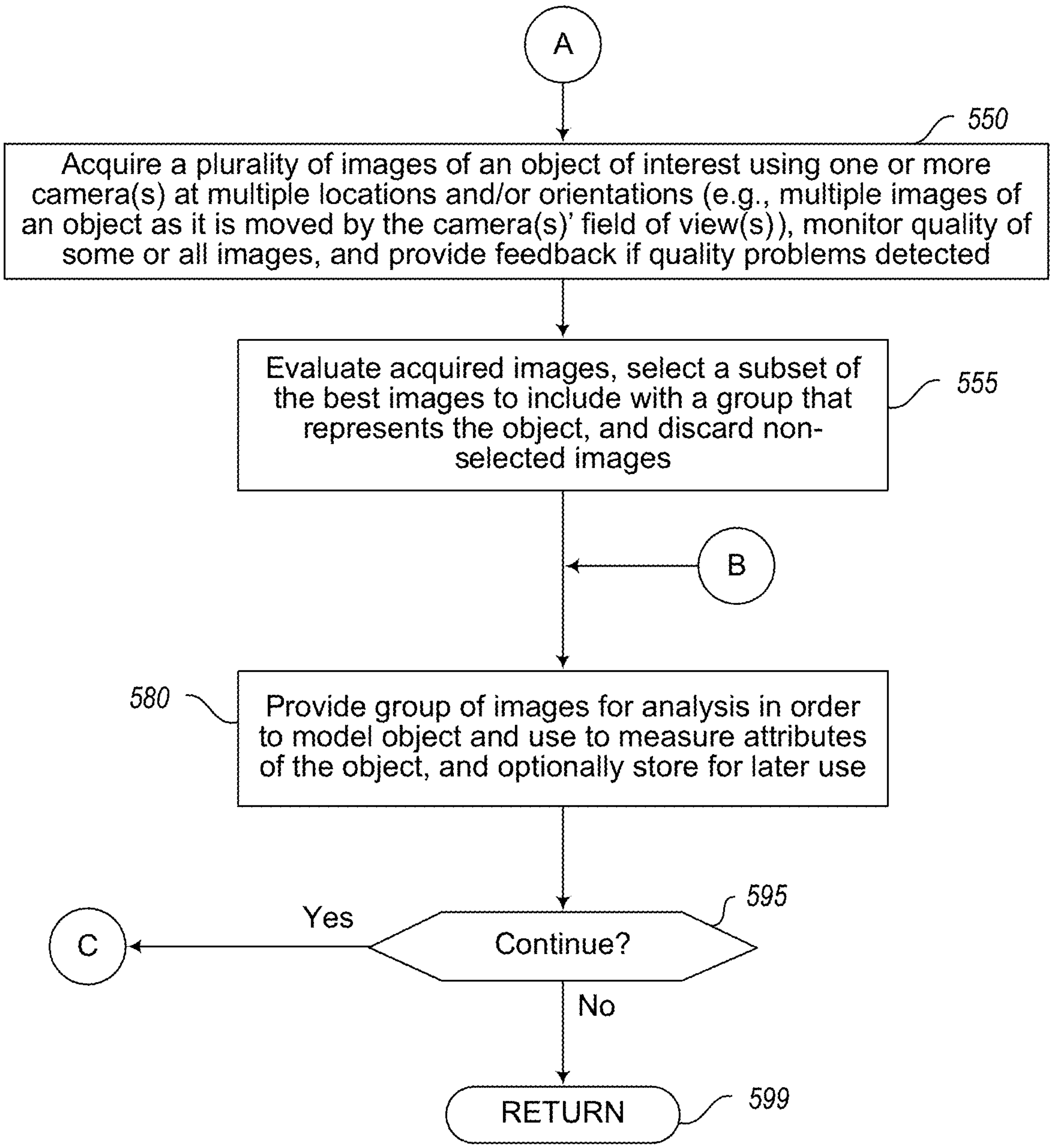

FIGS. 5A-5B are an example flow diagram of an illustrated embodiment of an IOEA Image Acquisition routine 500. The routine may be performed by, for example, the IOEA system 160 of FIG. 1, one or more of the IOEA Image Acquisition modules 360 of FIG. 3 (e.g., part of the image acquisition sub-system 168), and/or the IOEA system discussed with respect to FIGS. 2A-2T, such as to perform an image acquisition session that involves acquiring one or more images of one or more objects of interest via one or more fixed-location or otherwise physically mounted and/or mobile camera devices, selecting at least some of the acquired images to be a group that represents the object(s) of interest for additional processing, and optionally providing user feedback to a human user operator of the fixed-location or otherwise physically mounted and/or mobile camera device(s), including based on monitored image quality. The routine may be invoked in various manners in various embodiments and situations, including with respect to block 430 of FIG. 4. In the illustrated embodiment, a single image can be acquired for a session and/or used in the group for that session to represent one or more objects of interest, or a plurality of images can be acquired in a session with a subset of those images being selected to be the representative group, although in other embodiments all acquired images may be selected and used as such a group. In addition, in the illustrated embodiment, the image selection may be performed dynamically and concurrently with the image acquisition or may be performed after all of the images have been acquired, although in other embodiments only one of these two image selection alternatives may be used.

In the illustrated embodiment, the routine 500 begins at block 505, where an indication is received (e.g., for a previously scheduled acquisition activity, from dynamically triggered conditions, from an operator of a mobile device, etc.) of a beginning of an image acquisition session, and other object-specific and/or client-specific information may further be obtained and associated with the acquired images in at least some embodiments. For example, in embodiments in which the IOEA system provides services to multiple clients, a current mobile device operator may verbally or otherwise indicate a client identifier or other indication of a current client with which the images are to be associated, although in other embodiments, the later transmission or other providing of the images to a remote server for further processing may instead include such client-related information (e.g., based on a fixed-location or otherwise physically mounted camera and/or mobile device performing the transmission). In a similar manner, the mobile device operator may include a tag or other information related to one or more objects of interest to be acquired in the images, such as to assist in later identifying those specific objects (e.g., if a variety of objects exists and will each be acquired in successive image acquisition sessions).

After block 505, the routine continues to block 507 to optionally obtain information about the environment of the object, such as light levels, location, elevation, a deviation from level (if any) of a base surface on which the object of interest rests, etc. While not illustrated here, in some embodiments, such information may further be used in various manners, including to automatically adjust parameters or settings to be used for the image acquisition by the fixed-location or otherwise physically mounted camera and/or mobile camera device(s), as part of later registering the images and a resulting model with respect to location, scale, and/or orientation, etc. The obtained information about the environment in block 507 may further in some embodiments include information about a scale of an object of interest, a distance from the camera device to the object, etc., whether measured by one or more capabilities of the camera device or other equipment at or near the operator, or instead by using artificially introduced objects or information to enable such information to later be determined (e.g., a marker or target or object of known length, height, degree of level, etc., such as a set of cones at specified distance from each other, known control points, etc.).

After block 507, the routine continues to block 509, where it determines whether the images are to be acquired from one or more fixed-location camera devices with fixed orientation(s) (whether in addition to or instead of other images from one or more other mobile camera devices), and if so continues to block 511 to, for each of the fixed-location camera devices, acquire one or more images of the one or more objects of interest and select at least one of the acquired images to be used in a group to represent the object(s). The operations in block 511 may further optionally include monitoring quality or other aspects of the acquired images in some embodiments and situations, such as to ensure that they satisfy one or more minimum thresholds or other minimum standards for the images to include in the group (e.g., by determining image aspects such as contrast, sharpness, lighting levels, etc., as well as identifying particular object features for use in later image selection), as well as to optionally provide feedback and/or additional instructions to the fixed-location or otherwise physically mounted camera devices (and/or a user operator of them) if the initial images are not sufficient (to enable reacquisition of additional initial images using different settings and/or until a satisfactory image is obtained).

After block 511, or if it is instead determined in block 509 that the images are not to be acquired from any fixed-location or otherwise physically mounted camera devices, the routine continues instead to block 515 to determine whether to perform selection of the group of images for the object concurrently with their acquisition, or instead after all of the images have been acquired. If it is determined in block 515 to not perform the image selection concurrently during image acquisition, the routine continues to block 550 where it acquires a plurality of images of the one or more objects of interest, and then to block 555 where it evaluates all of the acquired images relative to each other and selects some or all of the acquired images as the best images to include as a group that represents the object(s), and discards other non-selected images (if any). The evaluation of all of the acquired images relative to each other may be based on one or more determined metrics, such as to assess quality or other aspects of the images (e.g., contrast, relative motion between two or more images, lighting levels, coverage of some or all of the object, overlap with one or more prior selected images of the group, etc.). The selection of the best images and/or the determination of when the queue acquisition criteria are satisfied may be performed in various manners in various embodiments, as discussed in greater detail elsewhere herein, including by generating graph information corresponding to overlapping images and doing a least-cost path traversal of the graph, and/or based at least in part on tracking object features across multiple images (e.g., to determine when particular features are no longer present).

If it is instead determined in block 515 to perform the image selection concurrently during image acquisition, the routine continues to block 520, where one or more initial images are acquired for an object of interest, and one of the initial images is selected as a first image in the group, as well as a current first item in an image queue to be used to temporarily store images being acquired until selected images are determined. The operations in block 520 may further include monitoring quality or other aspects of the initial images in some embodiments and situations, such as to ensure that they satisfy one or more minimum thresholds or other minimum standards for the images to include in the group (e.g., by determining image aspects such as contrast, sharpness, lighting levels, etc., as well as identifying particular object features for use in later image selection), as well as to optionally provide feedback to the mobile camera device (and/or a user operator of it) if the initial images are not sufficient (to enable reacquisition of additional initial images until a satisfactory image is obtained). After block 520, the routine continues to blocks 525-535 to repeatedly acquire additional images until one or more of those additional images are selected for the group, with other of those additional images that are not selected being discarded from further use in at least some embodiments and situations. In particular, in block 525, the routine continues to acquire additional images until one or more queue acquisition criteria are reached (e.g., based on a quantity of images, amount of time, amount of distance traveled by the operator, amount of difference between two or more images in the queue, loop closing, etc.). After each of some or all of the additional images are acquired, a quality and/or other aspects of the image is monitored in this embodiment, such as to enable images that do not satisfy minimum thresholds or minimum satisfaction criteria to be discarded from the queue (or not placed in the queue) and/or to enable user feedback to be provided to the user regarding the problems with the images being acquired (e.g., to enable the user to improve the quality of future images that are acquired, whether at different locations or to reacquire one or more of the images that were not satisfactory). After block 525, the images that are currently in the queue are evaluated, such as to enable one or more of the best images to be selected to be added to the group, based on one or more determined metrics used for the evaluation (e.g., contrast, relative motion between two or more images, lighting levels, coverage of some or all of the object, overlap with one or more prior selected images of the group, etc.). The selection of the best images and/or the determination of when the queue acquisition criteria are satisfied may be performed in various manners in various embodiments, as discussed in greater detail elsewhere herein, including based at least in part on tracking object features across multiple images (e.g., to determine when particular features are no longer present). After one or more such best images are selected, the selected best images are added to the group, and other item images in the queue before the most recent such best image are discarded in the illustrated embodiment, although in other embodiments such other images may be retained but not included in the group. After block 530, the routine continues to block 535 to determine whether there are more images to acquire in this session, such as until an entire exterior of one or more objects of interest has been captured, or otherwise until the image acquisition session is determined to be completed. If there are more images to acquire, the routine returns to block 525, and otherwise continues to block 580. Furthermore, after the image acquisition session is completed, various types of housekeeping operations may be performed, such as to delete the temporary queue, to remove some/all of the acquired images from the mobile device (e.g., after they are provided to a remote server in block 580), etc.

After block 555, or if it is determined in block 535 that there are not more images to acquire during a concurrent image acquisition and selection session, the routine continues to block 580, where the selected group of images from the concurrent or non-concurrent image selection processes is provided as output of the routine for additional analysis in order to measure one or more attributes of the object, with such images optionally being stored for later use. As discussed in greater detail elsewhere, in some embodiments, some or all of the image acquisition activity discussed with respect to routine 500 may occur on one or more mobile devices that are used to acquire the images and/or on one or more fixed-location or otherwise physically mounted camera devices and optionally their associated local computing devices (such as under control of one or more modules of the IOEA system, optionally as part of a client-side application executing on the mobile devices), and if so, the providing operations performed in block 580 may include transmitting or otherwise providing the selected group of images to one or more remote server systems, although in other embodiments, all operations of the IOEA system may be performed by one or more configured devices (e.g., by a mobile device, by a fixed-location or otherwise physically mounted camera device and/or is associated local computing device, etc.) without such transmittal to a remote server system.

After block 580, the routine continues to block 595 to determine whether to continue, such as until an explicit indication to terminate is received, or instead based on the completion of the routine after an invocation performed by another routine (e.g., such as in block 430 of FIG. 4). If it is determined to continue, the routine returns to block 505, and otherwise continues to block 599 and returns.

FIGS. 6A-6C are an example flow diagram of an illustrated embodiment of an IOEA Object Model/Attribute Determiner routine 600. The routine may be performed by, for example, execution of the IOEA system 160 of FIG. 1 (e.g., the Object Model/Attribute Determiner module 174), the IOEA Object Model/Attribute Determiner module 342 of FIG. 3, and/or the IOEA system discussed with respect to FIGS. 2A-2T, such as to analyze a selected group of images that represents an object in order to determine one or more values for attributes of interest for the object, as well as to provide corresponding information to a client. The routine 600 may be invoked in various manners in various embodiments and situations, including with respect to block 450 of FIG. 4. In addition, while the illustrated embodiment of the routine 600 includes generating a model and using that model to measure attributes of interest, the attribute value determination activities may be performed in other manners in other embodiments.

The routine 600 begins at block 605, where an indication is received of a group of selected images that are captured at a given time to represent one or more objects of interest at that given time. The routine continues to block 610 to analyze the images to, for each of the one or more objects, identify portions corresponding to the object and to optionally exclude other non-object portions (e.g., of the ground or other underlying base surface), and to further identify any obstructions between the camera and the object (e.g., temporary obstructions) and any temporary problems for the images. As part of the analysis, multiple images captured at the given time may be aligned, as discussed in greater detail elsewhere herein. In addition, the obstruction identification may, for example, include supplying the images to a trained neural network classifier to identify specific types of intervening elements between the camera and the object, or more generally to identify differences in one or more factors between other data for the object and data for the intervening element (e.g., with respect to color, texture, shape, distance, etc.), as discussed in greater detail elsewhere herein. In addition, the identification of other temporary problems may include performing various types of analyses of the visual content of the images (e.g., identifying quality problems) and/or receiving information from a previous analysis of the images that is part of an image selection process during the image acquisition session (e.g., to select a subset of acquired images to use in a group to represent an object), as discussed in greater detail elsewhere herein.

After block 607, the routine continues to block 608, where it determines if the object is moving past one or more cameras rather than being stationary (e.g., based at least in part on differences in feature tracking movements between an object and data in the background), and if so continues to block 609 to analyze at least the portions of the images corresponding to the object to do feature matching and/or tracking (optionally doing image segmentation to separate subsets of image pixels corresponding to the object from other image pixels), to use that information to align the images into a common coordinate system (e.g., using SfM processing), and to generate at least a partial 3D computer model or other representation of the object. If it is instead determined in block 608 that the object is not moving, the routine continues instead to block 610, where it determines whether the images analyzed in block 607 are from only one or more fixed-location or otherwise physically mounted camera devices that have only a partial view of the object (i.e., with gaps of one or more omitted surfaces, and such as based on previous configuration information supplied with respect to the visual coverage of particular fixed-location or otherwise physically mounted camera devices with respect to objects in their visual coverage). If not, the routine continues to block 660, where it generates a model or other representation of the object (optionally based on further analysis of the images, including to align multiple images captured at the given time if not previously performed), such as by generating a point cloud model in which portions of the images of the selected group that correspond to the object are separated from other portions of the images that are not part of the object (e.g., part of a base plane or other base service on which the object rests). Such a point cloud may include a mesh of numerous 3D data points representing the surface of the object that are extracted from data of the images, and additional interpolation or other fitting of the object surface between the 3D data points. The generating of the point cloud model may further be based in some embodiments at least in part on tracking particular object features through multiple of the selected images, and using such information from the multiple images to determine relative 3D location of each feature with respect to one or more other features. In some embodiments, the routine may optionally further generate an additional model or other representation of some or all of the base surface on which the object is situated.

If it is instead determined in block 610 that the images acquired at the given time in the group do have gaps in their visual coverage of an object of interest, the routine continues instead to block 615, where it determines whether to use prior acquired images and/or of a corresponding prior model from an earlier time before the given time to supplement the images captured at the given time—the determination may be based, for example, on whether any such prior information is available, as well as on previously specified configuration information for the one or more fixed-location or otherwise physically mounted camera devices used (e.g., to not use prior data for a situation in which multiple fixed-location or otherwise physically mounted camera devices in a particular environment provide visual coverage of a particular object above a specified percentage of the surface of the object). If it is determined to use such prior data, the routine continues to block 640, where it retrieves corresponding prior images (e.g., previously acquired by one or more mobile devices) and/or a corresponding prior model of the object generated from such prior images, and in block 645 proceeds to determine a common coordinate system for the prior images and the images in the group that were captured at the given time, such as to align the prior and current images. After block 645, the routine continues to block 650, where it generates a model or other representation of the object (e.g., based on further analysis of the images), such as by generating a point cloud model for a subset of the object that is visible in the images of the selected group (e.g., in a manner similar to that discussed with respect to block 660, and in greater detail elsewhere herein), and using additional visual data from the prior images and/or prior model to estimate shapes for at least some additional surface areas of the object. In addition, one or more omitted surfaces from the images captured at the given time may be further estimated in other manners in other embodiments (e.g., if the prior data does not provide full visual data of that omitted surface), including via use of interpolation, extrapolation, flat or curved regular shape fitting, using estimated slope information, using a fitted type of geometrical shape, etc.

If it is instead determined in block 615 to not use prior data to supplement the images captured at the given time, the routine continues instead to block 620, where it determines whether gaps in the visual coverage from the images captured at the given time are small enough to use interpolation and/or extrapolation, such as based on an amount of visual data that is available surrounding a particular omitted surface. If so, the routine continues to block 630, where it generates a model or other representation of the object (e.g., based on further analysis of the images), such as by generating a point cloud model for a subset of the object that is visible in the images of the selected group (e.g., in a manner similar to that discussed with respect to block 660, and in greater detail elsewhere herein), and using interpolation and/or extrapolation to estimate shapes of one or more omitted surfaces corresponding to the gaps in visual coverage, such as by using flat or curved regular shape fitting, using estimated slope information, etc.

if it is instead determined in block 620 that the gaps in the visual coverage from the images captured at the given time are not small enough to use interpolation and/or extrapolation, the routine continues instead to block 625, where it generates a model or other representation of the object (e.g., based on further analysis of the images), such as by generating a point cloud model for a subset of the object that is visible in the images of the selected group (e.g., in a manner similar to that discussed with respect to block 660, and in greater detail elsewhere herein), and by selecting and fitting a type of geometrical shape to the object that is used to estimate shapes of one or more omitted surfaces corresponding to the gaps in visual coverage. The type of geometrical shape may be determined, for example, based on previously supplied configuration information for the object (e.g., based on a manner in which the object is created).

While the operations of block 615-660 are illustrated as corresponding to different techniques for estimating shape information for surfaces of an object, it will be appreciated that in other embodiments some or all of the techniques may be used together for a particular object at a given time, such as estimate the shape of one omitted surface using one technique, using another technique to estimate the shape of another omitted surface, etc.

After block 609, for situations in which the object is moving, the routine continues to perform blocks 662-674 in a manner similar to blocks 610-660. In particular, in block 662, the routine determines whether the images have only a partial view of the object (i.e., with gaps of one or more omitted surfaces, and such as based on previous configuration information supplied with respect to the visual coverage of particular fixed-location or otherwise physically mounted camera devices with respect to objects in their visual coverage). If not, the routine continues to block 676, and otherwise continues to block 664, where it determines whether to use prior acquired images and/or of a corresponding prior model from an earlier time before the given time to supplement the images captured at the given time—the determination may be based, for example, on whether any such prior information is available, as well as on previously specified configuration information for the camera devices used (e.g., to not use prior data for a situation in which multiple fixed-location or otherwise physically mounted camera devices in a particular environment provide visual coverage of a particular object above a specified percentage of the surface of the object). If it is determined to use such prior data, the routine continues to block 666, where it retrieves corresponding prior images (e.g., previously acquired by one or more mobile devices) and/or a corresponding prior model of the object generated from such prior images, and in block 668 proceeds to generate a further partial model or other representation of the object (e.g., based on further analysis of the images), such as by generating a point cloud model for a subset of the object that is visible in the images of the selected group, and using additional visual data from the prior images and/or prior model to estimate shapes for at least some additional surface areas of the object, and adds the generated further partial model to the model determined in block 609. In addition, one or more omitted surfaces from the images captured at the given time may be further estimated in other manners in other embodiments (e.g., if the prior data does not provide full visual data of that omitted surface), including via use of interpolation, extrapolation, flat or curved regular shape fitting, using estimated slope information, using a fitted type of geometrical shape, etc. If it is instead determined in block 664 to not use prior data to supplement the images captured at the given time, the routine continues instead to block 670, where it determines whether the gaps in the visual coverage from the images are small enough to use interpolation and/or extrapolation, such as based on an amount of visual data that is available surrounding a particular omitted surface. If so, the routine continues to block 674, where it generates a further partial model or other representation of the object (e.g., based on further analysis of the images), such as by generating a point cloud model for a subset of the object that is visible in the images of the selected group (e.g., in a manner similar to that discussed with respect to block 660, and in greater detail elsewhere herein), and using interpolation and/or extrapolation to estimate shapes of one or more omitted surfaces corresponding to the gaps in visual coverage, such as by using flat or curved regular shape fitting, using estimated slope information, etc., and adds the generated further partial model to the model determined in block 609. If it is instead determined in block 670 that the gaps in the visual coverage from the images captured at the given time are not small enough to use interpolation and/or extrapolation, the routine continues instead to block 672, where it generates a further partial model or other representation of the object (e.g., based on further analysis of the images), such as by generating a point cloud model for a subset of the object that is visible in the images of the selected group (e.g., in a manner similar to that discussed with respect to block 660, and in greater detail elsewhere herein), and by selecting and fitting a type of geometrical shape to the object that is used to estimate shapes of one or more omitted surfaces corresponding to the gaps in visual coverage, and adds the generated further partial model to the model determined in block 609. The type of geometrical shape may be determined, for example, based on previously supplied configuration information for the object (e.g., based on a manner in which the object is created).

After blocks 668, 672 or 674, the routine continues to block 676 to determine whether to perform object movement trajectory determination for moving objects, and if so continues to block 678 to do so. In particular, in block 678, the routine obtains a plurality of respective distinct estimated camera poses for each stationary camera calculated for a plurality of images captured by that camera (based at least in part on an assumption that the object is at a constant location during the period of time and the camera is moving during the period of time), computes 3D transformations to align the plurality of respective distinct camera poses to a single camera pose, applies the computed 3D transformations to the object's assumed constant location to determine a plurality of estimated distinct object poses for the object corresponding to the plurality of images, and determines a trajectory of movement of the object through at least some of the multiple locations based at least in part on the determined plurality of estimated distinct object poses. If there are multiple stationary cameras, the routine further determines a best estimate of the object movement trajectory by combining data from the multiple object movement trajectories determined for the separate cameras. If there are one or more moving cameras, the routine performs similar processing using only image pixels corresponding to the object in the images being analyzed.

After blocks 625, 630, 650, 660 or 678, or if it is instead determined in block 676 not to determine object movement trajectory for moving objects captured in images by one or more stationary cameras, the routine continues to block 680 to further optionally analyze the images and/or other object data corresponding to the object or its environment to determine additional information about the object, such as to determine the material of the object. While various blocks of the routine refer to analyzing the images to determine different types of information, it will be appreciated that, in some embodiments, some or all analysis of the images will occur only once or simultaneously to obtain multiple types of information and/or to generate multiple models representing different types of information in the models.

In block 685, the routine then uses the generated model to estimate the object volume, and to optionally determine or otherwise estimate values for other attributes of the object, such as contour lines or other surface area information, weight, radioactivity, etc.—such attribute value estimation may in some situations involve information determined in block 680, such as to use a determined type of material and other information about a unit weight for the material by volume to determine the weight of the overall object based on its estimated volume and determined material type. In some embodiments, the operations performed with respect to one or more of the blocks of the routine may further include manipulating or modifying the generated model in various manners, such as to fit a bare earth model and/or a surface model to the point cloud model. In other embodiments, other types of models may be determined and used, non-exclusive examples of which include occupancy graphs, an octree or volumetric representations based on voxels, etc.

As one specific example, the calculation of volume of an object may be performed based on measuring the amount of space between the surface of the pile and the ground it sits on, referred to generally in this specific example as the top and base surfaces, respectively. For example, even if the object is irregular and/or porous (e.g., a stockpile of construction aggregate materials) or the surfaces are otherwise approximate, the object may be modeled as having a fixed surface. Thus, the top and base surfaces may be treated as meeting along a boundary (e.g., to form a watertight solid that approximates the shape and volume of the pile). The solid may, for example, be represented with a boundary model formed of the two surfaces in polygonal or parametric form, or as a volumetric model such a 2½D height fields or a 3D voxel grid. The model may contain the pile itself, as well as optionally containing parts of the surrounding environment. Using such a model, the volume computation may start with a step that segments the model into two components, with the first component containing the part of the model that represents the object, and the second component containing the remainder of the model. If the model is volumetric (such that the volume can be computed directly), then the object volume is obtained by computing the volume of the object component. Otherwise, the object component may be further segmented to isolate the top surface, base surface and toe components. In some embodiments, the model may be generated in the form of a 3D point cloud. The points of such a 3D point cloud model may be sampled from the top surface, the toe, and the surfaces of the surrounding environment, while the base surface is not sampled due to it being a contact surface. The point cloud may, for example, be expressed in a Cartesian coordinate system, where the local vertical is aligned with the z up axis (i.e. pointing away from the center of the Earth, for an object resting on the ground). Given an object point cloud, the corresponding volume may be computed first by segmenting the points into top surface, toe and environment components. Then, z-aligned height fields may be fitted to the toe and surface components (e.g., in a smooth and statistically robust manner). Finally, the object volume may be obtained by computing the integral of the difference between the top and toe fields. Alternatively, if a bare earth model of the environment (e.g., of the base surface on which the object sits) is available, then the volume may be obtained by computing the integral of the difference between the top field and a field derived from the bare earth model. If the object rests on complex terrain or man-made structures, then 3D models of these structures may be used to aid segmentation and field fitting. The models may be pre-existing or derived from the same point cloud. Finally, the point cloud may be pre-processed prior to segmentation. Pre-processing may include de-noising, removal of artifacts, simplification, scaling, leveling, geo-referencing, etc. Such artifacts may, for example, represent data that is added to one or more images but does not have a corresponding source in the object or environment, such as for artificially introduced data based on an imaging error or other problem, as described in greater detail elsewhere herein. The point cloud may also, in some embodiments and situations, contain reflectance and/or color information, and/or other meta-data that may be used volume computation. While the volume computation process may be fully automated in some embodiments and situations, in other embodiments and situations some human input may be provided as part of the process.

After block 685, the routine continues to block 690 to provide information about the estimated object attribute values as output of the routine, such as to another routine from which the routine 600 was invoked (e.g., routine 400). The routine optionally includes additional determined object information from block 680 as well in the provided information, and further stores the generated and determined information for later use.

After block 690, the routine continues to block 695 to determine whether to continue, such as until an explicit indication to terminate is received, or instead based on the completion of the routine after an invocation performed by another routine (e.g., such as in block 450 of FIG. 4). If it is determined to continue, the routine returns to block 605, and otherwise continues to block 699 and returns.

FIG. 7 is an example flow diagram of an illustrated embodiment of an IOEA Object Model/Attribute Verifier routine 700. The routine may be performed by, for example, execution of the IOEA system 160 of FIG. 1 (e.g., the Object Model/Attribute Verifier module 178), the IOEA Object Model/Attribute Verifier module 342 of FIG. 3, and/or the IOEA system discussed with respect to FIGS. 2A-2T, such as to perform automated operations to verify object attribute values and/or corresponding generated computer model(s), as well as to provide corresponding information to a client. The routine 700 may be invoked in various manners in various embodiments and situations, including with respect to block 465 of FIG. 4. In addition, while the illustrated embodiment of the routine 700 performs attribute value verification in particular manners, the attribute value verification activities may be performed in other manners in other embodiments.

The routine 700 begins at block 705, where an indication is received of a generated computer model for an object of interest at a given time based on images acquired at that given time (e.g., from one or more fixed-location or otherwise physically mounted cameras with visual coverage of the object), and optionally of corresponding attribute values from the computer model for which to perform automated verification activities. The routine continues to block 710 to determine whether to perform automated operations related to verifying the toe area of a modeled object (e.g., determining confidence in having sufficient visual data to represent the toe area), and if so continues to block 715 to perform corresponding activities. In particular, the routine in block 715 identifies a subset of the modeled object to represent the toe area (e.g., a horizontal strip across a front face of the object and within a defined distance from the object boundary with the underlying surface), and determines if a percentage or other amount of the width of the toe area for which visual data is available exceeds one or more defined thresholds, with a confidence in the verification (or lack thereof) of the toe area being subsequently determined in block 770 based on the determined percentage or other amount. Additional details are included elsewhere herein related to verifying a toe area of the modeled object.

After block 715, or if it is instead determined in block 710 not to perform automated operations related to verifying the toe area, the routine continues to block 725 to determine whether to perform automated operations related to verifying the surface area coverage of the modeled object (e.g., determining confidence in having sufficient visual data to represent the surface), and if so continues to block 730 to perform corresponding activities. In block 730, the routine identifies a subset of the modeled object for which to assess the surface area coverage (e.g., some or all of a subset of the object that is visible from the images acquired at a given time to represent the object), and determines if a density of visual data points within the identified subset exceeds one or more defined thresholds, with a confidence in the verification (or lack thereof) of the surface area coverage being subsequently determined in block 770 based on the determined percentage or other amount. Additional details are included elsewhere herein related to verifying surface area coverage of the modeled object.

After block 730, or if it is instead determined in block 725 not to perform automated operations related to verifying the surface area coverage, the routine continues to block 740 to determine whether to perform automated operations related to verifying the absence of temporary problems in the visual contents of the images acquired at a given time to use in modeling the object (e.g., determining confidence in the absence of such temporary problems), and if so continues to block 745 to perform corresponding activities. In block 745, the routine reviews information about whether one or more types of temporary problems exist for the images acquired at the given time (e.g., by analyzing visual contents of the images), such as to identify and assess any temporary obstructions that block view of portions of the object, to identify quality problems of one or more types in the acquired images, etc., and determines if any such identified temporary problems cause uncertainties in the shape of the modeled object that exceed one or more defined thresholds, with a confidence in the verification (or lack thereof) of the absence of such temporary problems being subsequently determined in block 770 based on the determined information. Additional details are included elsewhere herein related to verifying the absence of temporary problems in the visual contents of the images acquired at a given time to use in modeling the object.

After block 745, or if it is instead determined in block 740 not to perform automated operations related to verifying the absence of temporary problems in the visual contents of the images acquired at a given time, the routine continues to block 760 to optionally determine one or more additional verification-related activities to perform (e.g., to verify one or more object attribute values, to verify absence of vegetation obscuring the object, to verify absence of water adjacent to the object, to verify absence of one or more other overlapping objects, etc.), and to perform corresponding verification activities, as discussed in greater detail elsewhere herein. In block 770, the routine then uses the determined information from blocks 715 and/or 730 and/or 745 and/or 760 to determine confidence values in the respective verification activities, optionally after making an overall determination of the generated computer model for the object, such as based on a weighted combination of multiple distinct verification-related values, although in other embodiments multiple distinct verification-related values may instead be separately used without such combination into an overall value, and/or the confidence values may instead be performed at a time of respective verification activities in blocks 715 and/or 730 and/or 745 and/or 760. If the overall value (and/or individual value(s)) are determined in block 775 to exceed a corresponding threshold, the routine continues to block 780 to provide information to an end user or other recipient about the one or more verifications (and optionally about object attribute values being verified), and otherwise continues to block 785 to provide information to the end user or other recipient about the lack of the one or more verifications (and optionally about the lack of the verifications of particular object attribute values).

After blocks 780 or 785, the routine continues to block 790 to optionally perform one or more further interactions with one or more end users related to the verification-related activities, such as to receive manual input to override or supplement some or all of the verification determinations.

After block 790, the routine continues to block 795 to determine whether to continue, such as until an explicit indication to terminate is received, or instead based on the completion of the routine after an invocation performed by another routine (e.g., such as in block 465 of FIG. 4). If it is determined to continue, the routine returns to block 705, and otherwise continues to block 799 and returns.

FIG. 8 is an example flow diagram of an illustrated embodiment of an IOEA Object Change Determiner routine 800. The routine may be performed by, for example, execution of the IOEA system 160 of FIG. 1 (e.g., the Object Change Determiner module 176), an IOEA Object Change Determiner module 342 of FIG. 3, and/or the IOEA system discussed with respect to FIGS. 2A-2T and 10A-10D, such as to analyze two or more generated models for two or more different times for each of one or more objects in order to determine changes over time, as well as to provide corresponding information to a client. The routine 800 may be invoked in various manners in various embodiments and situations, including with respect to block 475 of FIG. 4. In addition, while the illustrated embodiment of the routine 800 includes comparing generated models, the change determination activities may be performed in other manners in other embodiments.

The routine 800 begins at block 805, where an indication is received of one or more attributes of interest for which change information is to be determined for one or more objects, and of two or more generated models for each object that represent the object at different times. The routine continues to block 810 to, for each object, align its models if they are not already aligned (with each other or with respect to a common reference system), including to first optionally determine that the models correspond to the same single object if not previously performed. After block 810, the routine continues to block 815 to, for each object, compare information from its two or more models to determine changes over the two or more times for each of the attributes of interest. The routine then continues to block 820 to further optionally analyze additional images and/or other object data corresponding to the object or its environment to determine additional change information, such as to determine changes on a site-wide basis with multiple objects (e.g., new objects, objects that have been removed or merged, etc.).

After block 820, the routine continues to block 880 to provide information about the determined changes as output of the routine, such as to another routine from which the routine 800 was invoked (e.g., routine 400). The routine further stores the determined change information for later use. After block 880, the routine continues to block 895 to determine whether to continue, such as until an explicit indication to terminate is received, or instead based on the completion of the routine after an invocation performed by another routine (e.g., such as in block 475 of FIG. 4). If it is determined to continue, the routine returns to block 805, and otherwise continues to block 899 and returns.

Figure 9:
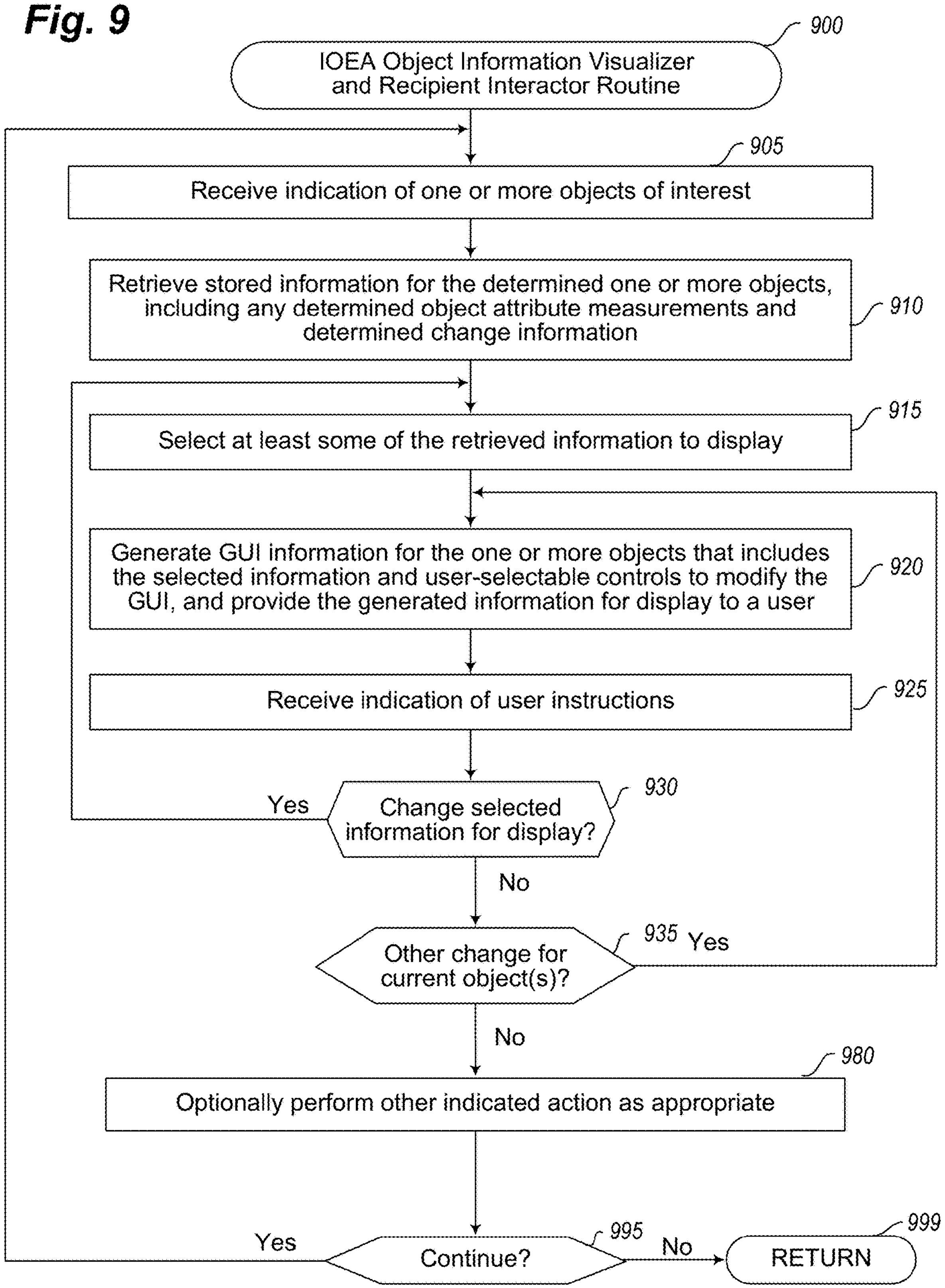
FIG. 9 is an example flow diagram of an illustrated embodiment of an IOEA Object Information Visualization And Recipient Interaction routine.

FIG. 9 is an example flow diagram of an illustrated embodiment of an IOEA Object Information Visualizer and Recipient Interactor routine 900. The routine may be performed by, for example, execution of the IOEA system 160 of FIG. 1 (e.g., the Object Information Visualizer and Recipient Interactor module 177), an IOEA Object Change Determiner module 342 of FIG. 3, and/or the IOEA system discussed with respect to FIGS. 2A-2T and 10A-10D, such as to present information of various types to one or more users via one or more GUI screens (e.g., to present determined change information and/or other information for one or more objects). The routine 900 may be invoked in various manners in various embodiments and situations, including with respect to block 485 of FIG. 4. In addition, while the illustrated embodiment of the routine 900 includes presenting particular types of information, the presentation activities may be performed in other manners in other embodiments, including for other types of information.

The routine 900 begins at block 905, where an indication is received of one or more objects of interest for which to present information, and optionally of one or more types of information of interest (e.g., particular attributes; particular times; particular types of information, such as change information; etc.). The routine continues to block 910 to retrieve stored information for the one or more objects, such as all determined information, or instead particular types of information as specified in block 905. After block 910, the routine continues to block 915 to select at least some of the retrieved information for display (e.g., using defaults, user preferences, instructions received in block 905, etc.), and then proceeds to block 920 to generate and provide one or more GUI screens for display to one or more users with the selected information and with additional user-selectable controls to allow the user to modify the display. It will be appreciated that such GUI information may, for example, be displayed on the computer system that performs the routine (e.g., a mobile device of a user), or instead may be performed by one or more server computer systems that are remote from one or more client devices of the user on which the information is displayed, with such generated information being transmitted over one or more computer networks from the server system(s) to the client device(s).

After block 920, the routine continues to block 925 to receive user instructions, and to optionally perform one or more loops with respect to blocks 915-935 to modify the information presented in the GUI in accordance with the user instructions and/or based on new data that becomes available while the GUI is displayed (e.g., new determined change information, new attribute values, etc.). After block 925, the routine continues to block 930 to determine whether the user instruction corresponds to changing some or all of the selected information for the current one or more objects of interest (e.g., to change one or more times for which change information is displayed, to change a type of information displayed, etc.), and if so returns to block 915 to select new corresponding information for display in an updated modified GUI. If it is instead determined in block 930 that the user instructions are not to change selected information for the current one or more objects of interest, the routine continues instead to block 935 to determine if the user instructions correspond to other changes or actions to perform for the current objects (e.g., to take an action that does not change the selected information or modify the GUI, to take an action that modifies the GUI without changing the selected types of information, etc.), and if so returns to block 920 to update the GUI display if appropriate, and otherwise to continue to block 925 to wait for an additional user instruction. If it is instead determined in block 935 that the user instructions are not to make changes other than for the current objects, the routine continues instead to block 980 to optionally perform one or other indicated operations (e.g., to update stored preference information for the user or other stored information for the user, etc.).

After block 980, the routine continues to block 995 to determine whether to continue, such as until an explicit indication to terminate is received, or instead based on the completion of the routine after an invocation performed by another routine (e.g., such as in block 485 of FIG. 4). If it is determined to continue, the routine returns to block 905, and otherwise continues to block 999 and returns.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:

acquiring, during a period of time and from a stationary camera that is physically mounted at a fixed location and a fixed orientation, and as a transporting vehicle moves a pile of material through multiple successive locations by the stationary camera during the period of time, multiple images of an exterior of the pile of material at the multiple locations that in aggregate have visual data for the exterior of the pile of material;

generating, by one or more computing devices and using Structure-from-Motion (SfM) processing, a three-dimensional ("3D") computer model to represent the exterior of the pile of material, including:

analyzing, by the one or more computing devices, the visual data of the multiple images to determine multiple respective shapes of the pile of material, including determining, for each of the multiple images, a shape of a portion of the exterior of the pile of material that is visible in that image;

tracking, by the one or more computing devices, features of the pile of material at different positions in the multiple images over the period of time;

aligning, by the one or more computing devices and based at least in part on the tracked features, the multiple images into a common coordinate system; and combining, by the one or more computing devices and using the aligned multiple images, the determined multiple shapes of the pile of material to produce the 3D computer model; and determining, by the one or more computing devices, a trajectory of movement of the pile of material as it moves through the multiple successive locations, including:

obtaining, by the one or more computing devices and from the SfM processing, a plurality of respective distinct estimated camera poses for the stationary camera calculated for the multiple images; and using, by the one or more computing devices, the plurality of respective distinct estimated camera poses for the stationary camera to determine the trajectory of the pile of material;

determining, by the one or more computing devices and based at least in part on the 3D computer model, one or more attributes of the pile of material that include at least a volume of the pile of material; and providing, by the one or more computing devices, information about the pile of material for use on one or more client devices that includes the determined one or more attributes and further includes the determined trajectory.

2. The computer-implemented method of claim 1 wherein the obtained plurality of respective distinct estimated camera poses for the stationary camera calculated for the multiple images are based on an assumption during the SfM processing that the pile of material is at a constant location during the period of time and the stationary camera is moving during the period of time, and wherein the using of the plurality of respective distinct estimated camera poses for the stationary camera to determine the trajectory of the movement of the pile of material includes:

computing, by the one or more computing devices, 3D transformations to align the plurality of respective distinct camera poses to a single camera pose;

applying, by the one or more computing devices, the computed 3D transformations to the constant location to determine a plurality of estimated distinct locations and orientations of the pile of material during the period of time corresponding to the multiple images; and calculating, by the one or more computing devices and based at least in part on the determined plurality of estimated distinct locations and orientations of the pile of material, the trajectory of the movement of the pile of material.

3. The computer-implemented method of claim 1 wherein the visual data of the multiple images do not include visual coverage of one or more omitted surfaces of the exterior of the pile of material, and wherein the generating of the 3D computer model further includes:

determining, by the one or more computing devices and for each of the multiple images, a first subset of that image that corresponds to the pile of material and a second subset of that image that does not correspond to the pile of material, and excluding the second subset of each of the multiple images during the analyzing and the tracking, wherein the second subset of one or more of the multiple images includes a portion of the transporting vehicle and further includes a background behind the pile of material;

predicting, by the one or more computing devices, one or more additional shapes of the one or more omitted surfaces of the exterior of the pile of material; and adding, by the one or more computing devices, the predicted one or more additional shapes of the one or more omitted surfaces to the 3D computer model.

4. A computer-implemented method comprising:

acquiring, during a period of time and from one or more cameras each physically mounted at a respective fixed location, and as an object is successively at multiple locations as the object moves by the one or more cameras during the period of time, multiple images of an exterior of the object at the multiple locations that in aggregate have visual data for some or all of the exterior of the object;

generating, by one or more computing devices, a three-dimensional ("3D") computer model to represent at least some of the exterior of the object, including:

analyzing, by the one or more computing devices, the visual data of the multiple images to determine multiple respective shapes of the object, including determining, for each of the multiple images, a shape of a portion of the exterior of the object that is visible in that image;

tracking, by the one or more computing devices, features of the object at different positions in the multiple images over the period of time;

aligning, by the one or more computing devices and based at least in part on the tracked features, the multiple images into a common coordinate system; and combining, by the one or more computing devices and using the aligned multiple images, the determined multiple shapes of the object to produce the 3D computer model;

determining, by the one or more computing devices, a trajectory of movement of the object for the multiple locations, including:

determining, by the one or more computing devices, a plurality of respective distinct estimated camera poses for the one or more cameras calculated for the multiple images; and using, by the one or more computing devices, the plurality of respective distinct estimated camera poses for the one or more cameras to determine the trajectory of the object; and providing, by the one or more computing devices, information about the 3D computer model and about the determined trajectory for use on one or more client devices.

5. The computer-implemented method of claim 4 wherein the visual data of the multiple images do not include visual coverage of one or more omitted surfaces of the exterior of the object, and wherein the generating of the 3D computer model further includes:

predicting, by the one or more computing devices, one or more additional shapes of the one or more omitted surfaces of the exterior of the object; and adding, by the one or more computing devices, the predicted one or more additional shapes of the one or more omitted surfaces to the 3D computer model, wherein the 3D computer model represents all of the exterior of the object.

6. The computer-implemented method of claim 4 wherein the generating of the 3D computer model further includes using Structure-from-Motion (SfM) techniques to perform the analyzing and the tracking and the aligning and the combining, wherein the one or more cameras include a stationary camera with a fixed camera pose, wherein the determining of the plurality of respective distinct estimated camera poses for the one or more cameras includes obtaining, by the one or more computing devices, the plurality of respective distinct estimated camera poses for the stationary camera as calculated for a plurality of images of the multiple images captured by the stationary camera based at least in part on an assumption that the object is at a constant location during the period of time and the stationary camera is moving during the period of time, and wherein the using of the plurality of respective distinct estimated camera poses for the stationary camera to determine the trajectory of the movement of the object includes:

computing, by the one or more computing devices, 3D transformations to align the plurality of respective distinct camera poses to a single camera pose;

applying, by the one or more computing devices, the computed 3D transformations to the constant location to determine a plurality of estimated distinct object poses for the object during the period of time corresponding to the plurality of images; and determining, by the one or more computing devices and based at least in part on the determined plurality of estimated distinct object poses, the trajectory of the movement of the object as it moves through at least some of the multiple locations.

7. The computer-implemented method of claim 4 wherein the one or more cameras are further physically mounted at one or more fixed orientations, and wherein differences in images captured by each camera during the period of time are caused by the movement of the object during the period of time.

8. The computer-implemented method of claim 4 wherein the one or more cameras include a first camera having a plurality of possible orientations at the respective fixed location of the first camera that are controllable by one or more motors, wherein the acquiring of the multiple images includes acquiring a plurality of images from the first camera at the fixed location using multiple orientations of the plurality of possible orientations, and wherein the generating of the 3D computer model further includes determining a subset of each of the plurality of images that does not correspond to the object, and excluding the determined subset of each of the plurality of images during the tracking.

9. The computer-implemented method of claim 8 further comprising tracking, by the one or more computing devices and based at least in part on visual data from the first camera, movement of the first camera as its orientation is modified by the one or more motors, and determining each of the multiple orientations of the first camera based at least in part on the tracked movement.

10. The computer-implemented method of claim 4 wherein the generating of the 3D computer model further includes determining, by the one or more computing devices and for each of the multiple images, a first subset of that image that corresponds to the object and a second subset of that image that does not correspond to the object, and excluding the second subset of each of the multiple images during the analyzing and the tracking.

11. The computer-implemented method of claim 10 wherein the object is transported during the period of time by a transport mechanism that has a bottom surface on which the object rests, the transport mechanism being at least one of a train car or a boat or a truck or a forklift or a crane or a dolly or a conveyor belt, and wherein the second subset of at least some of the multiple images each includes visual data corresponding to a portion of the transport mechanism.

12. The computer-implemented method of claim 10 wherein the object is at least one of a pile of material, or one or more boxes, or one or more pallets, or one or more bags.

13. The computer-implemented method of claim 4 wherein the one or more cameras include multiple cameras each having a distinct respective fixed location, wherein each of the multiple cameras captures a subset of one or more images of the multiple images, and wherein the generating of the 3D computer model includes combining data determined from the one or more images of each of the multiple cameras.

14. The computer-implemented method of claim 13 wherein the method further comprises obtaining, for each of one or more pairs of the multiple cameras, data about a difference in location between cameras of that pair and about a difference in orientation between cameras of that pair, and wherein the method further comprises determining, by the one or more computing devices and based at least in part on calibration of camera poses of the multiple cameras using the obtained data, a size of the object based on at least one of distances between the multiple cameras, or of one or more distances between at least one of the multiple cameras and the object for at least one of the multiple locations.

15. The computer-implemented method of claim 4 further comprising:

determining, by the one or more computing devices and based at least in part on the 3D computer model, one or more attributes of the object that include at least a volume of the object; and providing, by the one or more computing devices, information about the object that includes the determined one or more attributes.

16. The computer-implemented method of claim 4 further comprising identifying, by the one or more computing devices and using one or more trained machine learning models, a type of the object in the multiple images and, for each of the multiple images, a subset of pixels of that image that correspond to the object, and wherein determining the multiple respective shapes for the multiple images includes using the subset of the pixels of each of the multiple images.

17. The computer-implemented method of claim 16 wherein the generating of the 3D computer model and the identifying of the type of the object is performed for each of multiple objects that move by the one or more cameras during multiple periods of time based at least in part on a respective group of images captured for each of the multiple objects by the one or more cameras, and wherein the method further comprises aggregating, by the one or more computing devices and based on at least one of generated 3D computer models of the multiple objects or identified types of objects for the multiple objects, information about the multiple objects, and providing the aggregated information about the multiple objects.

18. A non-transitory computer-readable medium having stored contents that cause one or more computing devices to perform automated operations including at least:

acquiring, during a period of time and from one or more cameras, and as an object is successively at multiple locations as the object moves by the one or more cameras during the period of time, multiple images of an exterior of the object at the multiple locations that in aggregate have visual data for some or all of the exterior of the object;

generating, by the one or more computing devices, a three-dimensional ("3D") computer model to represent at least some of the exterior of the object, including:

analyzing, by the one or more computing devices, the visual data of the multiple images to determine multiple respective shapes of the object, including determining, for each of the multiple images, a subset of pixels of that image that correspond to the object, and a shape of a portion of the exterior of the object that is visible in the subset of pixels of that image;

tracking, by the one or more computing devices and using the determined subset of pixels for each of the multiple images, features of the object at different positions in the multiple images over the period of time;

aligning, by the one or more computing devices and based at least in part on the tracked features, the multiple images into a common coordinate system; and combining, by the one or more computing devices and using the aligned multiple images, the determined multiple shapes of the object to produce the 3D computer model; and determining, by the one or more computing devices, a trajectory of the object for the multiple locations, including:

determining, by the one or more computing devices, a plurality of respective distinct estimated camera poses for the one or more cameras calculated for the multiple images; and using, by the one or more computing devices, the plurality of respective distinct estimated camera poses for the one or more cameras to determine the trajectory of the object; and providing, by the one or more computing devices, information about the 3D computer model and the determined trajectory for use on one or more client devices.

19. The non-transitory computer-readable medium of claim 18 wherein the one or more cameras includes at least a first camera and a second camera, wherein the first camera is physically mounted at a fixed location, wherein the stored contents include software instructions that, when executed, cause the one or more computing devices to perform further automated operations including determining, by the one or more computing devices and based at least in part on the 3D computer model, one or more attributes of the object that include at least a volume of the object, and wherein the providing of the information about the 3D computer model includes providing information about at least one of the determined one or more attributes.

20. A system comprising:

one or more hardware processors of one or more computing devices; and one or more memories with stored instructions that, when executed by at least one of the one or more hardware processors, cause the one or more computing devices to perform automated operations including at least:

obtaining multiple images acquired of an object during a period of time, wherein the multiple images are acquired from one or more cameras each physically mounted at a respective fixed location as the object is successively at multiple locations during the period of time, and wherein the multiple images in aggregate include visual data of some or all of an exterior of the object at the multiple locations;

generating a three-dimensional ("3D") computer model to represent at least some of the exterior of the object, including:

analyzing the visual data of the multiple images to determine multiple respective shapes of the object, including determining, for each of the multiple images, a shape of a portion of the exterior of the object that is visible in that image;

matching features of the object at different positions in the multiple images over the period of time;

aligning, based at least in part on the matched features, the multiple images into a common coordinate system; and combining, using the aligned multiple images, the determined multiple shapes of the object to produce the 3D computer model;

determining a trajectory of the object for the multiple locations, including:

determining a plurality of respective distinct estimated camera poses for the one or more cameras calculated for the multiple images; and using the plurality of respective distinct estimated camera poses for the one or more cameras to determine the trajectory of the object; and providing information about the 3D computer model including the determined trajectory.

21. The system of claim 20 further comprising the one or more cameras, wherein the obtaining of the multiple images includes acquiring the multiple images by the one or more cameras while a transporting vehicle moves the object by the one or more cameras, wherein the stored instructions include software instructions that, when executed, cause the one or more computing devices to perform further automated operations including determining, based at least in part on the 3D computer model, one or more attributes of the object that include at least a volume of the object, and wherein the providing of the information about the 3D computer model includes providing information about at least one of the determined one or more attributes.

* * * * *